United States Patent [19]

Mori et al.

[11] Patent Number: 5,703,644
[45] Date of Patent: Dec. 30, 1997

[54] AUTOMATIC EXPOSURE CONTROL APPARATUS

[75] Inventors: Tsutomu Mori, Hirakata; Makoto Fujimoto, Ibaragi; Yukie Goto, Hirakata; Yo Egusa, Kyoto, all of Japan

[73] Assignee: Matsushita Electric Industrial Co., Ltd., Kadoma, Japan

[21] Appl. No.: 65,119

[22] Filed: May 20, 1993

[30] Foreign Application Priority Data

| May 21, 1992 | [JP] | Japan | 4-128529 |
| May 22, 1992 | [JP] | Japan | 4-130400 |
| May 22, 1992 | [JP] | Japan | 4-130401 |
| Nov. 26, 1992 | [JP] | Japan | 4-316820 |

[51] Int. Cl.⁶ .................................... H04N 5/335
[52] U.S. Cl. .............................. 348/363; 348/221
[58] Field of Search ......................... 348/362, 363, 348/364, 365, 221, 222, 229, 230, 228, 220; H04N 5/335

[56] References Cited

U.S. PATENT DOCUMENTS

| 3,475,616 | 10/1969 | Stimson et al. | 250/226 |
| 3,651,749 | 3/1972 | DeGroot | 95/64 D |
| 5,049,997 | 9/1991 | Arai | 358/213.11 |
| 5,065,248 | 11/1991 | Homma | 358/228 |
| 5,084,754 | 1/1992 | Tomitaka | 358/209 |
| 5,111,301 | 5/1992 | Haruki et al. | 348/364 |
| 5,115,269 | 5/1992 | Masanaga et al. | 354/420 |

FOREIGN PATENT DOCUMENTS

| 0269053 | 6/1988 | European Pat. Off. | H04N 5/238 |
| 0411318 | 2/1991 | European Pat. Off. | H04N 5/238 |
| 0446647 | 9/1991 | European Pat. Off. | H04N 5/232 |
| 63-61563 | 3/1988 | Japan . | |
| 2166885 | 6/1990 | Japan . | |
| 2181578 | 7/1990 | Japan . | |
| 2305071 | 12/1990 | Japan . | |
| 332174 | 2/1991 | Japan . | |
| 3105601 | 5/1991 | Japan . | |
| 3118526 | 5/1991 | Japan . | |

OTHER PUBLICATIONS

Morimura et al., IEEE Transactions on Consumer Electronics, vol. 36, No. 4, pp. 866–876, Nov. 1990, "A Digital Video Camera System".

Search Report for European Appl. 93108262.2, mailed Jan. 24, 1994.

Ichihashi et al, Nippon Fuzzy Society Report, vol. 12, No. 3, pp. 429–437, Aug. 1990, "Learning Control by Fuzzy Models Using a Simplified Fuzzy Reasoning".

Yamanaka et al. "Abs. of the Image Electronics Society Workshop", Apr. 6, 1991, pp. 31–36, A method of Iris Control of a Movie Using a Neural Network.

(List continued on next page.)

*Primary Examiner*—Andrew Faile
*Assistant Examiner*—Andrew B. Christensen
*Attorney, Agent, or Firm*—Renner, Otto, Boisselle, Sklar

[57] ABSTRACT

An automatic exposure control apparatus includes an image frame luminance calculation unit for calculating an average luminance of an image frame; a region luminance calculation unit for calculating average luminances of a plurality of regions, the plurality of regions constituting the image frame; a select region luminance calculation unit for arranging the average luminances obtained by the region luminance calculation unit in the luminance order, for selecting at least one of the plurality of regions according to the luminance order and for calculating an average luminance selected from at least one of the plurality of regions; a backlight degree calculation unit for calculating a value representing a backlight degree based on the average luminance obtained by the select region luminance calculation unit; a target luminance calculation unit for calculating the target average luminance based on the value; and an exposure correction unit for correcting an exposure so that the average luminance obtained by the image frame luminance calculation unit is kept substantially equal to the target average luminance.

29 Claims, 26 Drawing Sheets

OTHER PUBLICATIONS

Egusa et al. Tech. Report of the Institute of Television Engineers of Japan, May 20, 1992, pp. 19–24, "A Study of Auto Iris Systems Using Fuzzy Set Theory to Determine the Degree of Backlighting on Excessive Frontlighting".

Haruki et al. Tech. Rept. of the Inst. of Television Eng. of Japan, Feb. 28, 1989, pp. 43–48, "Digital AF and AE System by Using Picture Division".

Morimura et al. IEEE Transactions on Consumer Electronics, vol. 36, No. 4, pp. 866–876, Nov. 1990, "A Digital Video Camera System".

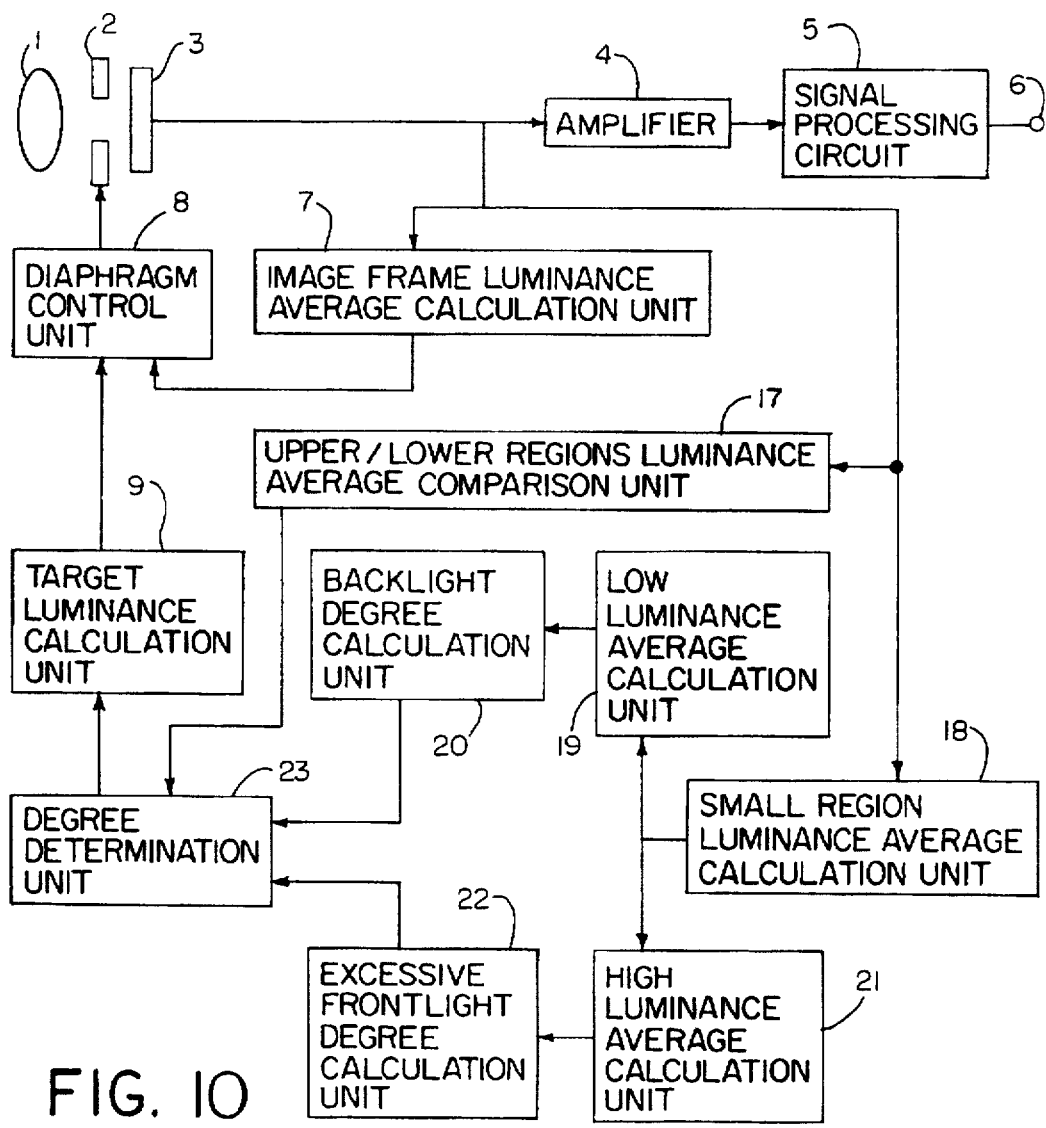
FIG. 10
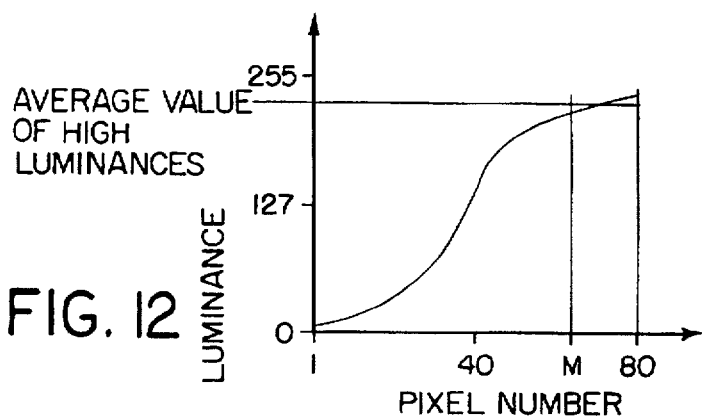
FIG. 12
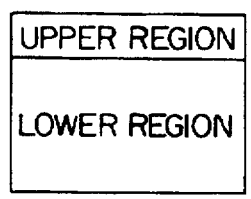
FIG. 11A
FIG. 11B

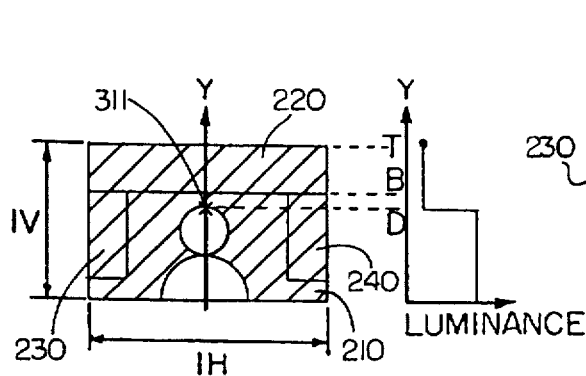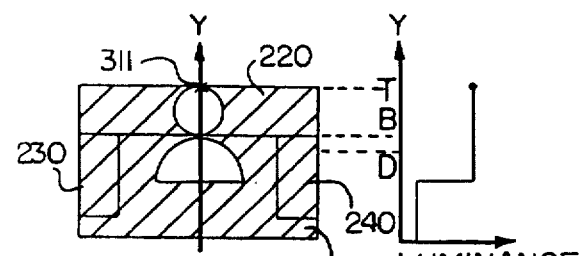
FIG. 18A
FIG. 18B
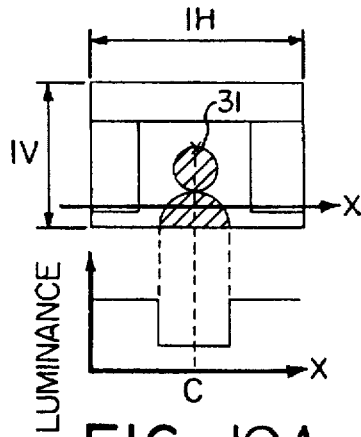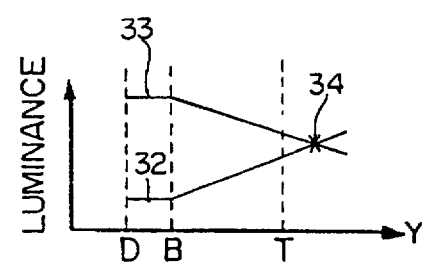
FIG. 18C
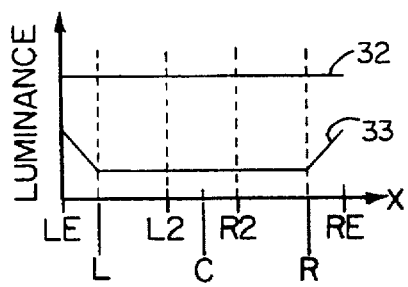
FIG. 19A
FIG. 19C
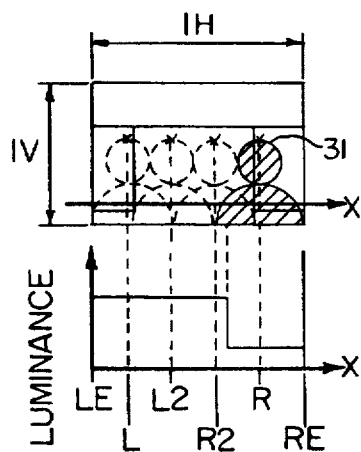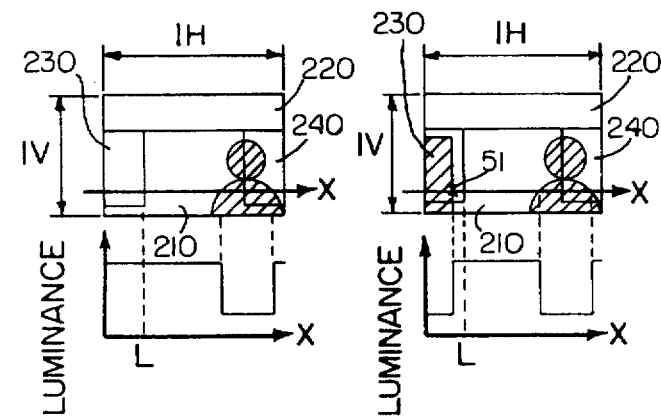
FIG. 19B
FIG. 20A    FIG. 20B

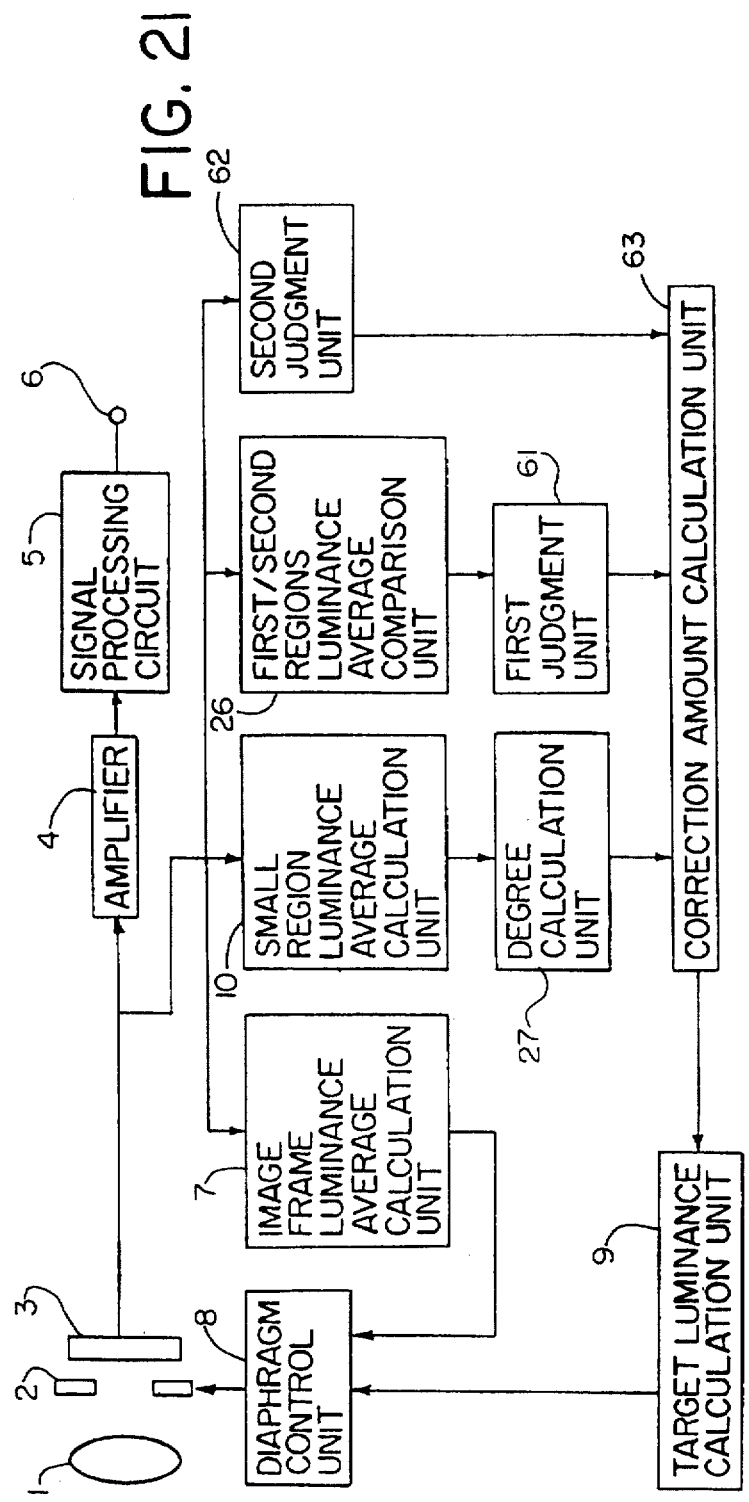
FIG. 21
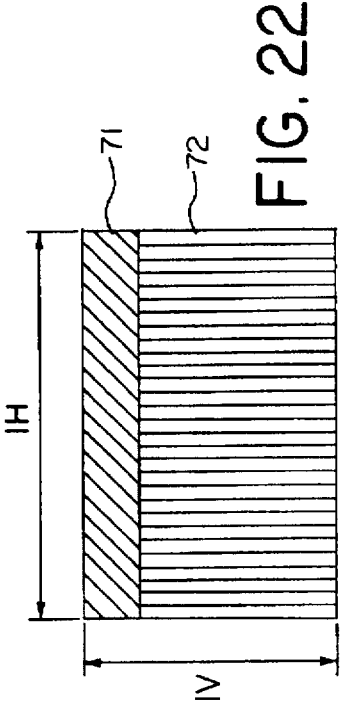
FIG. 22
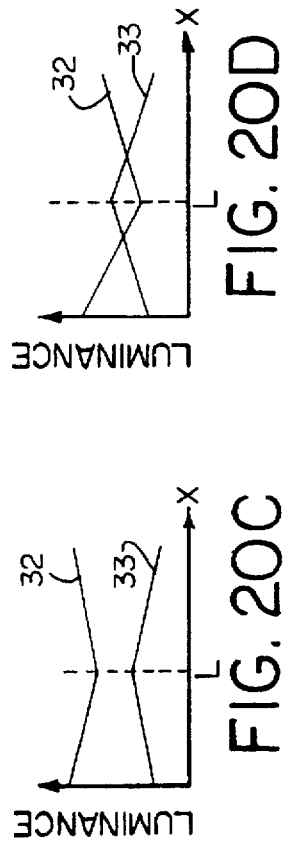
FIG. 20C
FIG. 20D

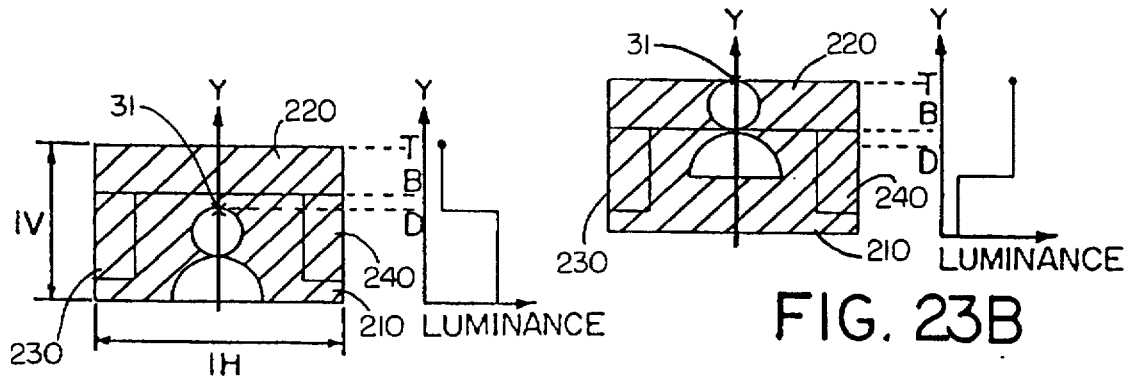
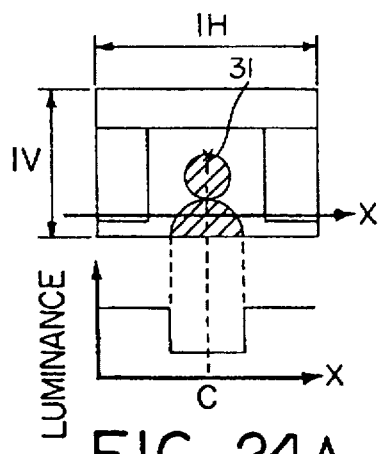
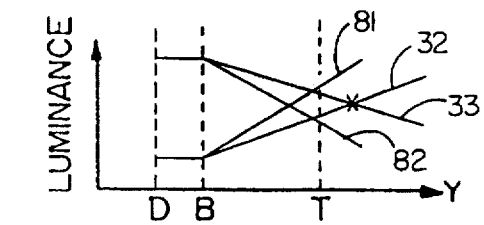
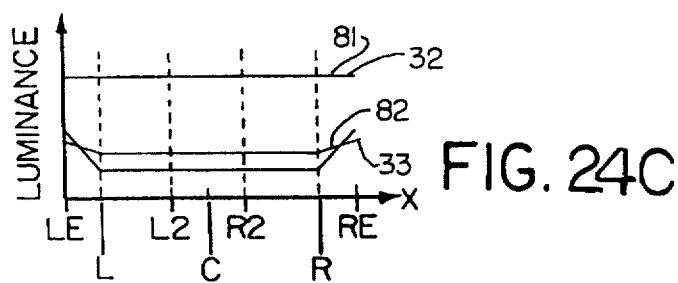
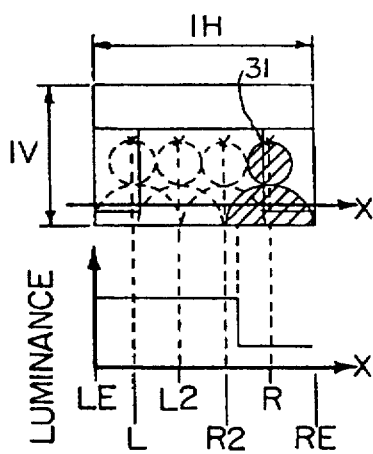
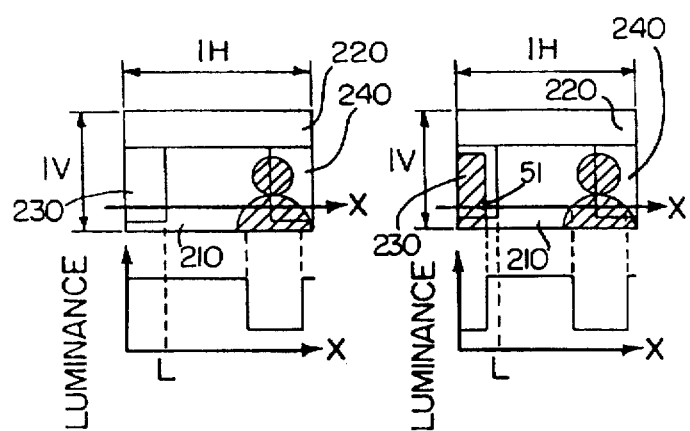
FIG. 23A  FIG. 23B  FIG. 23C  FIG. 24A  FIG. 24B  FIG. 24C  FIG. 25A  FIG. 25B

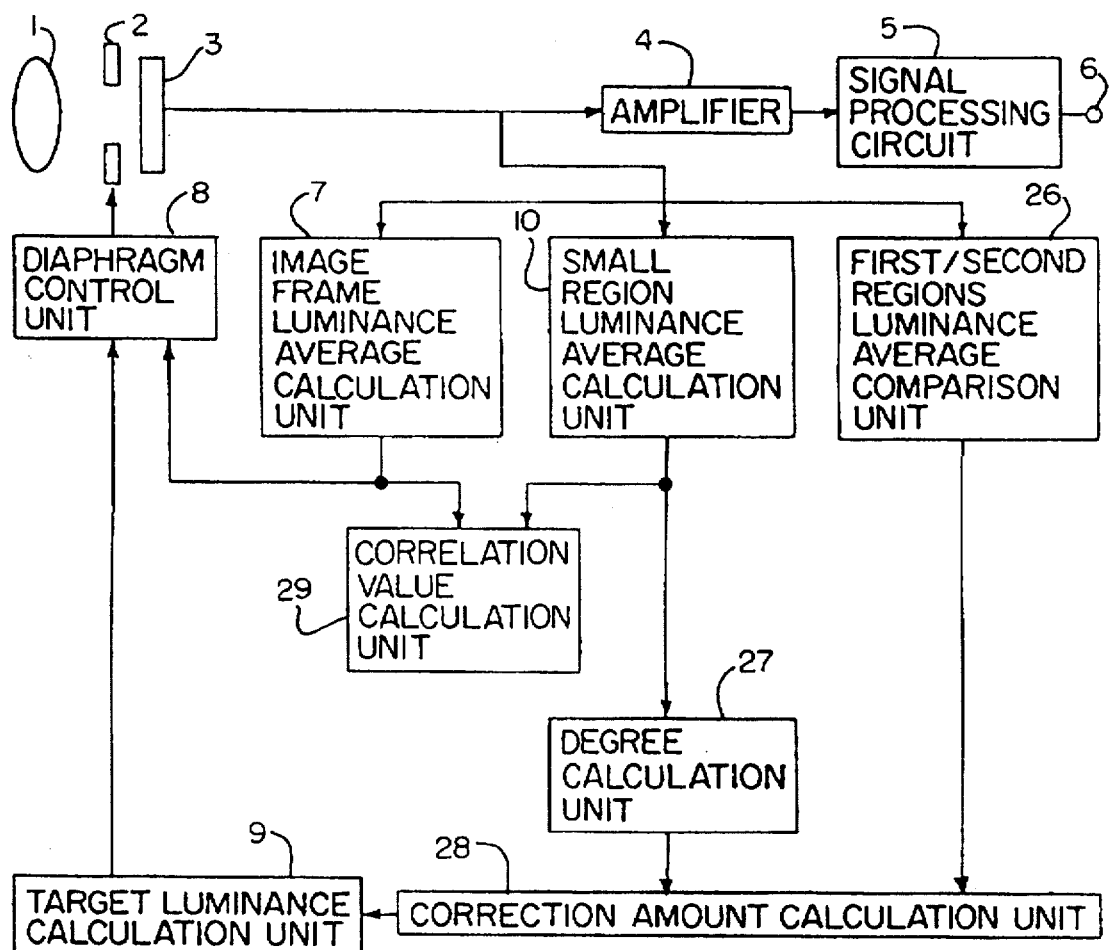
FIG. 29
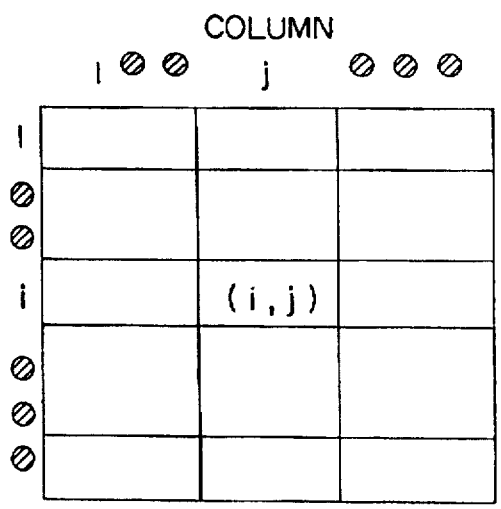
FIG. 30
| 50 | 150 | 150 | 150 | 50 |
|----|-----|-----|-----|----|
| 50 | 150 | 150 | 150 | 50 |
| 50 | 150 | 150 | 150 | 50 |
| 50 | 50 | 50 | 50 | 50 |
| 50 | 50 | 50 | 50 | 50 |
AVERAGE VALUE OF IMAGE FRAME : 86
FIG. 31A

| 75 | 225 | 225 | 225 | 75 |
|---|---|---|---|---|
| 75 | 225 | 225 | 225 | 75 |
| 75 | 225 | 225 | 225 | 75 |
| 75 | 225 | 225 | 225 | 75 |
| 75 | 75 | 75 | 75 | 75 |
AVERAGE VALUE OF
IMAGE FRAME : 120
FIG. 31B
| 0 | 1 | 1 | 1 | 0 |
|---|---|---|---|---|
| 0 | 1 | 1 | 1 | 0 |
| 0 | 1 | 1 | 1 | 0 |
| 0 | 0 | 0 | 0 | 0 |
| 0 | 0 | 0 | 0 | 0 |
FIG. 32B
| 0 | 1 | 1 | 1 | 0 |
|---|---|---|---|---|
| 0 | 1 | 1 | 1 | 0 |
| 0 | 1 | 1 | 1 | 0 |
| 0 | 0 | 0 | 0 | 0 |
| 0 | 0 | 0 | 0 | 0 |
FIG. 32A
| 0 | 1 | 1 | 1 | 0 |
|---|---|---|---|---|
| 0 | 1 | 1 | 1 | 0 |
| 0 | 1 | 1 | 1 | 0 |
|   |   |   |   |   |
|   |   |   |   |   |
FIG. 33
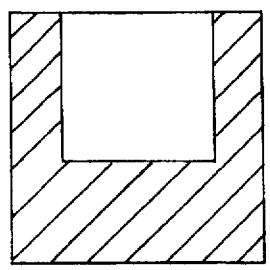
| 0 | 1 | 1 | 1 | 0 |
|---|---|---|---|---|
| 0 | 1 | 1 | 1 | 0 |
| 0 | 1 | 1 | 1 | 0 |
| 0 | 0 | 0 | 0 | 0 |
| 0 | 0 | 0 | 0 | 0 |
FIG. 34A
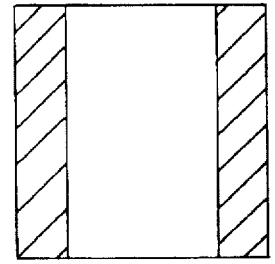
| 0 | 1 | 1 | 1 | 0 |
|---|---|---|---|---|
| 0 | 1 | 1 | 1 | 0 |
| 0 | 1 | 1 | 1 | 0 |
| 0 | 1 | 1 | 1 | 0 |
| 0 | 1 | 1 | 1 | 0 |
FIG. 34B

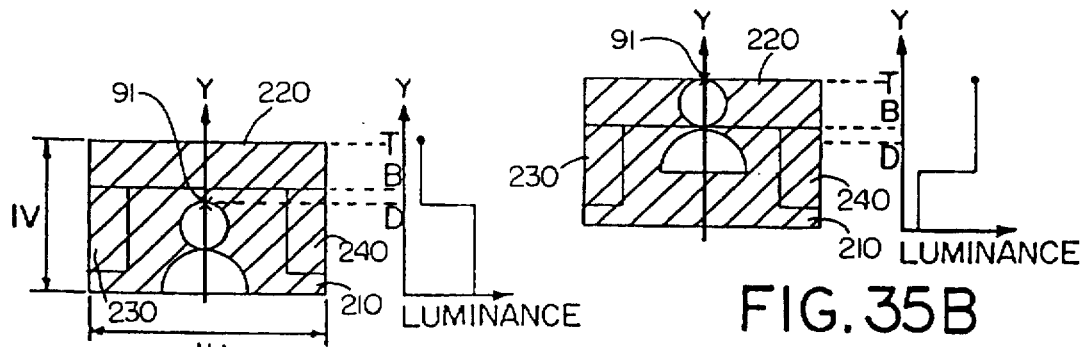
FIG.35A
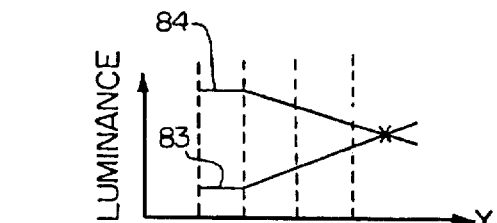
FIG.35B
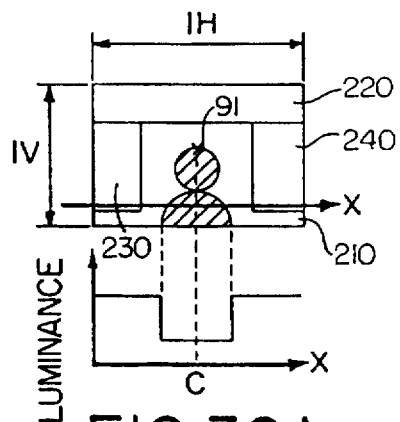
FIG.36A
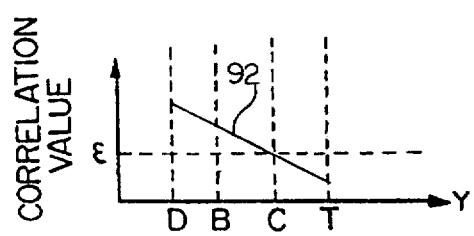
FIG.35D
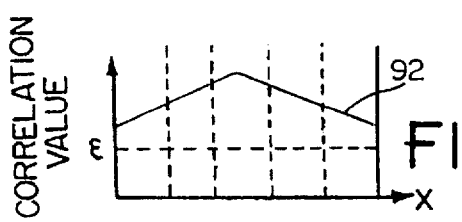
FIG.35C
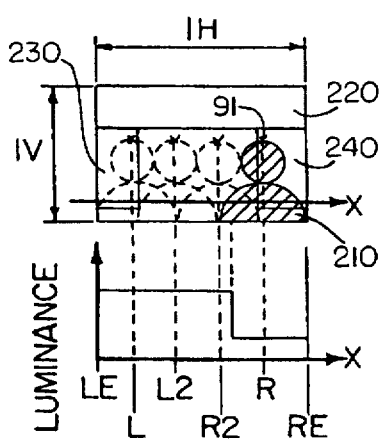
FIG.36B
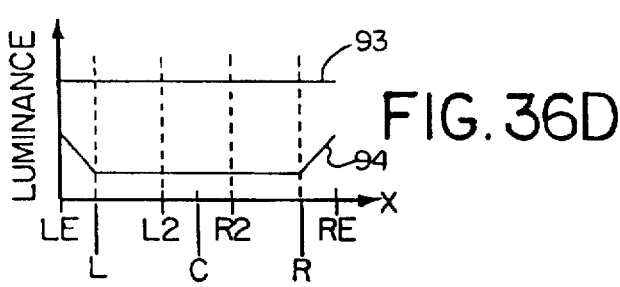
FIG.36C
FIG.36D

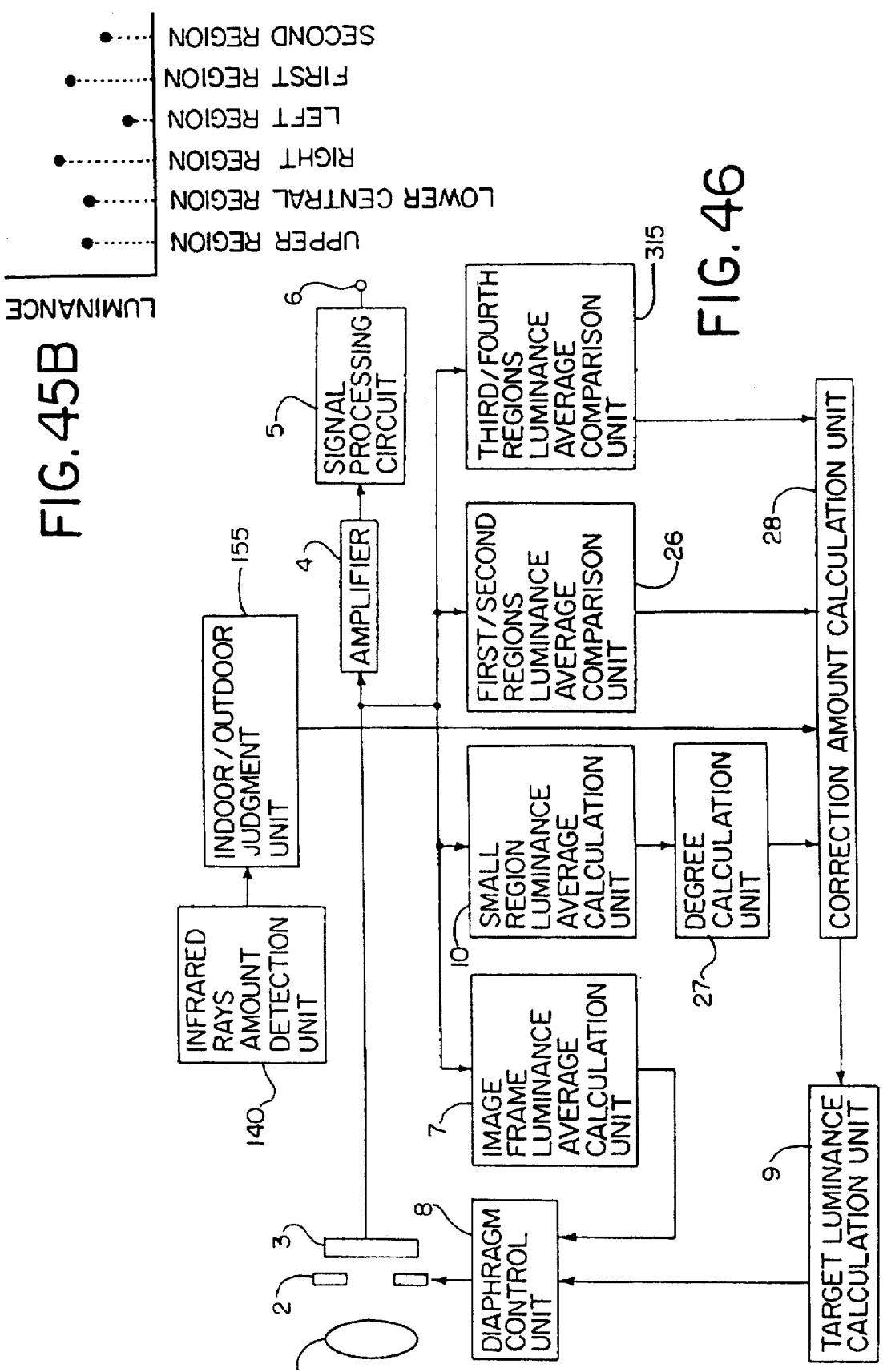

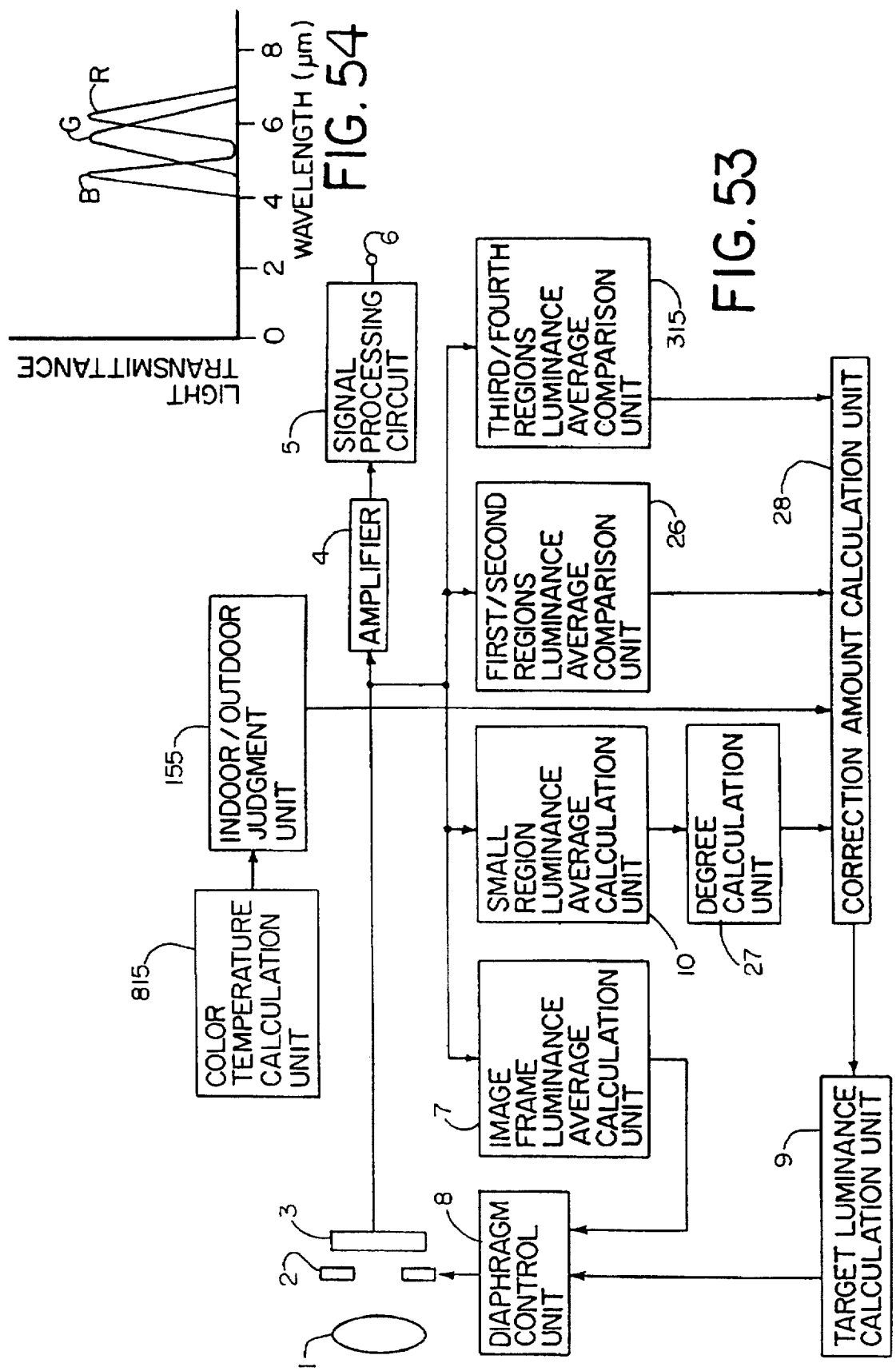

AUTOMATIC EXPOSURE CONTROL APPARATUS

BACKGROUND OF THE INVENTION

1. Field of the Invention

The present invention relates to an automatic exposure control apparatus used for correcting the exposure in a video camera or the like.

2. Description of the Related Art

An automatic exposure control apparatus used for a video camera or the like regulates a diaphragm so as to obtain a constant level of an output video signal. The following methods are used for the purpose of regulating a diaphragm: an average value method, a peak value method, and a combination thereof. According to the average value method, an average luminance of an image frame is detected; and according to the peak value method, the maximum luminance of an image frame is detected.

Hereinafter, a conventional automatic exposure control apparatus will be described in detail with reference to FIG. 62.

An image of an object is formed on a pickup element 103 via a lens 101 and a diaphragm 102. The pickup element 103 converts the image into an electric signal. The electric signal is subjected to a γ treatment whale passing through a signal processing circuit 105 and is output therefrom. At this time, a diaphragm control is performed by using the electric signal from the pickup element 103 as follows:

An average value calculation circuit 107 and a peak value calculation circuit 108 respectively detect an average luminance and a peak luminance of an image frame. A diaphragm control circuit 109 drives the diaphragm 102 based on the results obtained from the average value calculation circuit 107 and the peak value calculation circuit 108.

However, according to the average value method, in the case of a large luminance distribution in an image frame, e.g., in the case where a human figure is picked up as an object with a bright sky for the background, a backlight phenomenon is caused. The reason for this is as follows:

The average of a luminance distribution of the human figure is lower then the average luminance of the entire image frame. Accordingly, the video signal which corresponds to the human figure occupies a lower part of a distribution of the video signal corresponding to the image frame, resulting in a black reproduced image of the human figure.

In order to avoid the above-mentioned phenomenon, it is required to make the luminance distribution of the video signals corresponding to an image of an object (the human figure in this case) present at a higher level than an average luminance of an image frame. For example, an image quality in a backlight state can be improved by correcting the diaphragm in an opening direction so as to keep the video signals corresponding to the image of the object at a higher level.

The following method has been considered to provide a diaphragm control at a predetermined control amount: An input switching which is manually switched by a user is provided with the diaphragm drive circuit 109. When the user operates the input switch in a backlighting condition, the input switch supplies a switch signal to the diaphragm control circuit 109.

However, according to this configuration, a misoperation by the user may cause an improper diaphragm control. In addition, since the control amount of a diaphragm is predetermined, it is impossible to provide a proper diaphragm control depending on individual images under various conditions. In order to overcome these problems, it is required to automatically judge whether an object is under a backlight condition or not, and to correct the diaphragm control in accordance with the strength of the backlight.

For example, Japanese Laid-Open Patent Publication No. 2-181578 discloses an automatic diaphragm apparatus. According to the apparatus, a luminance of the region where the object is supposed to be present (e.g. a central portion of an image frame) and a luminance of the remaining portion of the image frame are measured. Based on the difference between these luminances, it is judged whether the object is under a backlight condition or not. The correction of the diaphragm control is made according to the backlight condition.

The diaphragm control regarding the conventional apparatus mentioned above will be described with reference to FIG. 63.

First and second detectors 113 and 114 detect the level of each output signal having data with respect to a first region (central region of an image frame) and a second region (peripheral region thereof) (see FIG. 64), output from the pickup element. The signals output from the first and second detectors 113 and 114 enter a comparator 123 through amplifiers 121 and 122. In the comparator 123, the levels of the first and second regions are compared with each other in order to determine the degree of backlight. Assuming that the output signals from the first and second detectors 113 and 114 are x and y, respectively; and amplification degrees of the amplifiers 121 and 122 are m and n, it is judged that a forward light state is obtained in the case of $(x \cdot m) \geq (y \cdot n)$, and a backlight state is obtained in the case of $(x \cdot m) < (y \cdot n)$.

A first gate portion 110, a second gate portion 111, and a third gate portion 112 detect the level of each output signal having data with respect to regions $t_1$, $t_2$, and $t_3$ as shown in FIG. 65. The respective output signals pass through gain control units 115, 117, and 119 so as to be integrated at an adding unit 124. The amplification degree of the first, second, and third gain control units 115, 117, and 119 are regulated by a first, second, and third control units 116, 118, and 120 which receive information with respect to the determined degree of backlight from the comparator 123. A diaphragm control circuit 109 performs a diaphragm control so as to keep the output signal from the adding unit 124 at a predetermined level.

When the object is in a frontlight state, the difference in luminance level between the first (central) region and the second (peripheral) region in FIG. 64 is small. Accordingly, the comparator 123 determines that it is in a frontlight state. The first, second, and third control units 116, 118, and 120 set gains G1, G2, and G3 in the gain control units 115, 117, and 119 as G1>G2>G3. Here, G1 is slightly larger than G2 and G3. Thus, a diaphragm control, which As close to the conventional photometry method (i.e., average luminance of an image frame is made constant), is performed.

On the other hand, when the object is in a backlight state, the first region becomes darker than the second region. Accordingly, the comparator 123 determines that it is in a backlight state. The first, second, third control units 116, 118, and 120 set the gains G1, G2, and G3 as G1>>G2>G3. Here, G1 is remarkably larger than G2 and G3. This means that the gain of the first region is larger than that of the second region, and therefore the luminance of the first region is measured with emphasis. As a result, it is possible to perform a diaphragm control suitable for the backlight condition.

However, in the case of the above-mentioned diaphragm control, the output levels of the respective central region and the peripheral region are averaged, even though an image with high contrast is input in an image frame. Therefore, the actual contrast cannot be measured. Namely, the output levels of the central region and the peripheral region change depending on the difference of the spatial distribution of an image luminance; as a result, most video signals are saturated due to overcorrection, or an image which is desired to be further corrected cannot be done so appropriately. In addition, since the degree of backlight changes depending on the change of luminance of the central region of an image frame, the exposure correction amount may change in accordance with the movement of an object.

SUMMARY OF THE INVENTION

The automatic exposure control apparatus of this invention, includes a image frame luminance calculation unit for calculating an average luminance of an image frame; a region luminance calculation unit for calculating average luminances of a plurality of regions, the plurality of regions constituting the image frame; a select region luminance calculation unit for arranging the average luminances obtained by the region luminance calculation unit in the luminance order, for selecting at least one of the plurality of regions according to the luminance order, and for calculating an average luminance of the selected at least one of the plurality of regions; a backlight degree calculation unit for calculating a value representing a backlight degree based on the average luminance obtained by the select region luminance calculation unit; a target luminance for an exposure correction calculation unit for calculating a target average luminance based on the value; and an exposure correction unit for correcting an exposure so that the average luminance obtained by the image frame luminance calculation unit is kept substantially equal to the target average luminance.

In another aspect of the present invention, an automatic exposure control apparatus includes a state judgment unit for judging whether an image frame is in a backlight state or in an excessive frontlight state; an image frame luminance calculation unit for calculating an average luminance of the image frame; a region luminance calculation unit for calculating average luminance of a plurality of regions, the plurality of regions constituting the image frame; a first select region luminance calculation unit for arranging the average luminance obtained by the region luminance calculation unit in the luminance order, for selecting at least one of the plurality of regions according to the luminance order, and for calculating an average luminance of those selected from at least one of the plurality of regions; a second select region luminance calculation unit for arranging the average luminance obtained by the region luminance calculation unit in the luminance order, for selecting at least another one of the plurality of regions according to the luminance order, and for calculating an average luminance of the selected at least another one of the plurality of regions; a backlight degree calculation unit for calculating the first value representing a backlight degree based on the average luminance obtained by the first select region luminance calculation unit; an excessive frontlight degree calculation unit for calculating the second value representing an excessive frontlight degree based on the average luminance obtained by the second select region luminance calculation unit; a correction amount determination unit for determining the correction amount based on the judgment result by the state judgment unit, the first value and the second value; a target luminance calculation unit for calculating the target average luminance based on the correction amount; and an exposure correction unit for correcting an exposure so that the average luminance obtained by the image frame luminance calculation unit is kept substantially equal to the target average luminance.

According to the present invention, an image frame is divided into a plurality of small regions. An average luminance of each small region is obtained, and an average value of low luminance regions is calculated, whereby the degree of backlight under an automatic exposure control is quantitatively obtained.

In addition, a plurality of average values of the low luminance regions are obtained, whereby the correction amount of a diaphragm in accordance with the darkness and size of the low luminance regions can be obtained.

Moreover, the judgment between the backlight and the excessive frontlight is made by comparing luminance of the upper region with that of the lower region, and a correction amount of the diaphragm is adjusted. The control level of the diaphragm is appropriately changed in accordance with the lighting condition on the basis of the correction amount of the diaphragm.

Furthermore, a dark region which is part of the lower region is added to the upper region, and the dark region is removed from the lower region. In this way, the increase of an average luminance of the first region and the decrease of an average luminance of the second region due to the movement of an object is suppressed, whereby misjudgments caused by the movement of the object can be avoided. As a result, an appropriate exposure for any object which moves up and down in an excessive frontlight condition can be obtained.

Thus, the invention described herein makes possible the advantage of providing an automatic exposure control apparatus which is capable of judging a lighting condition of an object and determining the appropriate exposure for the object.

This and other advantages of the present invention will become apparent to those skilled in the art upon reading and understanding the following detailed description with reference to the accompanying figures.

BRIEF DESCRIPTION OF THE DRAWINGS

FIG. 10 is a block diagram showing an automatic exposure control apparatus of Example 3 according to the present invention.

FIGS. 11A and 11B show an image frame divided into two regions and that divided into small regions.

FIG. 12 is a graph showing a luminance order characteristic curve.

FIG. 18A shows an excessive frontlight image in which an object is present at a central position D of an image frame together with luminance at each position.

FIG. 18B shows an excessive frontlight image in which an object is present at a top end position T of the image frame together with luminance at each position.

FIG. 18C is a graph showing changes of an average luminance of the first and second regions while the object moves from the central position D to the top end position T.

FIG. 19A is a backlight image in which an object is present at a central position C together with luminance at each position.

FIG. 19B is a backlight image in which the object moves from a right position R to a left position L together with luminance at each position.

FIG. 19C is a graph showing changes of an average luminance of the first and second regions while the object moves the right position R to the left position L.

FIG. 20A shows a backlight image in which an object is present on the right side of an image frame together with luminance at each position.

FIG. 20B shows a backlight image in which the object is present on the right side of the image frame and a dark substance is present on the left side thereof together with luminance at each position.

FIG. 20C is a graph showing changes of an average luminance of the first and second regions while the object is present on the right side of the image frame and the dark substance moves from the left side of the image frame to a boundary position L thereof.

FIG. 20D is a graph showing changes of an average luminance of the first and second regions while the object is present on the right side of the image frame and the dark substance moves from the left side of the image frame to the boundary position L thereof.

FIG. 21 is a block diagram showing an automatic exposure control apparatus of Example 6 according to the present invention.

FIG. 22 shows an image frame divided into an upper region and a lower region.

FIG. 23A shows an excessive frontlight image in which an object is present at a central position D of an image frame together with luminance at each position.

FIG. 23B shows an excessive frontlight image in which an object is present at the top end position T of the image frame together with luminance at each position.

FIG. 23C is a graph showing changes of an average luminance of the first and second regions, and the upper and lower regions while the object moves from the central position D to the top end position T.

FIG. 24A shows a backlight image in which an object is present at a central position C of an image frame together with luminance of each position.

FIG. 24B shows a backlight image in which an object moves from a right position R of an image frame to a left position L thereof together with luminance of each position.

FIG. 24C is a graph showing changes of an average luminance of the first and second regions, and the upper and lower regions while the object moves the right position R to the left position L.

FIG. 25A shows a backlight image in which an object is present on the right side of an image frame together with luminance at each position.

FIG. 25B shows a backlight image in which the object is present on the right side of the image frame and a dark substance is present on the left side thereof together with luminance at each position.

FIG. 29 is a block diagram showing an automatic exposure control apparatus of Example 7 according to the present invention.

FIG. 30 is a diagram illustrating the position of each small region of an image frame.

FIGS. 31A and 31B show an average luminance of each small region when the same image in which the central region is bright is taken under different diaphragm states.

FIGS. 32A and 32B show an average luminance of each small region by using two values, when the same image in which the central region is bright is taken under different diaphragm states. (An average luminance of each small region is represented by using two values, based on an average luminance of an image frame as a threshold value.)

FIG. 33 is a diagram showing a predetermined luminance distribution.

FIGS. 34A and 34B are diagrams showing the respective luminance distributions in image frames having a bright central region.

FIG. 35A shows an excessive frontlight image in which an object is present at a central position D of an image frame together with luminance at each position.

FIG. 35B shows an excessive frontlight image in which the object is present at the top end position T of the image frame together with luminance each position.

FIGS. 35C is a graph showing the correlation value while the object moves from the central position D to the top end position T as shown in FIGS. 35A and 35B.

FIG. 35D is a graph showing changes of an average luminance of the first and second regions while the object moves from the central position D to the top end position T as shown in FIGS. 35A and 35B.

FIG. 36A shows a backlight image in which an object is present at a central position C together with luminance at each position.

FIG. 36B shows a backlight image in which an object moves from a right position R of the image frame to a left position L thereof together with luminance at each position.

FIG. 36C is a graph showing a change of a correlation value while the object moves from the right position R to the left position L.

FIG. 36D is a graph showing changes of an average luminance of the first and second regions while the object moves the right position R to the left position L.

FIG. 45B is a diagram showing luminance of each region shown in FIG. 45A.

FIG. 46 is a block diagram showing an automatic exposure control apparatus of Example 9 according to the present invention.

FIG. 53 is a block diagram showing an automatic exposure control apparatus of Example 11 according to the present invention.

FIG. 54 is a graph showing the sensitivity of a three primary color filter.

DESCRIPTION OF THE PREFERRED EMBODIMENTS

Hereinafter, the present invention will be described by way of illustrating examples with reference to the drawings.

EXAMPLES

Example 1

Figure 1:
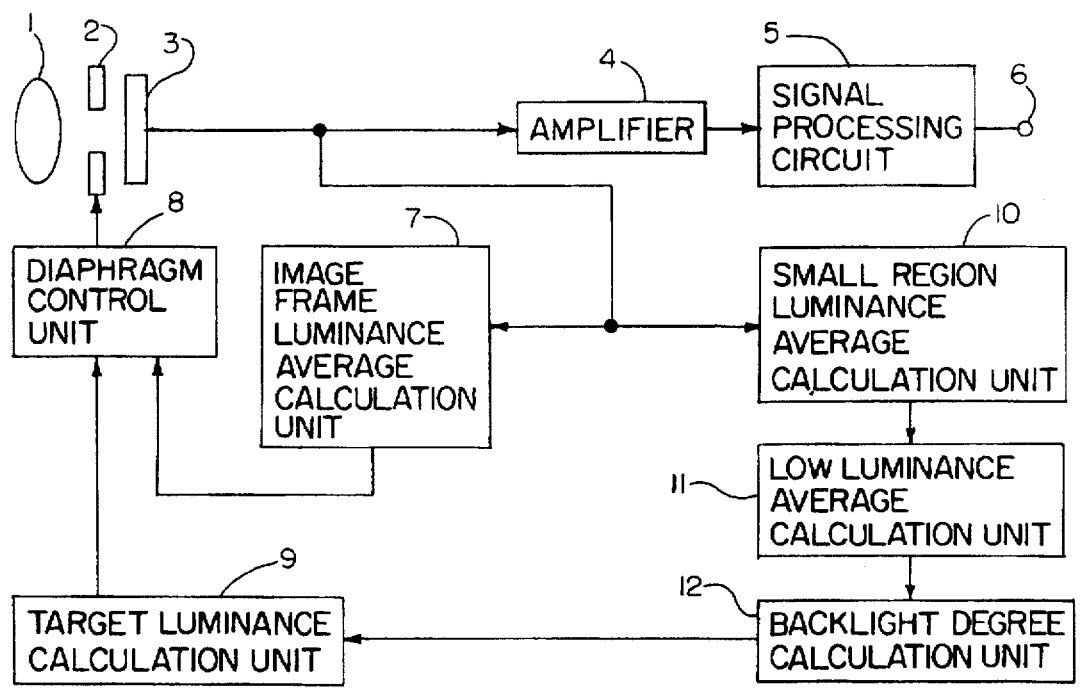
FIG. 1 is a block diagram showing an automatic exposure control apparatus of Example 1 according to the present invention.

FIG. 1 shows an example of an automatic exposure control apparatus according to the present invention. An image of an object is formed on a pickup element 3 through a lens 1 and a diaphragm 2, and is converted into an electric signal. The signal is amplified by an amplifier 4. Then, the signal is subjected to a γ treatment while passing through a signal processing circuit 5 and is transmitted to a video signal output terminal 6. At this time, a diaphragm control is performed based on the signal obtained from the pickup element 3 as follows:

An image frame luminance average calculation unit 7 calculates an average luminance Yall of an image frame, based on the signal from the pickup element 3. A diaphragm control unit 8 compares the average luminance Yall with a target luminance value Yall' obtained by a target luminance calculation unit 9, and controls the diaphragm opening or closing so that the difference between the average luminance Yall and the target luminance Yall' is made 0, whereby the average luminance Yall is kept substantially equal to the target luminance Yall'. For example, when a dynamic range of the pickup element 3 is 0 to 255 (8-bit information), the target luminance Yall' is set at 127 (central value) in an ordinary exposure control.

Figure 2:
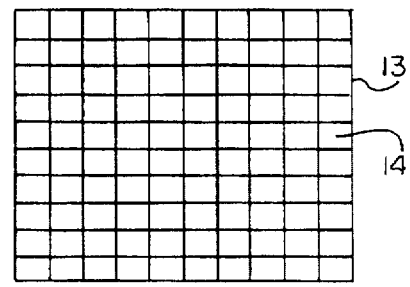
FIG. 2 shows an image frame divided into small regions.

An image frame is divided into a plurality of small regions. For example, the image frame 13 is divided into 100 small regions 14 (10 divisions in a vertical direction and 10 divisions in a horizontal direction) as in FIG. 2. The average luminance of a small region is represented by an average luminance of pixels included in the small region. Thus, the apparent number of pixels (the number of small regions) is 100.

A small region luminance average calculation unit 10 calculates the average luminance for each small region based on the signal from the pickup element 3.

Figure 3:
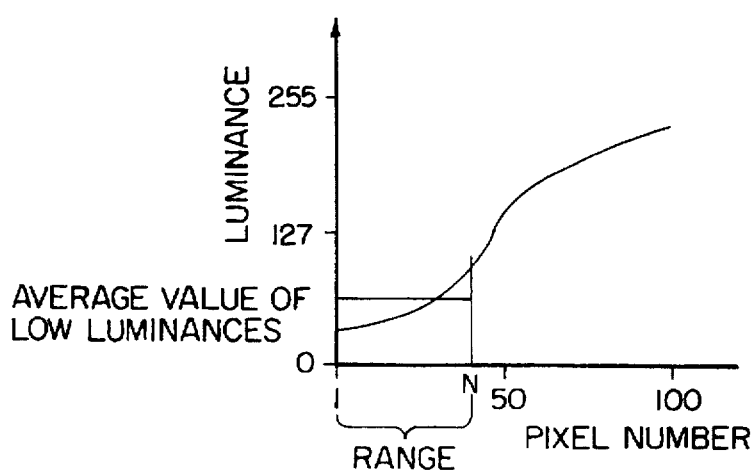
FIG. 3 is a graph showing a luminance order characteristic curve.

Next, a low luminance average calculation unit 11 arranges an average luminance of each small region in a luminance order as shown in FIG. 3. This is called a luminance order characteristic. In FIG. 3, a vertical axis represents luminance and a horizontal axis represents the numbering of each small region (pixel number) arranged in order of low luminance. Thus, the luminance shows a monotone increase characteristic.

An average value of low luminance regions (i.e., an average luminance in certain pixel ranges, e.g., pixel number 1 to N) as shown in FIG. 3 is a parameter representing the degree of backlight. The principle of this will be described.

Figure 4A:
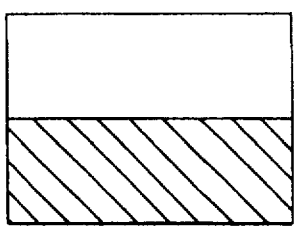
FIGS. 4A through 4C show backlight images.
Figure 4B:
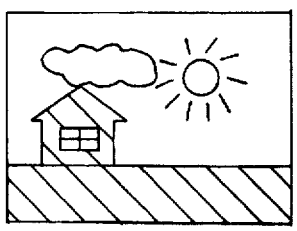
Figure 4C:
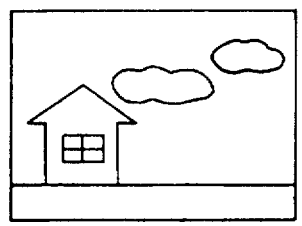
Figure 4D:
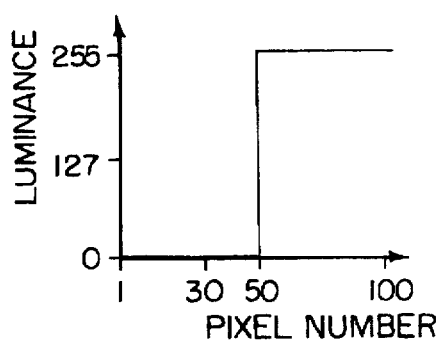
FIGS. 4D through 4F are graphs showing luminance order characteristic curves of the respective backlight images.
Figure 4E:
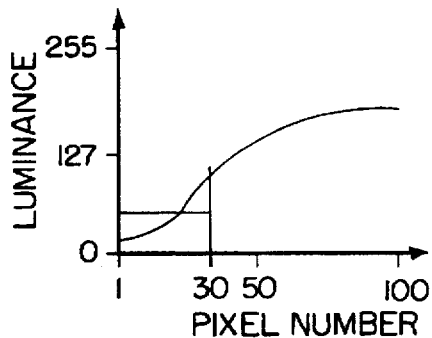
Figure 4F:
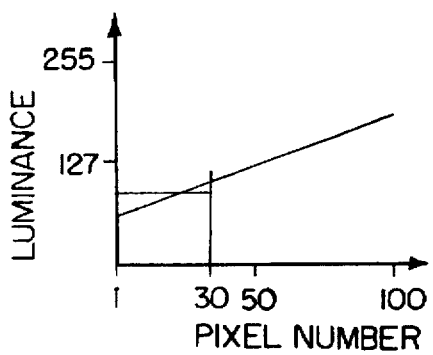

When very bright regions are present in an image frame, the aperture opening is made small in order to make an average luminance 127. As a result, in regions other than the very bright regions, luminance becomes very low, and the image frame is divided into bright regions and dark regions. The case in which an object is present in the dark regions under this condition corresponds to a backlight state. FIGS. 4A through 4F are examples showing the degree of backlight. In the respective figures, a shaded portion corresponds to a dark region. In FIG. 4A, a region with a luminance of 0 occupies half of an image frame, and the remaining region has a luminance of 255. Thus, an average luminance becomes 127. A luminance order characteristic is as shown in FIG. 4D. FIG. 4B shows an image under a weak backlight state, in which a quarter of an image frame is dark. An average value of low luminance regions (an average luminance of regions whose pixel numbers are 1 to 30) is larger than that of FIG. 4A. In FIG. 4A, an average value of low luminance regions is 0. FIG. 4C shows an image an a frontlight state. An average value of low luminance regions in FIG. 4F is larger than that of FIG. 4E. Thus, the degree of backlight which a human being feels can be represented by an average value of low luminance regions. More specifically, as an average value of low luminance regions is smaller, higher degree of backlight is obtained.

An average value of low luminance regions is obtained by calculating an average value from the lowest luminance (luminance at the 1st pixel) to luminance at the Nth pixel, using the following Formula (1). Here, the numbering of pixels is arranged in the order of the lowest luminance to the highest luminance.

$$V = \sum_{i=1}^{N} v(i)/N \tag{1}$$

where V is an average value of low luminance regions, v(i) is a luminance level at the ith pixel, and N is a pixel number.

A backlight degree calculation unit 12 calculates the degree of backlight by applying a gain to the average value of low luminance regions V, using the following Formula (2).

$$u = k*(c1-V) \tag{2}$$

where u=0 in the case of c1−V<0; u is the degree of backlight; k is a gain; and c1 is a constant value.

The target luminance calculation unit 9 sets a target value of an average luminance of an image frame for each vertical scanning (frame or field), based on the degree of backlight u obtained by the backlight degree calculation unit 12. Specifically, the target luminance calculation unit 9 calculates the target luminance Yall' by the following Formula (3).

$$Yall' = Yinit*(1+u) \tag{3}$$

where Yinit is an initial target luminance.

The diaphragm control unit 8 regulates the diaphragm so that the average luminance Yall is kept at the target luminance Yall'. When the average value of low luminance regions is small, u has a value of 0 or more and the target luminance Yall' becomes high. As a result, the diaphragm is opened so that the person can become easy to observe a region having too low luminance to be observed.

As described above, according to the present example, the degree of backlight is determined based on an average value of low luminance regions, whereby a stable backlight correction suitable for a human being's feeling can be performed.

Example 2

Figure 5:
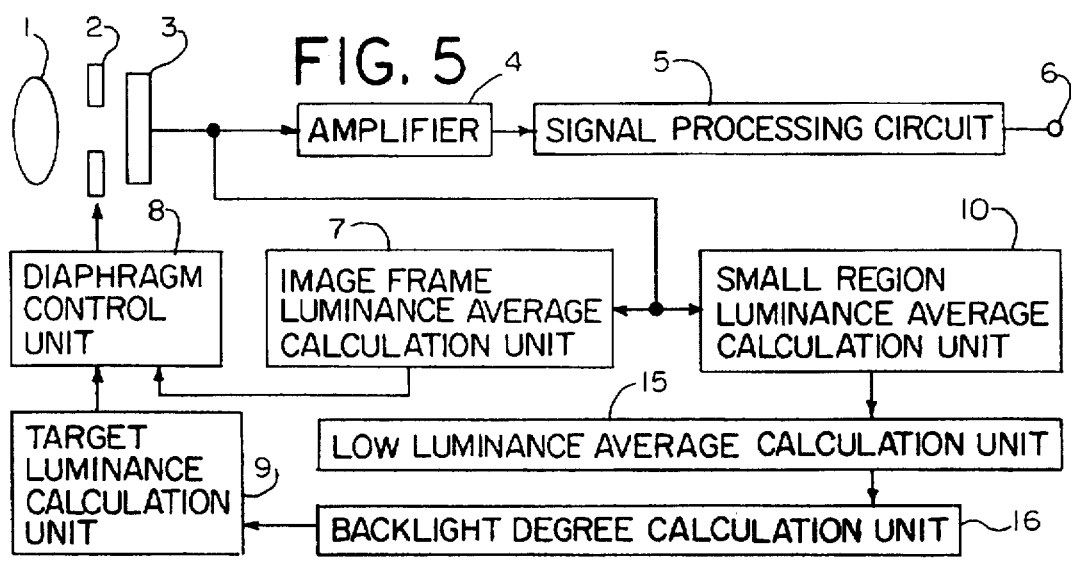
FIG. 5 is a block diagram showing an automatic exposure control apparatus of Example 2 according to the present invention.

FIG. 5 is a second example of an automatic exposure control apparatus according to the present invention. The same reference numerals as those of Example 1 are marked for the same components as those of Example 1. The same components as those of Example 1 function in the same way as in Example 1. The difference between Example 1 and Example 2 is in that a low luminance average calculation unit 15 and a backlight degree calculation unit 16 are provided in Example 2 instead of the low luminance average calculation unit 11 and the backlight degree calculation unit 12 in Example 1.

Figure 6:
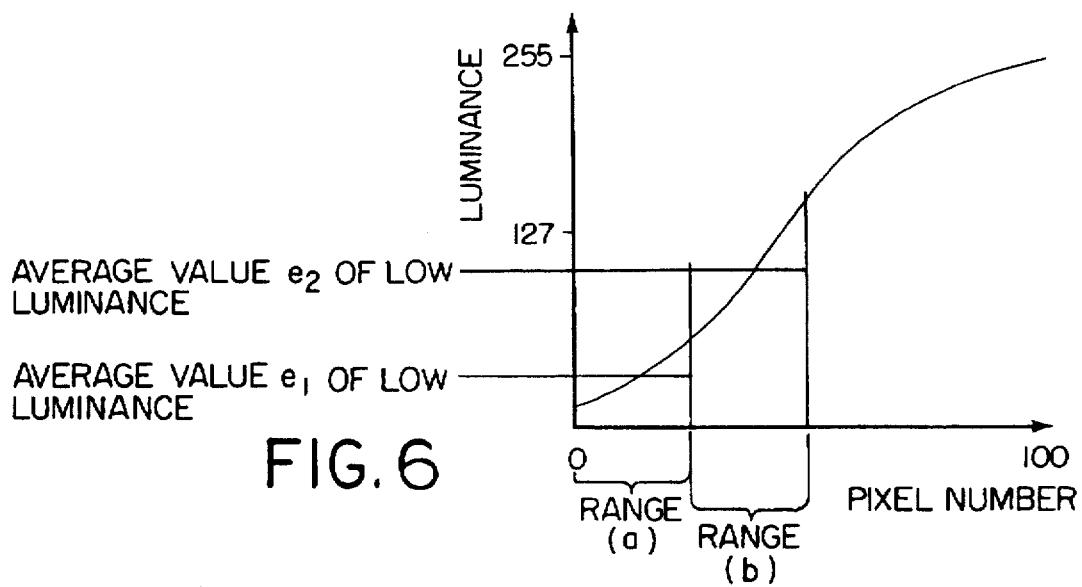
FIG. 6 is a graph showing a luminance characteristic curve.

The function of the low luminance average calculation unit 15 will be described with reference to FIG. 6.

The low luminance average calculation unit 15 calculates a plurality of average values of low luminance regions in the same way as the low luminance average calculation unit 11 of Example 1. Average values in ranges (a) and (b) are $e_1$ and $e_2$, respectively. The degree of backlight is obtained by using the average values $e_1$ and $e_2$. Thus, an average luminance of dark regions can be made a characteristic amount for calculating the degree of backlight by using a plurality of average values of low luminance regions. More specifically, when both of the average values $e_1$ and $e_2$ are low, an exposure control for strong backlight is performed; and only when the average value $e_1$ is low, an exposure control for weak backlight is performed.

Next, a method for obtaining the degree of backlight, based on the average values $e_1$ and $e_2$, by using fuzzy inference will be described. Assuming that inputs are $e_1$ and $e_2$, and the degree of backlight is u, a control rule of simplified fuzzy inference is represented, for example, as follows:

If $e_1$ is PB and $e_2$ is NS, then u is $f_i$.

where positive big (PB) and negative small (NS) are fuzzy variables; and $f_i$ is a real number.

When input data ($e_1'$, $e_2'$) is input, the following conclusion is obtained from the above-mentioned rule.

$$\mu_i(f_i) = \mu_{PB}(e_1') * \mu_{NS}(e_2') \wedge 1 \quad (4)$$

where $\wedge$ is min operation.

Since there are a plurality of control rules, the final degree of backlight $u_r$ obtained by integrating the results of the Formula (4) is as follows:

$$u_r = \frac{\Sigma \mu_i(f_i) \cdot f_i}{\Sigma \mu_i(f_i)} \quad (5)$$

Ichibashi et al. have already reported that the above-mentioned simplified fuzzy inference becomes a linear multiple function (Ichibashi et al., "Learning Control by Fuzzy Models Using a Simplified Fuzzy Reasoning", Nippon fuzzy society report, Vol. 2, No. 3, pp. 429–437). A method of inference based on the linear multiple function is suitable for a real time control due to its low cost of calculation.

Figure 7:
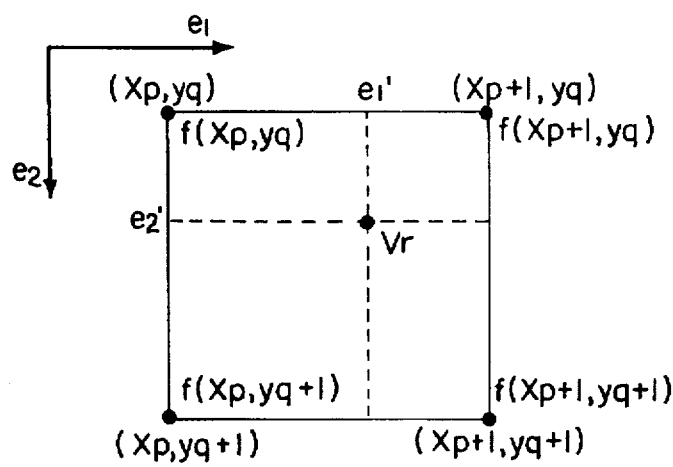
FIG. 7 is a view illustrating a linear multiple function.

According to the linear multiple function, the degree of backlight is obtained by inserting the real number $f_i$. FIG. 7 shows four points on an input space ($e_1$, $e_2$) and a real number for each point. Here, the real number $f_i$ is represented by $f(x_p, y_q)$. The inference result $u_r$ is obtained by using a real number for four points, employing the Formula (5) as follows:

If $x_p \leq e_1 < x_{p+1}, y_q \leq e_2 < y_{q+1}$, then $$u_r = x^* y^* f(x_{p+1}, y_{q+1}) + (1-x)^* y^* f(x_p, y_{q+1}) + x^*(1-y)^* f(x_{p+1}, y_q) + (1-x)^*(1-y)^* f(x_p, y_q) \quad (6)$$

where $x = (e_1 - x_p)/(x_{p+1} - x_p)$ $y = (e_2 - y_q)/(y_{q+1} - y_q)$

Figure 8:
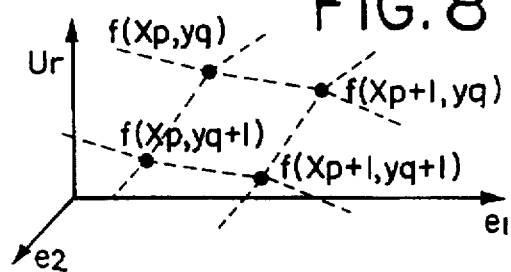
FIG. 8 is another view illustrating a linear multiple function.
Figure 9:
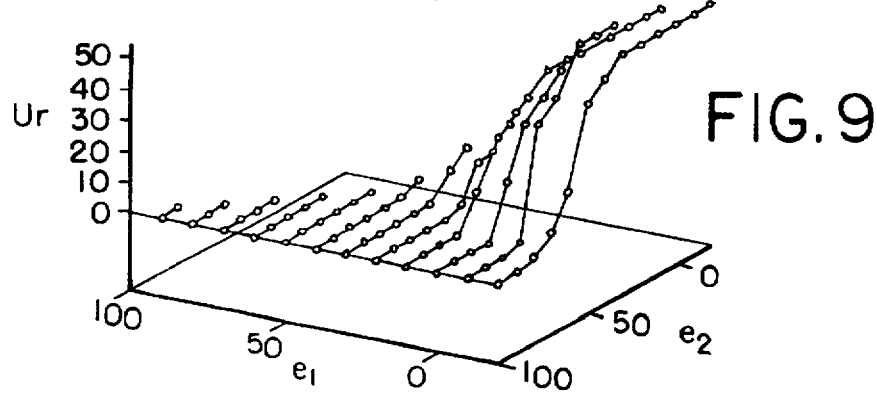
FIG. 9 is still another view illustrating a linear multiple function.

As shown in FIG. 8, a linear multiple function can be formed by connecting the space inserted by the four points mentioned above. The degree of backlight $u_r$ suitable for various images can be obtained as a non-linear amount by successively determining a real number $f(x_p, y_q)$ from an image under a backlight state. FIG. 9 shows an example in which the degree of backlight is represented by the linear multiple function. When both of $e_1$ and $e_2$ become low values, the degree of backlight is increased in a non-linear manner.

The target luminance calculation unit 9 sets a target value of an average luminance of an image frame for each vertical scanning (frame or field), based on the degree of backlight $u_r$ obtained by the backlight degree calculation unit 16. Specifically, the target luminance calculation unit 9 calculates the target luminance Yall' by the following Formula (7) in the same way as in the Formula (3).

$$Yall' = Yinit *(1 + u_r) \quad (7)$$

where Yinit is an initial target luminance.

As described above, according to the present example, a plurality of average values of low luminance regions are obtained, and degrees of backlight are integrated by the fuzzy inference or the linear multiple function, whereby a stable backlight correction suitable for a human being's feeling can be performed.

Example 3

FIG. 10 is a third example of an automatic exposure control apparatus according to the present invention. The same reference numerals as those of Example 1 are marked for the same components as those of Example 1. The same components as those of Example 1 function in the same way as in Example 1.

The image frame luminance average calculation unit 7 calculates an average luminance Yall of an image frame, based on the signal from the pickup element 3. The diaphragm control unit 8 compares the average luminance Yall with a target luminance Yall' obtained by the target luminance calculation unit 9, and controls the diaphragm to be opened or closed so that the difference between the average luminance Yall and the target luminance Yall' is made 0, whereby the average luminance Yall is kept substantially equal to the target luminance Yall'. For example, in the case where a dynamic range of the pickup element 3 is 0 to 255 (8-bit information), the target luminance Yall' is set at 127 (central value) in the ordinary exposure control.

An image frame is divided into an upper region and a lower region as shown in FIG. 11A. An upper/lower regions luminance average comparison unit 17 calculates an average luminance of the upper and lower regions of the image frame, based on a signal from the pickup element 3.

The image frame is also divided into a plurality of small regions. For example, the image frame is divided into 80 small regions (8 divisions in a vertical direction and 10 divisions in a horizontal direction) as shown in FIG. 11B. A small region luminance average calculation unit 18 calculates an average luminance of each small region of the image frame. The luminance of a small region is represented by an average luminance of pixels included in the small region. Thus, the apparent number of pixels is 80.

The degree of backlight is obtained in the same way as in Example 2. A low luminance average calculation unit 19 arranges each average luminance of each small region in the order of low luminance as shown in FIG. 6, and calculates an average value of low luminance regions. Next, a backlight degree calculating unit 20 calculates a backlight degree $u_r$ by fuzzy inference or a linear multiple function.

The degree of excessive frontlight is obtained by using a luminance order characteristic. As shown in FIG. 12 and the following Formula (8), a high luminance average calculation unit 21 calculates an average value from the Mth pixel to the highest luminance.

$$e_3 = \sum_{i=M}^{80} v(i)/(80 - M) \quad (8)$$

where $e_3$ As an average value of high luminance regions, v(i) is a luminance level of the ith pixel from the lowest luminance level, and M is a pixel number.

An excessive frontlight degree calculation unit 22 calculates an excessive frontlight degree $w_r$ by converting $e_3$ by the use of a linear multiple function and the like.

Figure 13:
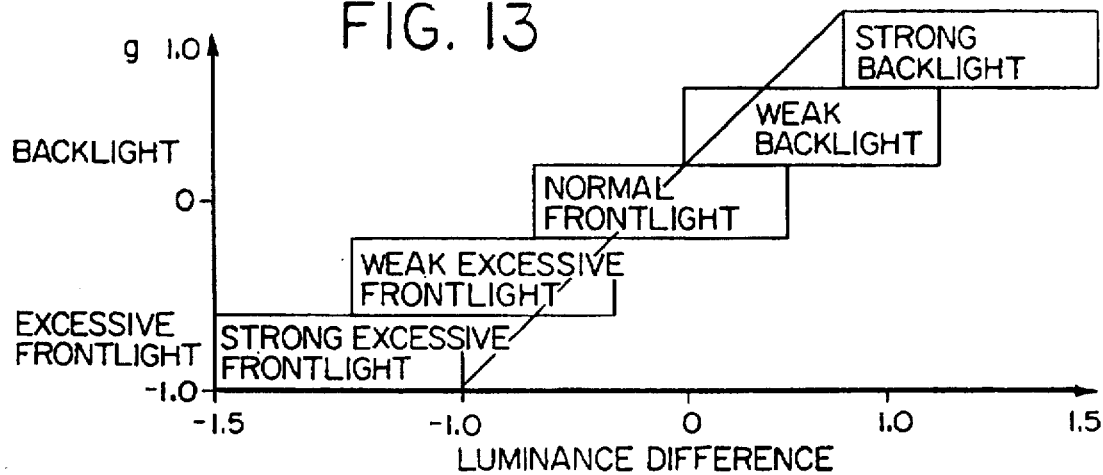
FIG. 13 is a view illustrating backlight and excessive frontlight based on a luminance ratio between the upper and lower regions of an image frame.

A degree determination unit 23 determines a final correction amount, based on the backlight degree $u_r$ and the excessive frontlight degree $w_r$. The degree determination unit 23 judges whether the image frame is in a backlight state or in an excessive frontlight state, based on a luminance difference between the upper region and the lower region of an image frame. Specifically, the degree determination unit 23 calculates the luminance difference by the following Formula (9), and converts the luminance difference into a real value g within an interval [−1, 1]. FIG. 13 shows a conversion diagram from the luminance difference to the real value g.

Luminance difference=(Average luminance of upper region)−(Average luminance of lower region) (9)

A correction amount z is obtained by the following Formula (10).

If $g \leq 0$, then $z = w_r * g$ (10)

If $g > 0$, then $z = u_r * g$

When a camera direction or luminance of an image frame are greatly changed, the luminance difference between the upper and lower regions is changed. Therefore, even though the luminance difference between the upper and lower regions is changed, an image which is hardly seen cannot be obtained. Thus, the luminance difference between the upper and lower regions can be used to judge whether the image frame is in a backlight state or in an excessive frontlight state.

The target luminance calculation unit 9 sets a target value of an average luminance of an image frame for each vertical scanning (frame or field), based on the correction amount z obtained by the degree determination unit 23. Specifically, the target luminance calculation unit 9 calculates the target luminance Yall' by the following Formula (11).

Yall'=Yinit*(1+z) (11)

where Yinit is an initial target luminance.

The diaphragm control unit 8 regulates a diaphragm so that the average luminance Yall is kept at the above-mentioned target luminance Yall'. When the upper region of an image frame is brighter than the lower region thereof, the image frame is judged to be in a backlight state. Then, a correction is made based on the degree of backlight. In contrast, when the upper region is darker than the lower region, the image frame is judged to be in an excessive frontlight state. Then, a correction is made based on the degree of excessive frontlight.

As described above, according to the present example, the degree of backlight is obtained based on an average value of low luminance regions and the degree of excessive frontlight is obtained based on an average value of high luminance regions. Each degree is selectively regulated in accordance with results obtained by comparing the average luminance of the upper region with that of the lower region, whereby a stable correction suitable for a human being's feeling can be performed.

In the present example, the judgment whether it is in a backlight state or in a excessive frontlight state is made based on the luminance difference. It is apparent that the same effects can be obtained even if the ratio between the average luminance of the upper region and the average luminance of the lower region is used instead of the luminance difference.

Example 4

Figure 14:
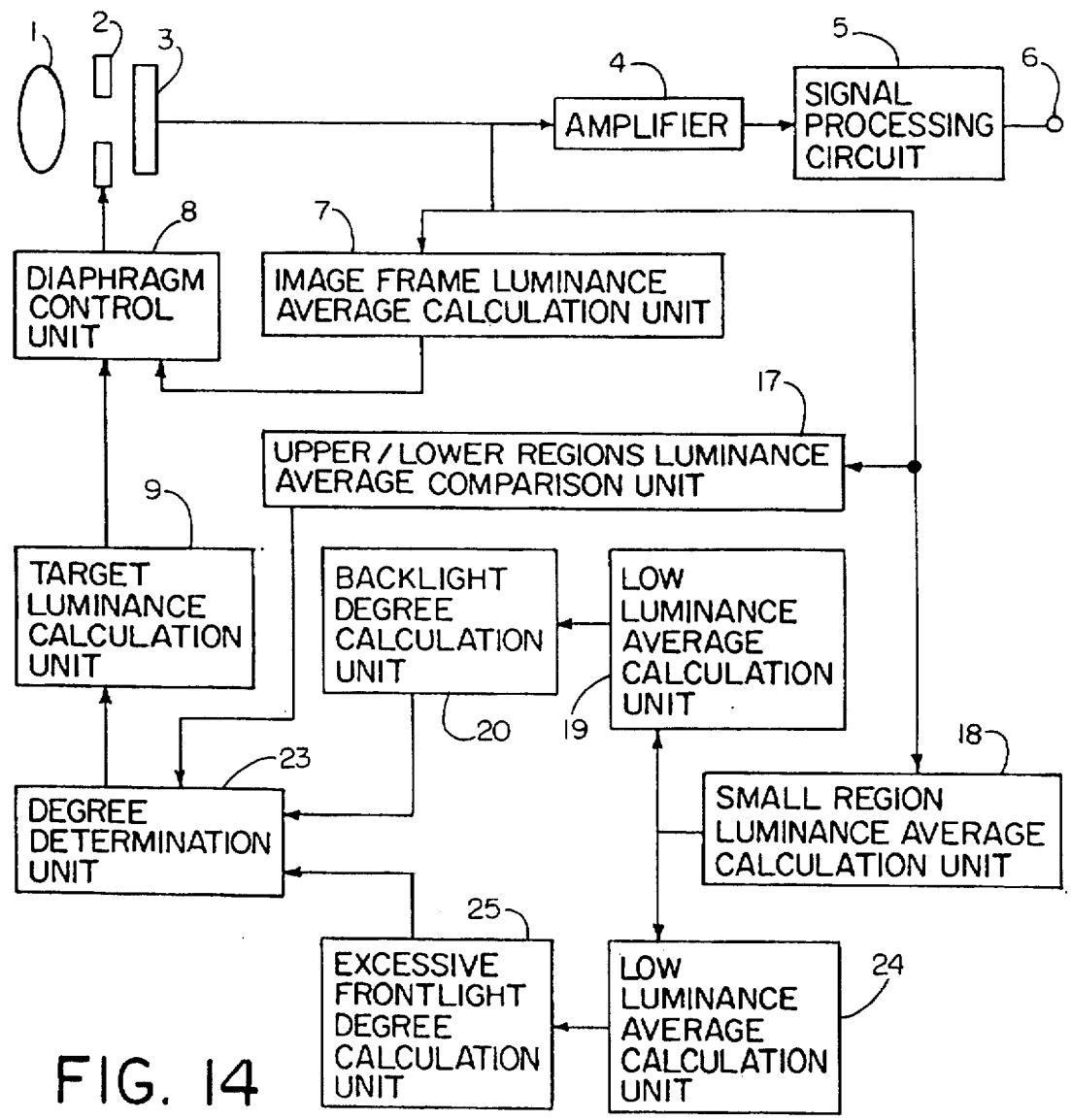
FIG. 14 is a block diagram showing an automatic exposure control apparatus of Example 4 according to the present invention.

FIG. 14 shows a forth example of an automatic exposure control apparatus according to the present invention. The reference numerals of Example 4 are marked for The same components as those of Example 3. The same components as those of Example 4 function in the same way as in Example 3. The difference between Examples 3 and 4 is in the functions of the high luminance average calculation unit 21 and the excessive frontlight degree calculation unit 22. In the present example, a low luminance average calculation unit 24 and an excessive frontlight degree calculation unit 25 are provided instead of the high luminance average calculation unit 21 and the excessive frontlight degree calculation unit 22.

In the case where there are a great number of low luminance regions in an image frame, there are a few high luminance regions in the image frame. Accordingly, such an situation may be considered to be in an excessive frontlight state. The excessive frontlight degree is obtained in the same way as in the backlight degree. The low luminance average calculation unit 19 arranges respective average luminances of each small region in the increasing order of the low luminance as shown in FIG. 6, and calculates an average value of low luminance regions. Then, an excessive frontlight degree calculation unit 25 calculates the degree of excessive frontlight by the use of fuzzy inference or a linear multiple function. The degree determination unit 23 determines a final correction amount based on the backlight degree and the excessive frontlight degree.

As described above, according to the present example, the degrees of backlight and excessive frontlight are obtained based on an average value of low luminance regions. Each degree is selectively regulated in accordance with results obtained by comparing the average luminance of the upper region with that of the lower region, whereby a stable correction suitable for a human being's feeling can be performed.

In the present example, the judgment as to whether it is in a backlight state or in a excessive frontlight state is made based on the luminance difference. It is apparent that the same effects can be obtained even if the ratio between the average luminance of the upper region and the average luminance of the lower region is used instead of the luminance difference.

Example 5

Hereinafter, a fifth example of the present invention will be described. The present example has an additional objective of preventing a misjudgment with respect to an excessive frontlight image where an object moves up and down.

Figures 15A, 15B, 15C:
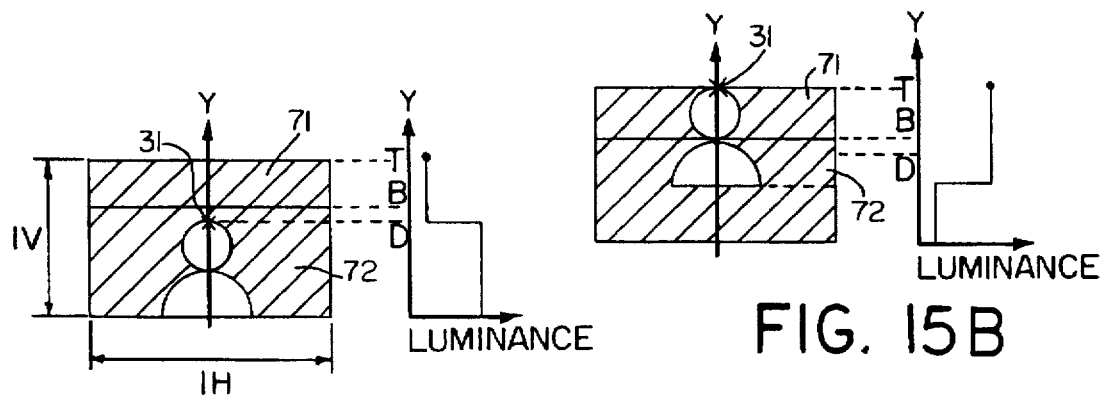
FIG. 15A shows an excessive frontlight image in which an object is present at a central position D of an image frame together with luminance at each position.
FIG. 15B shows an excessive frontlight image in which an object is present at a top end position T of the image frame together with luminance at each position.
FIG. 15C shows changes of an average luminance of the upper and lower regions while the object moves from the central position D to the top end position T.

As shown in FIGS. 15A and 15B, there has been a problem in that the misjudgment mentioned above causes the saturation of the luminance of the object, resulting in forming a white image of the object. FIGS. 15A and 15B show excessive frontlight images where an object moves up and down; and FIG. 15C shows changes of an average luminance 141 of an upper region 71 and an average luminance 142 of a lower region 72 when the object moves up and down. Here, the position of the object is represented by a head top 31 thereof.

When the object stays at the position D, the average luminance 141 is lower than the average luminance 142, as shown in FIG. 15C. Therefore, the judgment that the image frame is in an excessive frontlight state is made. This is a correct judgment. However, when the object moves from the position D to the position T, the average luminance 141 becomes higher than the average luminance 142. This is the reason why the misjudgment occurs. To avoid such a misjudgment, improvements will be described below.

Figure 16:
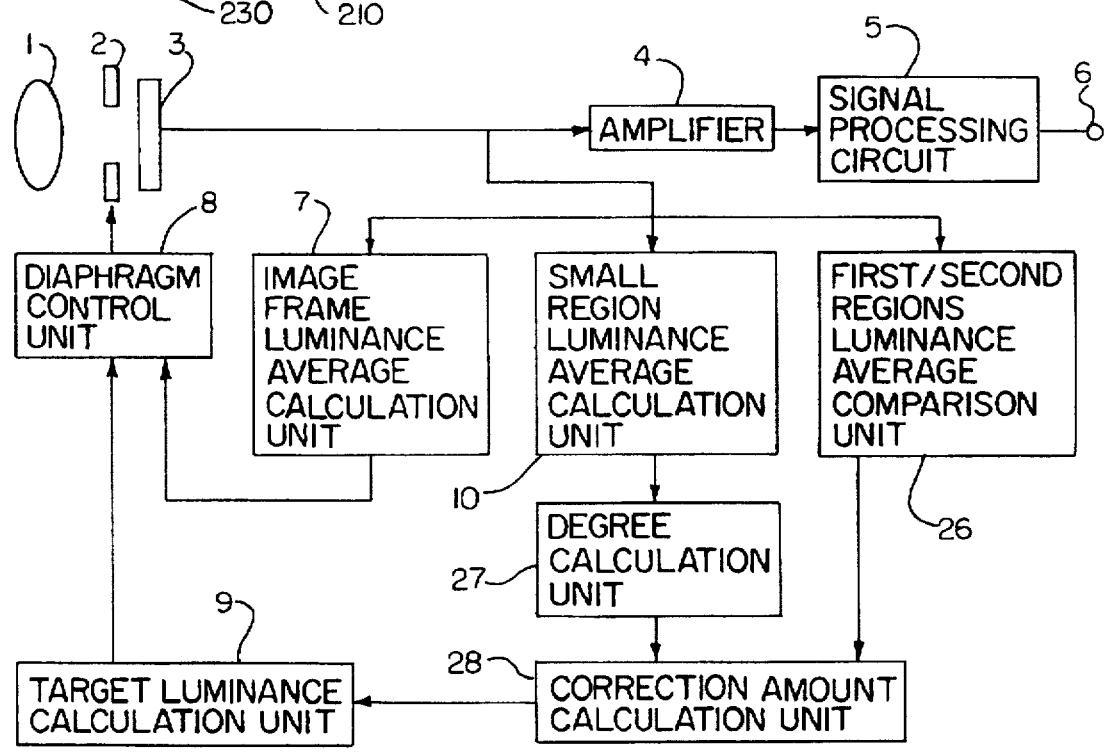
FIG. 16 is a block diagram showing an automatic exposure control apparatus of Example 5 according to the present invention.

FIG. 16 is a fifth example of an automatic exposure control apparatus according to the present invention. The same reference numerals as those of the previous examples are marked for the same components as those of the preceding ones. The same components as those of the preceding examples function in the same way as those of the preceding examples.

An image of an object is formed on the pickup element 3 through the lens 1 and the diaphragm 2, and is converted to an electric signal. The signal is amplified by the amplifier 4. Then, the signal is subjected to a γ treatment while passing through the signal processing circuit 5 and is transmitted to the video signal output terminal 6. At this time, a diaphragm control is performed based on the signal obtained from the pickup element 3 as follows:

An image frame luminance average calculation unit 7 calculates an average luminance of an image frame, based on the signal from the pickup element 3. The diaphragm control unit 8 compares the average luminance with a target luminance obtained by the target luminance calculation unit 9, and controls the diaphragm to be opened or closed so that the difference between the average luminance and the target luminance is made 0, whereby the average luminance is kept substantially equal to the target luminance.

A small region luminance average calculation unit 10 calculates an average luminance in each of a plurality of small regions based on the signal from the pickup element 3 so as to obtain a luminance order characteristic of the luminance levels.

The degree calculation unit 27 calculates an average value of low luminance regions from the luminance order characteristic. The average luminance of low luminance regions is converted into, a non-linear manner by fuzzy inference or the like, whereby a backlight degree $u_r$ representing the degree of backlight of a pickup image is calculated. In addition, an average luminance of high luminance regions is calculated from the luminance order characteristic, and the average luminance is converted in a non-linear manner by fuzzy inference, whereby an excessive frontlight degree $w_r$ is calculated.

Figure 17:
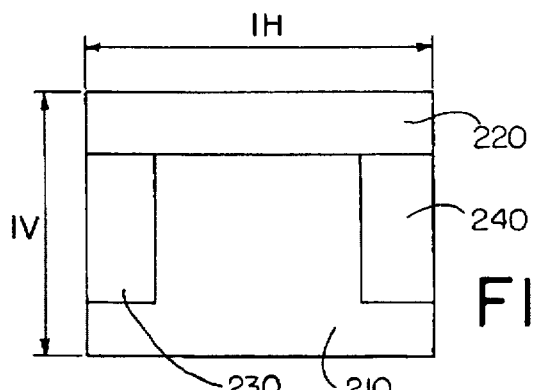
FIG. 17 shows an image frame divided into an upper region, a right region, a left region, and a lower central region.

The image frame is divided into a lower central region 210, an upper region 220, a left region 230, and right region 240 as shown in FIG. 17.

Now, we introduce the following definitions:

(1) A region X is one of the left region 230 and the right region 240, which has a lower average luminance than the other.

(2) A region Y is one Of the left region 230 and the right region 240, which has a higher average luminance than the other.

(3) A first region is a combination of the region X with the upper region 220.

(4) A second region is a combination of the region Y with the lower central region 210.

A first/second regions luminance average comparison unit 26 calculates an average luminance of each region, and a difference p between an average luminance of the second region and an average luminance of the first region. The degrees of backlight and excessive frontlight, and the difference p ere transmitted to a correction amount calculation unit 28.

The correction amount calculation unit 28 judges the image frame to be in a backlight state in the case where the average luminance of the first region is higher than that of the second region, and judges the image frame to be in an excessive frontlight state in the case where the average luminance of the first region is lower than that of the second region. These judgments are based on the tendency that an image frame is likely to be in a backlight state when an upper region of the image frame is brighter than the lower region thereof, and that the image frame is likely to be in an excessive frontlight state otherwise. In addition, the correction amount calculation unit 28 converts the luminance difference p into a gain g used for calculating the correction amount z as shown in FIG. 13. A correction amount z is calculated by the following Formula (12), based on the backlight degree $u_r$, the excessive frontlight degree $w_r$, the gain g and the result of the judgment between the backlight and the excessive frontlight.

$$\text{If } p \leq 0, \text{ then excessive frontlight}, z = g * w_r \qquad (12)$$

$$\text{If } p > 0, \text{ then backlight}, z = g * u_r$$

The relationship between the respective average luminance of the first and second regions obtained by the first/second regions luminance average comparison unit 26 and the movement of an object will be described in detail with reference to FIGS. 18A to 18C, 19A to 19C and 20A to 20D.

FIGS. 18A and 18B show excessive frontlight images in the case where an object moves up and down; and FIG. 18C shows changes of an average luminance 32 of the first region and of an average luminance 33 of the second region. Here, the position of the object is represented by the head top 311 thereof. As shown in FIG. 18C, the average luminance 32 of the first region does not exceed the average luminance 33 of the second region, while the object moves from a central position D to a top end position T. Thus, a misjudgment is not made with respect to the excessive frontlight image where an object moves up and down, so that neither the gain g nor the correction amount z do not change.

Hereinafter, a correction amount z with respect to a backlight image in which an object moves from side to side; and a correction amount z with respect to a backlight image in which an object is present on the right side of an image frame and a dark substance gets in and out of the left side thereof will be described.

FIGS. 19A and 19B show backlight images where an object moves from side to side; and FIG. 19C shows changes of an average luminance 32 of the first region and an average luminance 33 of the second region while the object moves from a right position R to a left position L. As shown in FIG. 19C, while the object moves from the right position R to the left position L, the average luminance 33 of the second region does not exceed the average luminance 32 of the first region.

FIGS. 20A and 20B show backlight images where an object is present on the right side of an image frame and a dark substance gets in and out of the left side thereof; and FIG. 20C shows changes of an average luminance 32 of the first region and an average luminance 33 of the second region. Here, the position of the substance is represented by a right end 51 thereof. As shown in FIG. 20C, while the substance moves from the left end of the image frame to the boundary L of the left region 230 and the lower central region 210, an average luminance 33 of the second region does not exceed an average luminance 32 of the first region.

Thus, a misjudgment is not made with respect to a backlight image where an object moves from side to side and with respect to a backlight image where an object is present on the right side of the image frame and a dark substance gets in and out of the left side thereof. Therefore, for the same reasons as described above, neither the gain g nor the correction amount z change.

FIG. 20D shows changes of the average luminance 32 of the first region and the average luminance 33 of the second region, with respect to a backlight image where an object is present on the right side of the image frame and a dark substance gets in and out of the left side thereof. In this case, an image frame is divided so that the sum of the vertical length of the right region and that of the upper region and the sum of the vertical length of the left region end that of the upper region respectively coincide with the vertical length of the image frame. As shown in FIG. 20D, while the substance moves from the left end of the image frame to the boundary L of the left region 230 and the lower central region 210, the average luminance 32 of the first region exceeds the average luminance 33 of the second region. Thus, a misjudgment is made. However, when the image frame is divided so that the sum of the vertical length of the right region and that of the upper region and the sum of the vertical length of the left region and that of the upper region are respectively made smaller than the vertical length of the image frame, a misjudgment as described above is not made. Therefore, it is required that the image frame is divided so that the sum of the vertical length of the right and that of the upper region and the sum of the left region and that of the upper region are respectively made smaller than the vertical length of the image frame.

The target luminance calculation unit 9 sets a target value of an average luminance of an image frame for each vertical scanning, by adding the correction amount z obtained by the correction amount calculation unit 28 to a predetermined target luminance. The diaphragm control unit 8 regulates a diaphragm so that the average luminance of the image frame is kept substantially equal to the target value.

As described above, an appropriate exposure of an object for a backlight image where an object moves from side to side and a backlight image where a dark substance gets in and out of one side of the image frame is obtained.

In the present example, the judgment whether it is in a backlight state or in a excessive frontlight state is made based on the luminance difference. It is apparent that the same effects can be obtained even if the ratio between the average luminance of the upper region and the average luminance of the lower region is used instead of the luminance difference.

Example 6

A sixth example of an automatic exposure control apparatus according to the present invention will be described with reference to FIG. 21. The same reference numerals as those of Example 5 are marked for the same components as those of Example 5. The same components as those of Example 5 function in the same way as in Example 5.

An image of an object is formed on the pickup element 3 through the lens 1 and the diaphragm 2, and is converted to an electric signal. The signal is amplified by the amplifier 4. Then, the signal is subjected to a γ treatment while passing through the signal processing circuit 5 and is transmitted to the video signal output terminal 6. At this time, a diaphragm control is performed based on the signal obtained from the pickup element 3 as follows:

An image frame luminance average calculation unit 7 calculates an average luminance of an image frame, based on the signal from the pickup element 3. The diaphragm control unit 8 compares the average luminance with a target luminance value obtained by the target luminance calculation unit 9, and controls the diaphragm to be opened or closed so that the difference between the average luminance and the target luminance is made 0, whereby the average luminance is kept substantially equal to the target luminance.

A small region luminance average calculation unit 10 calculates an average luminance in each of a plurality of small regions based on the signal from the pickup element 3 so as to obtain a luminance order characteristic of the luminance levels.

The degree calculation unit 27 calculates an average value of low luminance regions from the luminance order characteristic. The average luminance of low luminance regions is converted in a non-linear manner by fuzzy inference or the like, whereby a backlight degree $u_r$ representing the degree of backlight of a pickup image is calculated. In addition, an average luminance of high luminance regions is calculated from the luminance order characteristic, and the average luminance is converted in a non-linear manner by fuzzy inference, whereby an excessive frontlight degree $w_r$ is calculated.

An image frame is divided into a lower central region 210, an upper region 220, a left region 230, and a right region 240 as shown in FIG. 17.

Now, we introduce the following definitions:

(1) A region X is one of the left region 230 and the right region 240, which has a lower average luminance than the other.

(2) A region Y is one of the left region 230 and the right region 240, which has a higher average luminance than the other.

(3) A first region is a combination of the region X with the upper region 220.

(4) A second region is a combination of the region Y with the lower central region 210.

The first/second regions luminance average comparison unit 26 calculates an average luminance of each region and a luminance ratio $p_1$ of an average luminance of the second region to that of the first region.

A first judgment unit 61 judges whether the image frame is in a backlight state or in an excessive frontlight state, based on the luminance ratio $p_1$ obtained by the first/second regions luminance average comparison calculation unit 26 in the same way as in Example 5. A judgment value $j_1$ is determined by the following Formula (13):

$$\text{If } p_1 \leqq 1, \text{ then excessive frontlight}, j_1 = 0 \qquad (13)$$

If $p_1 > 1$, then backlight, $j_1 = 1$ where the judgment values are either 0 or 1; the judgment value 0 refers to excessive frontlight, and the judgment value 1 refers to backlight.

A second judgment unit 62 divides an image frame into an upper region 71 and a lower region 72 as shown in FIG. 22, and calculates an average luminance ratio $p_2$ therebetween. The second judgment unit 62 judges an image frame to be in a backlight state in the case where an average luminance of the upper region 71 is higher then that of the lower region 73; and judges the image frame to be in an excessive frontlight state in the case where an average luminance of the upper region 71 is lower than that of the lower region 72. A judgment value $j_2$ is calculated by the following Formula (14).

If $p_2 \leq 1$, then excessive frontlight, $j_2 = 0$     (14)

If $p_2 > 1$, then backlight, $j_2 = 1$

A correction amount calculation unit 63 calculates a correction amount $z_1$, based on the backlight degree $u_r$, the excessive frontlight degree $w_r$, the judgment value $j_1$, and the judgment value $j_2$ by the following Formula (15).

If $j_1 * j_2 = 0$, then excessive frontlight, $z_1 = -1 * w_r$     (15)

If $j_1 * j_2 = 1$, backlight, $z_1 = u_r$

As is understood the Formula (15), when either one of the judgment values $j_1$ or $j_2$ is 0, it is judged to be in an excessive frontlight state; and when both of the judgment values $j_1$ and $j_2$ are 1, it is judged to be in a backlight state.

The relationship between the movement of the object and the respective average luminance of the first and second regions, and the upper and lower regions will be described with reference to FIGS. 23A to 23C, 24A to 24C, 25A to 25C, and 26A to 26C. As described above, the respective average luminances of the first and second regions are obtained by the first/second regions luminance average comparison unit 26; and the respective average luminances of the upper and lower regions are obtained by the second judgment unit 62.

FIGS. 23A and 23B show excessive frontlight images where an object moves up and down; and FIG. 23C shows changes of an average luminance 32 of the first region, an average luminance 33 of the second region, an average luminance 81 of the upper region, and an average luminance 82 of the lower region, while the object moves from a central position D to a top end position T. Here, the position of the object is represented by a head top 31 thereof. As shown in FIG. 23C, while the object moves from the central position D to the top end position T, the average luminance 32 of the first region does not exceed the average luminance 33 of the second region. Therefore, a misjudgment is not made and a correction amount $z_1$ does not change.

Hereinafter, a correction amount $z_1$ with respect to a backlight image where an object moves from side to side; a correction amount $z_1$ with respect to a backlight image where an object is present on the right side of an image frame and a dark substance gets in and out of the left side thereof; a correction amount $z_1$ with respect to a backlight image where an object is present on the right side of the image frame and a bright substance gets in and out of the right side thereof will be described.

FIGS. 24A and 24B show backlight images in the case where an object moves from side to side; and FIG. 24C shows changes of an average luminance 32 of the first region, an average luminance 33 of the second region, an average luminance 81 of the upper region, and an average luminance 82 of the lower region, while the object moves from a right position R to a left position L. Here, the position of the object is represented by a head top 31 thereof. As shown in FIG. 24C, while the object moves from the right position R to the left position L, the average luminance 32 of the first region and the average luminance 33 of the second region do not change. Therefore, the correction amount $z_1$ does not change.

Figure 25C:
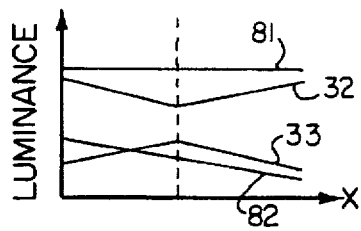
FIG. 25C is a graph showing changes of an average luminance of the first and second regions, and upper and lower regions while the object is present on the right side of the image frame and the dark substance moves from the left side of the image frame to a boundary position L thereof.

FIGS. 25A and 25B show backlight images in the case where an object is present on the right side of an image frame and a dark substance gets in and out of the left side thereof; and FIG. 25C shows changes of an average luminance 32 of the first region, an average luminance 33 of the second region, an average luminance 81 of the upper region, and an average luminance 82 of the lower region. Here, the position of the substance is represented by a right end 51 thereof. As shown in FIG. 25C, while the substance moves from the left end of the image frame to the boundary L of the left region 230 and the lower central region 210, the average luminance 33 of the second region does not exceed the average luminance 32 of the first regions and the average luminance 82 of the lower region does not exceed the average luminance 81 of the upper region. Therefore, a misjudgment is not made, and the correction amount $z_1$ does not change.

Figures 26A, 26B:
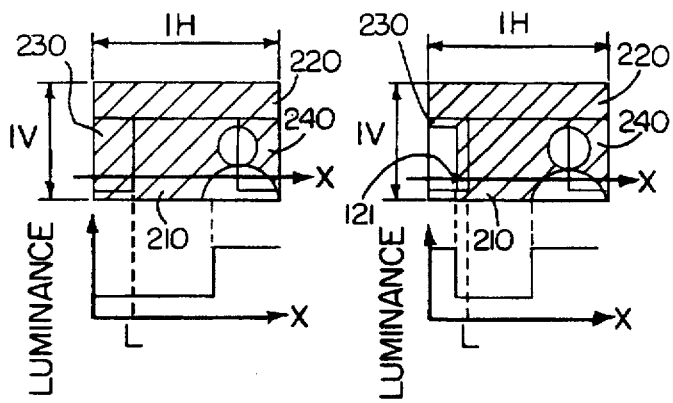
FIG. 26A shows an excessive frontlight image in which an object is present on the right side of an image frame together with luminance at each position.
FIG. 26B shows an excessive frontlight image in which the object is present on the right side of the image frame and a bright substance is present in the left side thereof.
Figure 26C:
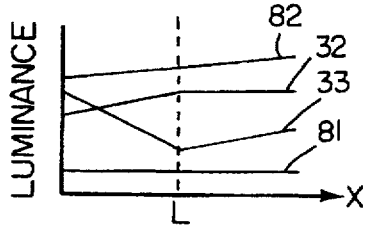
FIG. 26C is a graph showing changes of an average luminance of the first and second regions, and the upper and lower regions while the object is present on the right side of the image frame and the bright substance moves from the left side of the image frame to a boundary position L thereof.

FIGS. 26A and 26B show excessive frontlight images in the came where an object is present on the right side of the image frame and a bright substance gets in and out of the left side thereof; and FIG. 26C shows changes of an average luminance 32 of the first region, an average luminance 33 of the second region, an average luminance 81 of the upper region, and an average luminance 82 of the lower region. Here, the position of the substance is represented by a right end 121 thereof. As shown in FIG. 26C, while the substance moves from the left end of the image frame to the boundary L of the left region 230 and the lower central region 210, the average luminance 81 of the upper region does not exceed the average luminance 82 of the lower region. Thus, a misjudgment is not made, and the correction amount $z_1$ does not change.

As described above, for the same reasons as described with reference to FIGS. 25A to 25C, a misjudgment is not made with respect to a backlight image where an object moves from side to side, a backlight image where an object is present on the right side of the image frame and a dark substance gets in and out of the left side thereof, and an excessive frontlight image where an object is present on the right side of the image frame and a bright substance gets in and out of the left side thereof. Thus, the correction amount $z_1$ does not change.

The target luminance calculation unit 9 sets a target value of an average luminance of an image frame for each vertical scanning (frame or field), by adding the correction amount $z_1$ obtained by the correction amount calculation unit 63 to a predetermined target luminance. The diaphragm control unit 8 regulates a diaphragm so that the average luminance of the image frame is kept substantially equal to the target value.

As described above, an appropriate exposure of an object for an excessive frontlight image where the object moves up end down, a backlight image where the object moves from side to side, a backlight image where a dark substance gets in and out of one side of the image frame, and a backlight image where a bright substance gets in and out of both sides of the image frame can be obtained.

In the present example, the judgment is made as to whether it is in a backlight state or in an excessive frontlight state is based on the luminance ratio. It is apparent that the same effects can be obtained even if the difference between the average luminance of the upper region and the average luminance of the lower region is used instead of the luminance ratio.

Example 7

A seventh example of the present invention will be described. The present example overcomes the following problem; An excessive frontlight image where a central region of an image frame is bright and a lower region thereof is dark is misjudged to be in a backlight state and the luminance of a main object is saturated so as to become white. This phenomenon is often caused in the case where an outdoor scene is taken from an indoor side.

Figure 27A:
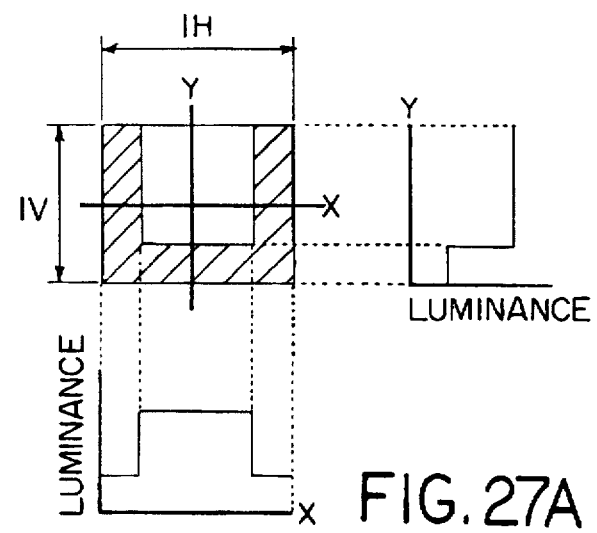
FIG. 27A shows an excessive frontlight image divided into a bright area and a dark area together with luminance at each position.
Figure 28:
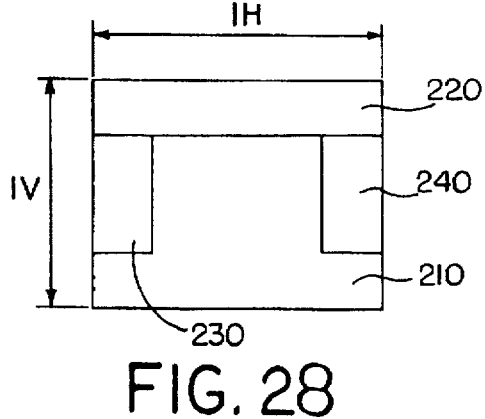
FIG. 28 is an image frame divided into an upper region, a right region, a left region, and a lower central region.
Figure 27B:
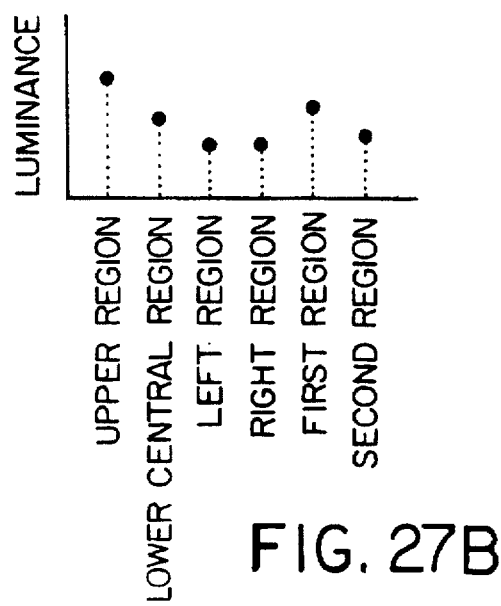
FIG. 27B is a graph showing the relationship between the luminance and the respective regions of FIG. 27A.

FIG. 27A shows an excessive frontlight image where a central region of an image frame is bright and the remaining region thereof is dark; and FIG. 27B shows an average luminance of a lower central region 210, an upper region 220, a left region 230, a right region 240, a first region and a second region, obtained by dividing the image frame as shown in FIG. 28. Here, the first region corresponds to a combination of the left or right region which has a higher luminance and the upper region; and the second region corresponds to a combination of the left or right region which has a lower luminance and the lower region.

As is understood from FIG. 27B, since the average luminance of the first region is higher than that of the second region, the image frame is misjudged to be in a backlight state.

The present example is one embodiment for overcoming this problem. Its objective is to provide an automatic exposure control apparatus which does not misjudge an excessive frontlight image where a central region of an image frame is bright and the remaining region thereof is dark. In addition, the apparatus also does not misjudge a backlight image where an object moves from side to side and an excessive frontlight image where an object moves up and down.

FIG. 29 shows a seventh example of an automatic exposure control apparatus according to the present invention, the same reference numerals as those of the preceding examples are marked for the same components as those of the preceding examples. The same components as those of the preceding examples function in the same way as in the preceding examples.

An image of an object is formed on the pickup element 3 through the lens 1 and the diaphragm 2, and is converted to an electric signal. The signal is amplified by the amplifier 4. Then, the signal is subjected to a γ treatment while passing through the signal processing circuit 5 and is transmitted to the video signal output terminal 6. At this time, a diaphragm control is conducted based on the signal obtained from the pickup element 3 as follows:

An image frame luminance average calculation unit 7 calculates an average luminance of an image frame, based on the signal from the pickup element 3. The diaphragm control unit 8 compares the average luminance with a target luminance obtained by the target luminance calculation unit 9, and controls the diaphragm to be opened or closed so that the average luminance is kept substantially equal to the target luminance.

A small region luminance average calculation unit 10 calculates an average luminance in each of a plurality of small regions based on the signal from the pickup element 3 so as to obtain a luminance order characteristic of the luminance levels.

The degree calculation unit 27 calculates an average value of low luminance regions from the luminance order characteristic. The average luminance of low luminance regions is converted in a non-linear manner by fuzzy inference or the like, whereby a backlight degree $u_r$ representing the degree of backlight of a pickup image is calculated. In addition, an average luminance of high luminance regions is calculated from the luminance order characteristic, and the average luminance is converted in a non-linear manner by fuzzy inference, whereby an excessive frontlight degree $w_r$ is calculated.

An image frame is divided into the lower central region 210, the upper region 220, the left region 230, and the right region 240 as shown in FIG. 28.

Now, we introduce the following definitions:

(1) A region X is one of the left region 230 and the right region 240, which has a lower average luminance than the other.

(2) A region Y is one of the left region 230 and the right region 240, which has a higher average luminance than the other.

(3) A first region is a combination of the region Y with the upper region 220.

(4) A second region is a combination of the region X with the lower central region 210.

The first/second regions luminance average comparison unit 26 calculates an average luminance of each region and a difference p of an average luminance between the first region and the second region.

A correlation value calculation unit 29 calculates a correlation value E, based on an average luminance $S_{ij}$ and a predetermined luminance distribution $V_{ij}$ of an excessive frontlight image where a predetermined central region is bright, using the following Formula (16). Here, the $S_{ij}$ represents an average luminance of each small region of the image frame, which is normalized with an average luminance of the image frame. The $V_{ij}$ represents a predetermined luminance of each small region of the image frame. The i and j of the $V_{ij}$ and $V_{ij}$ represent a position of a small region in the image frame as shown in FIG. 30.

$$E = \sum_i \sum_j (S_{ij} - V_{ij})^2 \qquad (16)$$

The normalization of an average luminance of each small region performed by the correlation value calculation unit 29 and the predetermined luminance distribution will be described in detail with reference to FIGS. 31A, 31B, 32A, 32B, 33, 34A and 34B.

FIGS. 31A and 31B show an average luminance of each small region and an average luminance of an image frame in a case where a bright object positioned at a central region of the image frame is in an excessive frontlight state, but the bright object is taken with different diaphragm values. The image frame includes 25 small regions.

The image frames of FIGS. 31A and 31B are in the same excessive frontlight state. Accordingly, these image frames should have the same correlation values. However, if the correlation values corresponding to the image frames of FIGS. 31A and 31B were calculated based on average luminance of small regions, the calculated correlation values would all be different from each other. This is because a predetermined luminance distribution used for calculating the correlation value is fixed, and the average luminance of each small region of the image frame of FIG. 31A is different from that of FIG. 31B when the object is taken with different diaphragm values. In order to make the average luminance of each small region of the image frame of FIG. 31A equal to that of FIG. 31B when the object is taken with different diaphragm values, the average luminance of each small region is normalized with an average luminance of the image frame, which will be described below.

The average luminance of each small region of FIG. 31A and that of FIG. 31B are compared with an average luminance of an image frame. When an average luminance of a small region is larger than the average luminance of the image frame, the average luminance of the small region is made 1; and when an average luminance of a small region is smaller than the average luminance of the image frame, the average luminance of the small region is made to be 0. The results are shown in FIGS. 32A and 32B, respectively. As is understood from FIGS. 32A and 32B, the replacement of the average luminance of each small region into two values (either 0 or 1) by using the average luminance of the image frame as a threshold value causes the same luminance distribution even though the object is taken with different diaphragm values.

FIG. 33 shows a predetermined luminance distribution of an excessive frontlight image where a predetermined central region is bright. The reason why a vertical length of the predetermined luminance distribution is made smaller than that of an image frame is to distinguish an excessive frontlight image of FIG. 34A from another excessive frontlight image of FIG. 34B.

It is apparent that the same effects as those of the above can be obtained even though a plurality of values are used for normalizing an average value of each small region instead of two values, using a luminance ratio and a luminance difference.

The degrees of backlight and excessive frontlight, the average luminance difference, and the correlation value E are transmitted to the correction amount calculation unit 28.

The correction amount calculation unit 28 compares the correlation value E with a threshold value $\epsilon$. When the correlation value E is smaller than the threshold value $\epsilon$, the image frame is judged to be in an excessive frontlight state, where a central region is bright, and the correction amount z is made the excessive frontlight degree $w_r$. When the correlation value Z is larger than the threshold value $\epsilon$, the following judgments are made using the average luminance difference p: In the case where an average luminance of the first region is higher than that of the second region, the image frame is judged to be in a backlight state, and in the case where an average luminance of the first region is lower than that of the second region, the image frame is judged to be in an excessive frontlight state. These judgments are made, taking advantage of the tendency where backlight is obtained when the upper region of the image frame is brighter than the lower region thereof, and excessive frontlight is obtained when the upper region of the image frame is darker than the lower region thereof. In addition, the correction amount calculation unit 28 converts the luminance difference p into a gain g used for calculating the correction amount as shown in FIG. 13. Then, the correction amount z is calculated by the following Formula (17), based on the backlight degree $u_r$, the excessive frontlight degree $w_r$, the gain g, and the results of the judgment between the backlight and the excessive frontlight.

If $E \leq \epsilon$, then excessive frontlight, $z=w_r$,

If $E>\epsilon$ & $p \leq 0$, then excessive frontlight, $z=g^*w_r$, (17)

If $E>\epsilon$ & $p>0$, then backlight, $z=g^*u_r$,

Hereinafter, the relationship between the movement of an object and the respective average luminances of the first and second regions obtained by a first/second regions luminance average comparison unit 26 will be described in detail with reference to FIGS. 35A to 35D and 36A to 36D.

FIGS. 35A and 35B show excessive frontlight images in the case where an object moves up and down; FIG. 35C shows a change of a correlation value 92 while the object moves from the central position D of the image frame to the top end position T thereof; and FIG. 35D shows changes of an average luminance 83 of the first region and an average luminance 84 of the second region while the object moves from the central position D to the top end position T. Here, the position of the object is represented by the head top 91 thereof.

As shown in FIG. 35C, while the object moves from the central position D to the top end position T, the correlation value 92 becomes smaller than the threshold value $\epsilon$. When the correlation value 92 is equal to or less than the threshold value $\epsilon$, the image frame is judged to be in an excessive frontlight state, causing no problems. However, a problem arises when the correlation value 92 is larger than the threshold value $\epsilon$.

As shown in FIG. 35D, in the case where the correlation value 92 is larger than the threshold value $\epsilon$, while the object moves from the central position D to the top end position T, the average luminance 83 of the first region is smaller than the average luminance 84 of the second region at all times, so that the image frame is judged to be in an excessive frontlight state, making no misjudgments.

As described above, a misjudgment is not made with respect to the excessive frontlight image where the object moves up and down. Thus, neither the gain g nor the correction amount z change.

Hereinafter, the correction amount z with respect to a backlight image where the object moves from side to side will be described.

FIGS. 36A and 36B show backlight images where an object moves from side to side; FIG. 36C shows a change of a correlation value 92 while the object moves from the right position R to the left position L; and FIG. 36D shows changes of an average luminance 93 of the first region and an average luminance 94 of the second region, while object moves from the right position R to the left position L. Here, the position of the object is represented by a head top 91 thereof.

As shown in FIG. 36C, while the object moves from the right position R to the left position L, the correlation value E is larger than the threshold value $\epsilon$ at all times, so that the image frame is judged to be in a backlight or an excessive frontlight, based on an average luminance difference between the first and second regions.

As shown in FIG. 36D, while the object moves from the right position R to the left position L, the average luminance 93 of the first region is larger than the average luminance 94 of the second region at all times, so that the image frame is judged to be in a backlight state, making no misjudgment.

As described above, no misjudgments are made with respect to a backlight image where an object moves from side to side. Thus, neither the gain g nor the correction amount z change.

The target luminance calculation unit 9 sets a target value of an average luminance of an image frame for each vertical scanning (frame or field), by adding the correction amount z obtained by the correction amount calculation unit 28 to a predetermined target luminance. The diaphragm control unit 8 regulates a diaphragm so that the average luminance of the image frame is kept substantially equal to the target value.

As described above, an appropriate exposure of an object for an excessive frontlight image where the central region of the image frame is bright and the remaining region thereof is dark, an excessive frontlight image where an object moves up and down, and a backlight image where an object moves from side to side can be obtained.

It is apparent that the same effects can be obtained even though the comparison of the luminance by the first/second regions luminance average comparison unit 26 is performed by using a luminance ratio instead of a luminance difference.

Example 8

The present example also overcomes the following problem; An excessive frontlight image where a central region of an image frame is bright and a lower region thereof is dark is misjudged to be in a backlight state and the luminance of a main object is saturated to become white. This phenomenon is often caused in the case where an outdoor scene is taken from an indoor site.

Figure 37:
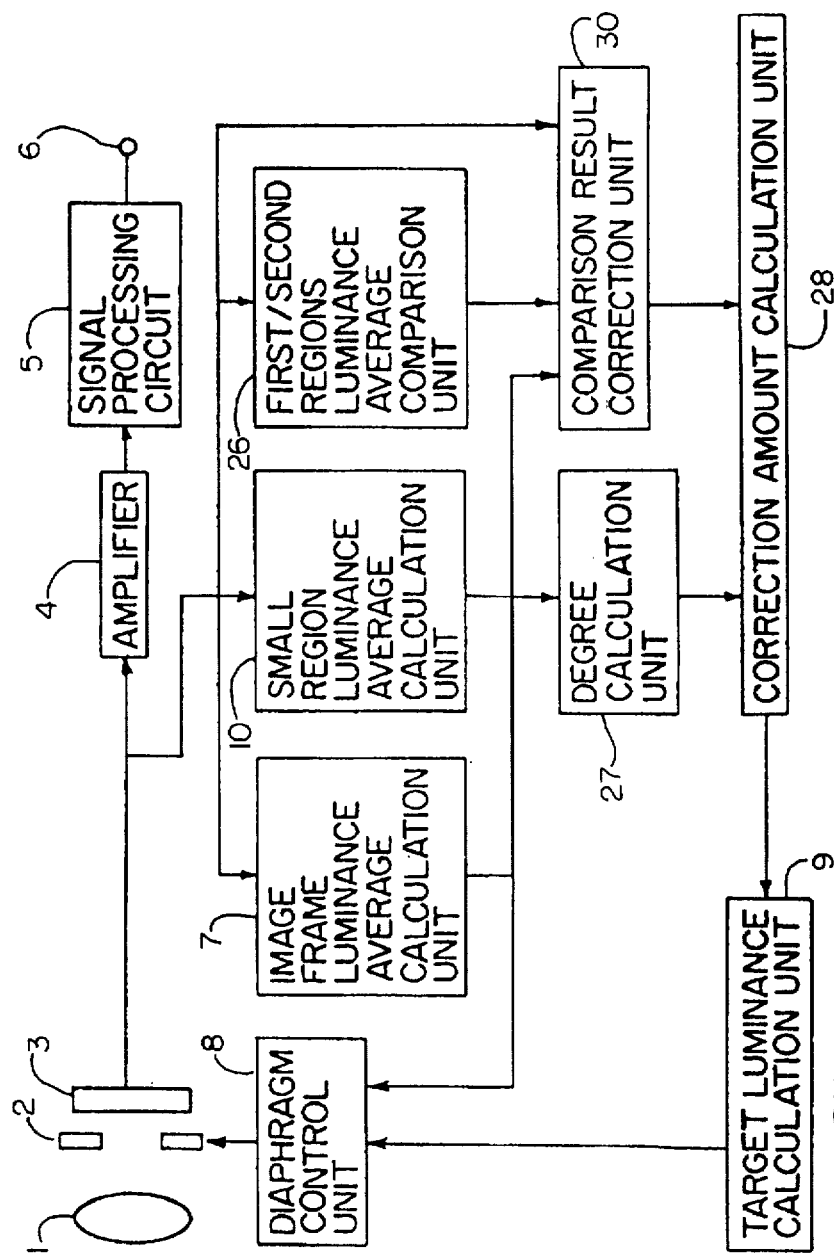
FIG. 37 As a block diagram showing an automatic exposure control apparatus of Example 8 according to the present invention.

FIG. 37 shows an eighth example of an automatic exposure control apparatus according to the present invention. The same reference numerals as those of the preceding examples are marked for the same components as those of the preceding examples. The same components as those of the preceding examples function in the same way as in the preceding examples.

An image of an object is formed on the pickup element 3 through the lens 1 and the diaphragm 2, and is converted to an electric signal. The signal is amplified by the amplifier 4. Then, the signal is subjected to a γ treatment while passing through the signal processing circuit 5 and is transmitted to the video signal output terminal 6. At this time, a diaphragm control is performed based on the signal obtained from the pickup element 3 as follows:

An image frame luminance average calculation unit 7 calculates an average luminance of an image frame, based on the signal from the pickup element 3. The diaphragm control unit 8 compares the average luminance with a target luminance obtained by the target luminance calculation unit 9, and controls the diaphragm to be opened or closed so that the difference between the average luminance and the target luminance is made 0, whereby the average luminance is kept substantially equal to the target luminance.

A small region luminance average calculation unit 10 calculates an average luminance of each of a plurality of small regions based on the signal from the pickup element 3 so as to a luminance order characteristic of the luminance levels.

The degree calculation unit 27 calculates an average value of low luminance regions from the luminance order characteristic. The average luminance of low luminance regions is converted in a non-linear manner by fuzzy inference or the like, whereby a backlight degree $u_r$ representing the degree of backlight of a pickup image is calculated. In addition, an average luminance of high luminance regions is calculated from the luminance order characteristic, and the average luminance is converted in a non-linear manner by fuzzy inference, whereby an excessive frontlight degree $w_r$ is calculated.

Figure 38:
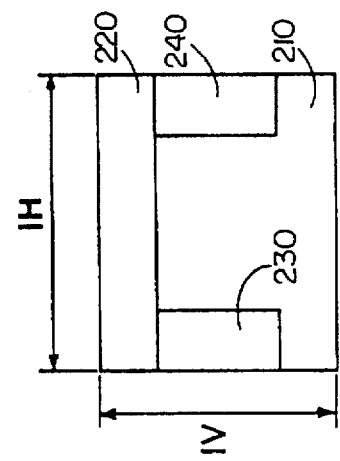
FIG. 38 shows an image frame divided into an upper region, a right region, a left region, and a lower central region.

An image frame is divided into a lower central region 210, an upper region 220, a left region 230, and a right region 240 as shown in FIG. 38.

Now, we introduce the following definitions:

(1) A region X is one of the left region 230 and the right region 240, which has a lower average luminance than the other.

(2) A region Y is one of the left region 230 and the right region 240, which has a higher average luminance then the other.

(3) A first region is a combination of the region Y with the upper region 220.

(4) A second region is a combination of the region X with the lower central region 210.

The first/second regions luminance average comparison unit 26 calculates an average luminance of each region and a difference p of an average luminance between the first and second regions.

Figure 40:
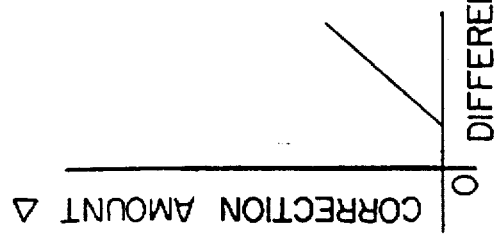
FIG. 40 is a graph showing the relationship between the correction amount (of the difference of an average luminance between the first and second regions) and the difference q of an average luminance (between the central region and the image frame).
Figure 39:
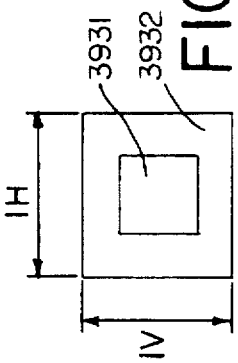
FIG. 39 is an image frame divided into a central region and a peripheral region.

Moreover, a comparison result correction unit 30 divides the image frame into a central region 3931 and a peripheral region 3932 as shown in FIG. 39 and calculates an average luminance of each region, based on the signal from the pickup element 3. A difference q of an average luminance between the image frame and the central region 3931 (i.e., an average luminance of the central region 3931—an average luminance of the image frame) is calculated, and the difference q of an average luminance is converted into a correction amount Δ for correcting a difference p of an average luminance between the first and second regions as shown in FIG. 40.

A corrected difference p' of an average luminance is calculated using the difference p of an average luminance and the correction amount Δ by the following Formula (18).

$$p'=p-\Delta \quad (18)$$

The degrees of backlight and excessive frontlight, and the corrected difference p' of an average luminance are transmitted to the correction amount calculation unit 28.

Figure 41:
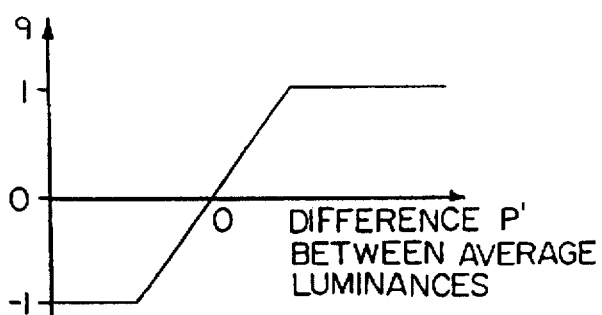
FIG. 41 is a graph showing the conversion from the luminance difference p' obtained by correcting the difference of an average luminance between the first and second regions with the correction amount into the correction amount calculation gain g.

The correction amount calculation unit 28 judges the image frame to be in a backlight state in the case where a value obtained by subtracting the correction amount Δ from the average luminance of the first region is larger than the average luminance of the second region, and judges the image frame to be in an excessive frontlight state in the case where a value obtained by subtracting the correction amount Δ from the average luminance of the first region is smaller than the average luminance of the second region. These judgments are based on the tendency that an image frame is likely to be in a backlight state when the upper region of the image frame is brighter than the lower region thereof and that the image frame is likely to be in an excessive frontlight state when otherwise. In addition, the correction amount calculation unit 28 converts the corrected average luminance difference p' into a gain g used for calculating a correction amount z as shown in FIG. 41. Then, a correction amount z is calculated by the following Formula (19), based on the backlight degree $u_r$, the excessive frontlight degree $w_r$, the gain g, and the result of judgment between the backlight and the excessive frontlight.

If $p' \leq 0$, then excessive frontlight, $z=g^*w_r$ (19)

If $p' > 0$, then backlight, $z=g^*u_r$

The average luminance of the central region of an excessive frontlight image where the central region of an image frame is bright and the lower region thereof is dark, obtained by the comparison result correction unit 30; the average luminance of the image frame, the correction amount, and the respective average luminance of the first and second regions obtained by the first/second regions luminance average comparison unit 26 will be described with reference to FIGS. 42A and 42B.

Figure 42A:
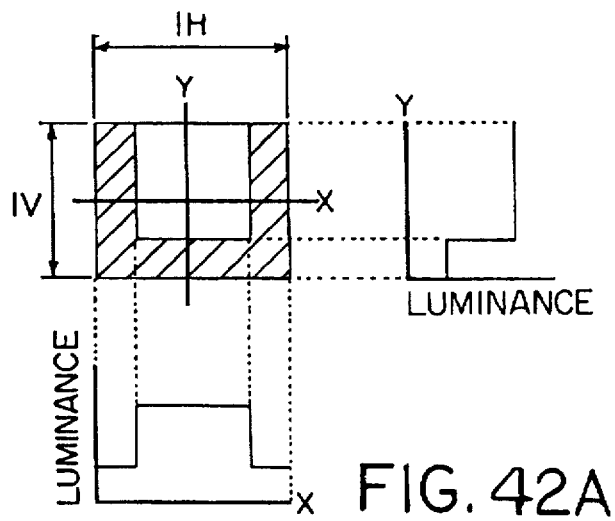
FIG. 42A is an excessive frontlight image in which the central area is bright and the area excluding the central area is dark.
Figure 42B:
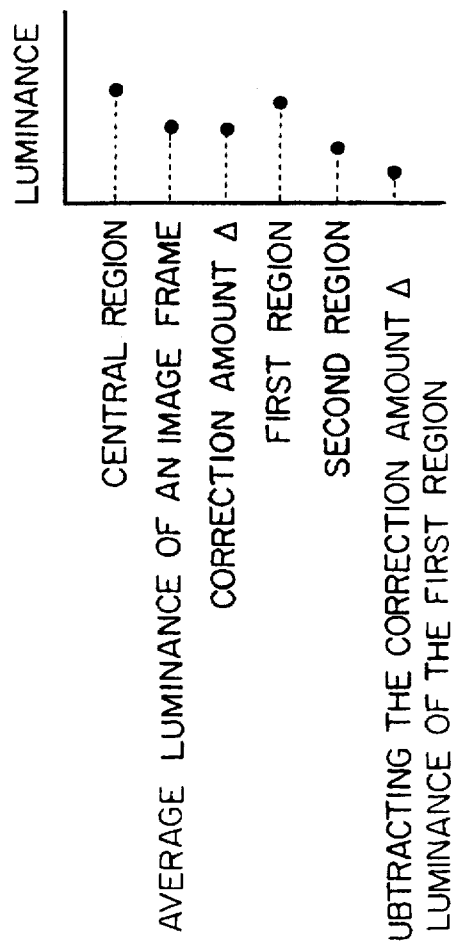
FIG. 42B is a diagram showing the luminance of each region shown in FIG. 42A.

FIG. 42A shows an excessive frontlight image where the central region of the image frame is bright and the remaining region thereof is dark; and FIG. 42B shows the average luminance of the central region of the image frame in FIG. 42A, the average luminance of the image frame, the correction amount Δ, the average luminance of the first and second regions, and the value obtained by subtracting the correction amount Δ from the average luminance of the first region.

As is understood from FIG. 42B, the value obtained by subtracting the correction amount Δ from the average luminance of the first region is smaller than the average luminance of the second region. Because of this, no misjudgments are made with respect to the excessive frontlight image where the central region is bright and the lower region is dark. Thus, nether gain g nor the correction amount z change.

Next, the relationship between the movement of an object, the average luminance of the central region, the average luminance of the image frame, and the correction amount; and those among the movement of an object, the average luminance of the first and second regions and the corrected average luminance of the first region will be described in detail with reference to FIGS. 43A to 43D, and 44A to 44D.

Figure 43A:
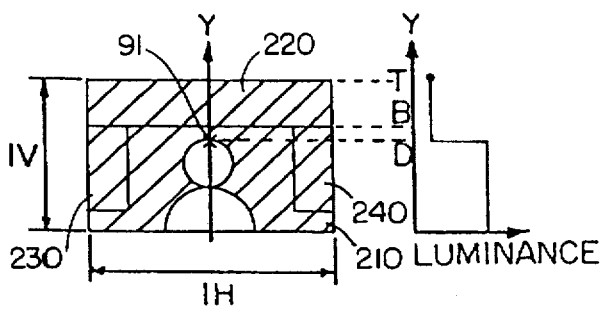
FIG. 43A shows an excessive frontlight image in which an object is present at a central position D of an image frame together with luminance at each position.
Figure 43B:
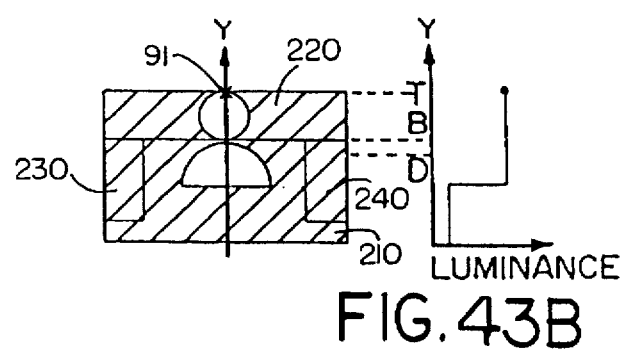
FIG. 43B shows an excessive frontlight image in which an object is present at a top end position T of the image frame together with luminance at each position.
Figure 43C:
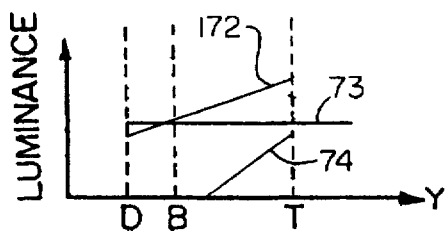
FIG. 43C shows changes of an average luminance of the central region, an average luminance of the image frame, and a correction amount while the object moves from the central position D to the top and position T as shown in FIGS. 43A and 43B.
Figure 43D:
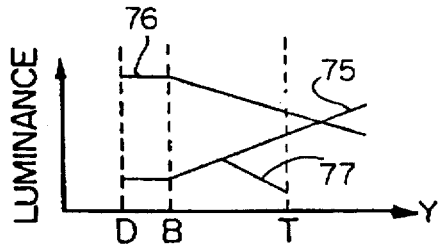
FIG. 43D shows changes of an average luminance of the first region, an average luminance of the second region, and a corrected average luminance of the first region while the object moves from the central region D to the top and T.

FIGS. 43A and 43B show excessive frontlight images where an object moves up and down; FIG. 43C shows changes of an average luminance 172 of the central region of an image frame, an average luminance 73 of the image frame, and a correction amount 74; and FIG. 43D shows changes of an average luminance 75 of the first region, an average luminance 76 of the second region, and a corrected average luminance 77 of the first region. Here, the position of the object is represented by a head top 91 thereof.

As shown in FIG. 43D, while an object moves from the central position D of the image frame to the top end position T thereof, the corrected average luminance 77 of the first region is lower than the average luminance 76 of the second region at all times, so that the image frame is judged to be in an excessive frontlight state. Thus, no misjudgments are made with respect to the excessive frontlight image where the object moves up and down; as a result, neither gain g nor the correction amount z change.

Figure 44C:
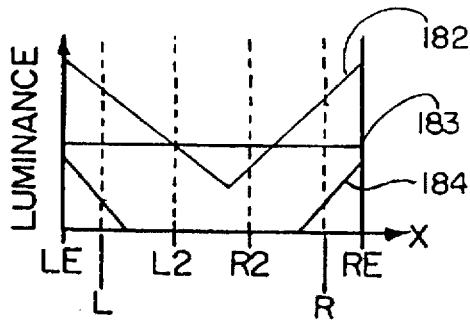
FIG. 44C shows changes of an average luminance of the central region, an average luminance of the image frame, and a correction amount while the object moves the right position R to the left position L as shown in FIGS. 44A and 44B.
Figure 44D:
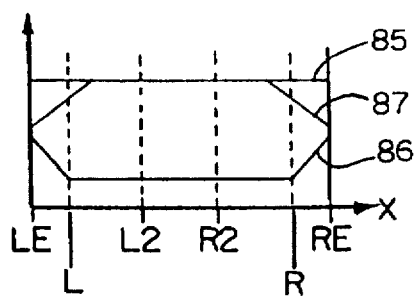
FIG. 44D shows changes of an average luminance of the first region, an average luminance of the second region, and a corrected average luminance of the first region while the object moves from the right position R to the left position L as shown in FIGS. 44A and 44B.
Figure 44A:
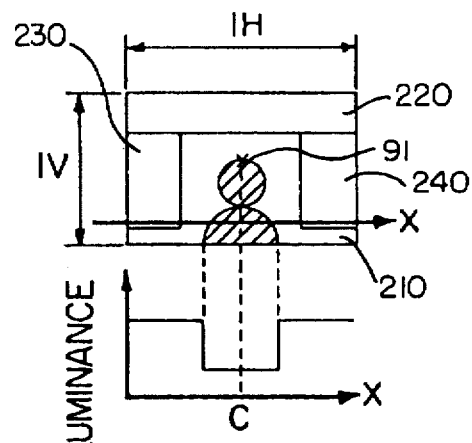
FIG. 44A shows a backlight image in which an object is present at a central position C of an image frame together with luminance at each position.
Figure 44B:
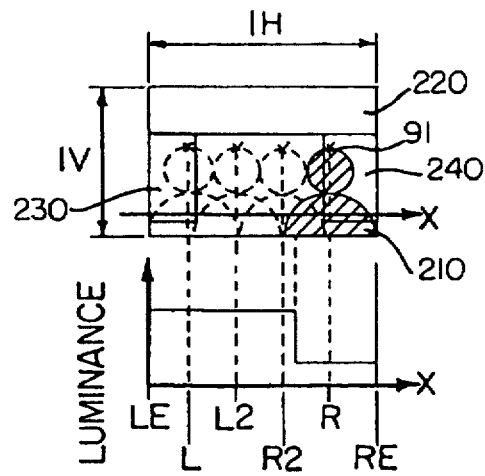
FIG. 44B shows a backlight image in which an object moves from a right position R of the image frame to a left position L thereof together with luminance of each position.

FIGS. 44A and 44B show backlight images in the case where an object moves from side to side; FIG. 44C shows changes of an average luminance 182 of the central region, an average luminance 183 of an image frame, and a correction amount 184; and FIG. 44D shows an average luminance 85 of the first region, an average luminance 86 of the second region, and a corrected average luminance 87 of the first region. Here, the position of the object is represented by a head top 91 thereof.

As shown in FIG. 44D, while the object moves from the right position R of the image frame to the left position L thereof, the corrected average luminance 87 of the first region is higher than the average luminance 86 of the second region at all times, so the image frame is judged to be in a backlight state. Thus, no misjudgments are made with respect to a backlight image where an object moves from side to side; as a result, neither gain g nor the correction amount z change.

The target luminance calculation unit 9 sets a target value of an average luminance of an image frame for each vertical scanning (frame or field), by adding the correction amount z obtained by the correction amount calculation unit 28 to a predetermined target luminance. The diaphragm control unit 8 regulates a diaphragm so that the average luminance of the image frame is kept substantially equal to the target value.

As described above, an appropriate exposure of an object for an excessive frontlight image where the central region of the image frame is bright and the lower region thereof is dark, an excessive frontlight image where an object moves up and down, and a backlight image where an object moves from side to side can be obtained.

Example 9

A ninth example of the present invention will be described. The present example overcomes the following problem: When an object is irradiated with a spot light indoors (e.g., a wedding party), an excessive frontlight image where the right half of an image frame is bright and the left half thereof is dark is misjudged to be in a backlight state. As a result, the luminance of the object is saturated so as to become white.

Figure 45A:
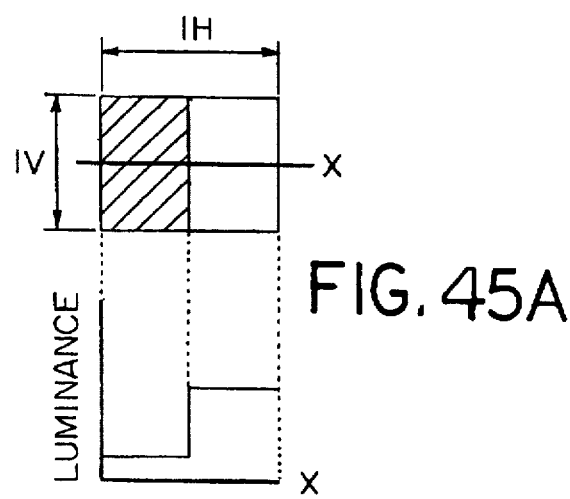
FIG. 45A is an excessive frontlight image in which the right half area is bright and the left half area is dark.

FIG. 45A shows an excessive frontlight image where a right half of an image frame is bright and the left half thereof is dark; and FIG. 45B shows an average luminance of each region obtained by dividing the image frame shown in FIG. 45A into an upper region, a lower central region, a right region, and a left region as shown in FIG. 38, and an average luminance of the respective first and second regions. Here, the first region corresponds to a combination of either one of the right or left regions which has a higher luminance and the upper region; and the second region corresponds to a combination of either one of the right or left regions which has a lower luminance and the lower region.

As is understood from FIG. 45B, the average luminance of the first region is higher than that of the second region, so that the image frame is misjudged to be in a backlight state.

If the image frame with a luminance distribution as shown in FIG. 45A is judged to be in an excessive frontlight state, this problem can be overcome. However, outdoors, the bright region of the image frame of FIG. 45A corresponds to a substance with a high luminance such as the sun; as a result, the image frame becomes a backlight state. Thus, a misjudgment is made.

The present example overcomes the above-mentioned problem, and its objective is to provide an automatic exposure control apparatus which does not make a misjudgment with respect to an excessive frontlight image where indoors, the right half of an image frame is bright and the left half thereof is dark, and does not make a misjudgment with respect to a backlight image where outdoors, the right half of an image frame is bright and the left half thereof is dark.

FIG. 46 shows a ninth example of an automatic exposure control apparatus according to the present invention. The same reference numerals as those of the preceding examples are marked for the same components as those of the preceding examples. The same components as those of the preceding examples function in the same way as in the preceding examples.

An image of an object is formed on the pickup element 3 through the lens 1 and the diaphragm 2, and is converted to an electric signal. The signal is amplified by the amplifier 4. Then, the signal is subjected to a γ treatment while passing through the signal processing circuit 5 and is transmitted to the video signal output terminal 6. At this time, a diaphragm control is performed based on the signal obtained from the pickup element 3 as follows:

An image frame luminance average calculation unit 7 calculates an average luminance of an image frame, based on the signal from the pickup element 3. The diaphragm control unit 8 compares the average luminance with a target luminance obtained by the target luminance calculation unit 9, and controls the diaphragm to be opened or closed so that the difference between the average luminance and the target luminance is made to be 0, whereby the average luminance is kept substantially equal to the target luminance.

A small region luminance average calculation unit 10 calculates an average luminance in each of a plurality of small regions based on the signal from the pickup element 3 so as to obtain a luminance order characteristic of the luminance levels.

The degree calculation unit 27 calculates an average value of low luminance regions from the luminance order characteristic. The average luminance of low luminance regions is converted in a non-linear manner by fuzzy inference or the like, whereby a backlight degree $u_r$ representing the degree of backlight of a pickup image is calculated. In addition, an average luminance of high luminance regions is calculated from the luminance order characteristic, and the average luminance is converted in a non-linear manner by fuzzy inference, whereby an excessive frontlight degree $w_r$ is calculated.

Figure 47:
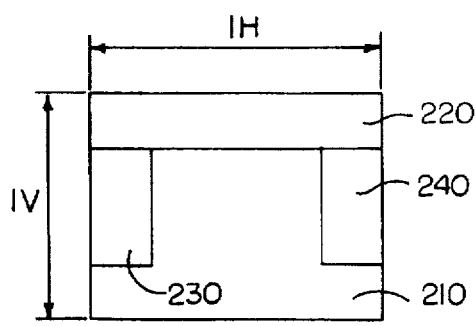
FIG. 47 is an image frame divided into an upper region, a right region, a left region, and a lower central region.

An image frame is divided into a lower central region 210, an upper region 220, a left region 230, and a right region 240 as shown in FIG. 47.

Now, we introduce the following definitions:
(1) A region X is one of the left region 230 and the right region 240, which has a lower average luminance than the other.
(2) A region Y is one of the left region 230 and the right region 240, which has a higher average luminance than the other.
(3) A first region is a combination of the region Y with the upper region 220.
(4) A second region is a combination of the region X with the lower central region 210.

The first/second regions luminance average comparison unit 26 calculates an average luminance of each region and a difference $p_1$ of an average luminance between the first region and the second region.

Figure 48:
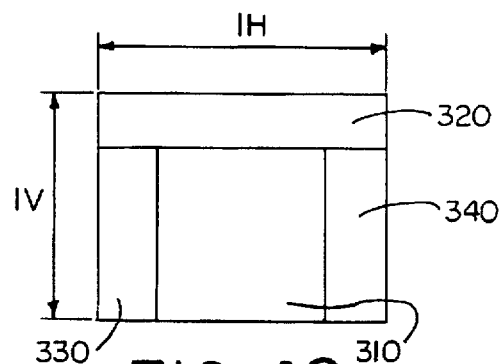
FIG. 48 is an image frame divided into an upper region, a right region, a left region, and a lower central region.

The image frame is also divided into a lower central region 310, an upper region 320, a left region 330, a right region 340, as shown in FIG. 48. Now, we introduce the following definitions:
(1') A region X' is one of the left region 330 and the right region 340, which has a lower average luminance than the other.
(2') A region Y' is one of the left region 330 and the right region 340, which has a higher average luminance than the other.
(3') A third region is a combination of the region X' with the upper region 320.
(4') A fourth region is a combination of the region Y' with the lower central region 310.

A third/fourth regions luminance average comparison unit 315 calculates an average luminance of each region and a difference $p_2$ of an average luminance between the third and forth regions.

The infrared rays amount detection unit 140 detects infrared rays from a light source, and converts the detected infrared rays into an electric signal q in proportion to the amount of the detected infrared rays. An indoor/outdoor judgment unit 155 compares the electric signal q with a predetermined threshold value and converts the electric signal q into a control signal r by the following Formula (20).

If $q \leq \epsilon$, then the indoors $r=0$ (20)

If $q > \epsilon$, then the outdoors $r=1$

The principle of the judgment between the indoors and the outdoors by using the amount of infrared rays will be described.

It is known that a color temperature of an indoor light source is different from that of an outdoor light source. The color temperature of an indoor light source such as a fluorescent light is generally in the range of 3000 to 3500 K; and the color temperature of an outdoor light source such as the sun is 3500 K or more.

Figure 49:
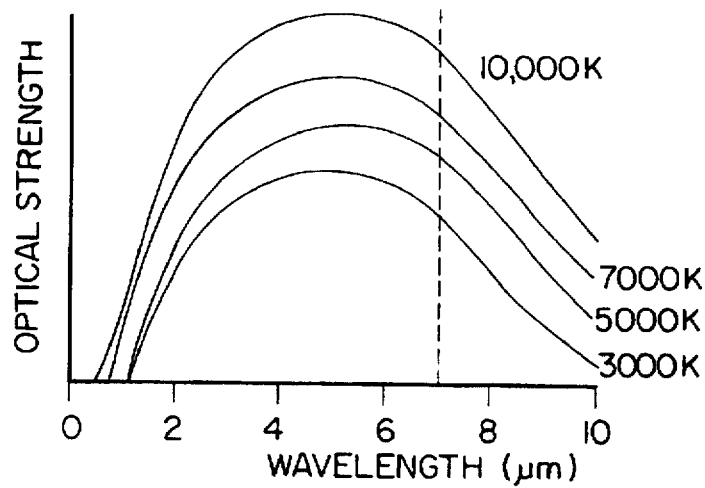
FIG. 49 is a graph showing an spectral distribution of an optical source having a color temperature in the range of 3000 K to 10000 K.
Figure 50:
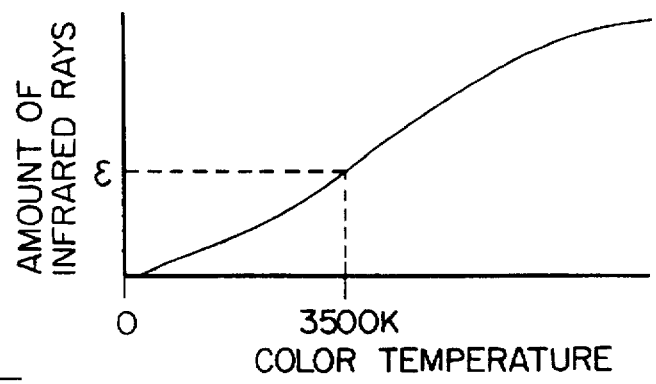
FIG. 50 is a graph showing the relationship between the amount of infrared rays and the color temperature.

FIG. 49 shows a spectral distribution in the case where the color temperature of an light source changes from 3000 K to 10000 K. Infrared rays have a wavelength longer than the wavelength represented by a broken line in FIG. 49; and the amount of infrared rays corresponds to an area which is situated to the right side of the broken line. FIG. 50 shows the relationship between the color temperature and the amount of infrared rays. As is understood from FIG. 50, the judgment between the indoors and the outdoors is made possible by setting a threshold value $\epsilon$.

The difference $p_1$ in an average luminance, the difference $p_2$ in an average luminance, and the control signal r, and the degrees of backlight and excessive frontlight are transmitted to the correction amount calculation unit 28.

The correction amount calculation unit 28 selects the difference $p_1$ outdoors and selects the difference $p_2$ indoors, according to the control signal r. These selections are based on the tendency that an image frame having a bright right half and a dark left half is likely to be in an excessive frontlight state indoors and the same image frame is likely to be in a backlight state outdoors.

Figure 51:
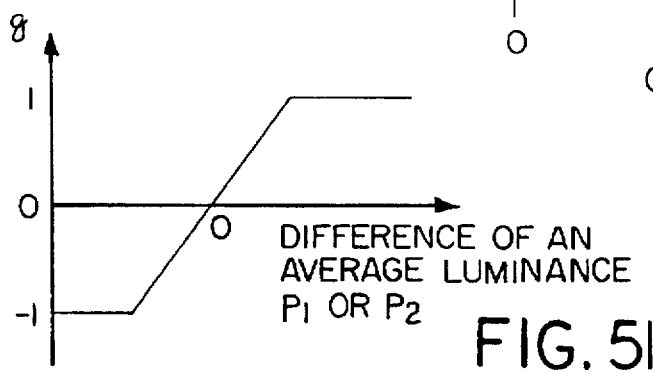
FIG. 51 is a graph showing the conversion from the difference $p_1$ of an average luminance between the first and second regions or the difference $p_2$ of an average luminance between the third and forth regions into the correction amount calculation gain g.

Moreover, the correction amount calculation unit 28 judges an image frame to be in a backlight state when the first or third region containing the upper region has an average luminance higher than that of the second or forth region containing the lower center region; and judges an image frame to be in an excessive frontlight state when the first or third region has an average luminance lower than that of the second or forth region. These judgments ere based on the tendency that it is likely to be in a backlight state when the upper region is brighter than the lower region, and it is likely to be in an excessive frontlight state when the upper region is darker than the lower region. Moreover, the correction amount calculation unit 28 converts the difference $p_1$ or the difference $p_2$ into a gain g used for calculating a correction amount as shown in FIG. 51. Then, a correction amount z is calculated by the following Formula (21), based on the backlight degree $u_r$, the excessive frontlight degree $w_r$, the gain g, and the result of the judgment between the backlight and the excessive frontlight.

If $p_1$ or $p_2 \leq 0$, then excessive frontlight, $z = g^* w_r$ (21)

If $p_1$ or $p_2 > 0$, then backlight, $z = g^* u_r$

The target luminance calculation unit 9 sets a target value of an average luminance of an image frame for each vertical scanning (frame or field), by adding the correction amount z obtained by the correction amount calculation unit 28 to a predetermined target luminance. The diaphragm control unit 8 regulates a diaphragm so that the average luminance of the image frame is kept substantially equal to the target value.

As described above, an appropriate exposure of an object for an excessive frontlight image where the central region of the image frame is bright and the lower region thereof is dark, an excessive frontlight image where an object moves up and down, and a backlight image where an object moves from side to side can be obtained.

Example 10

Figure 52:
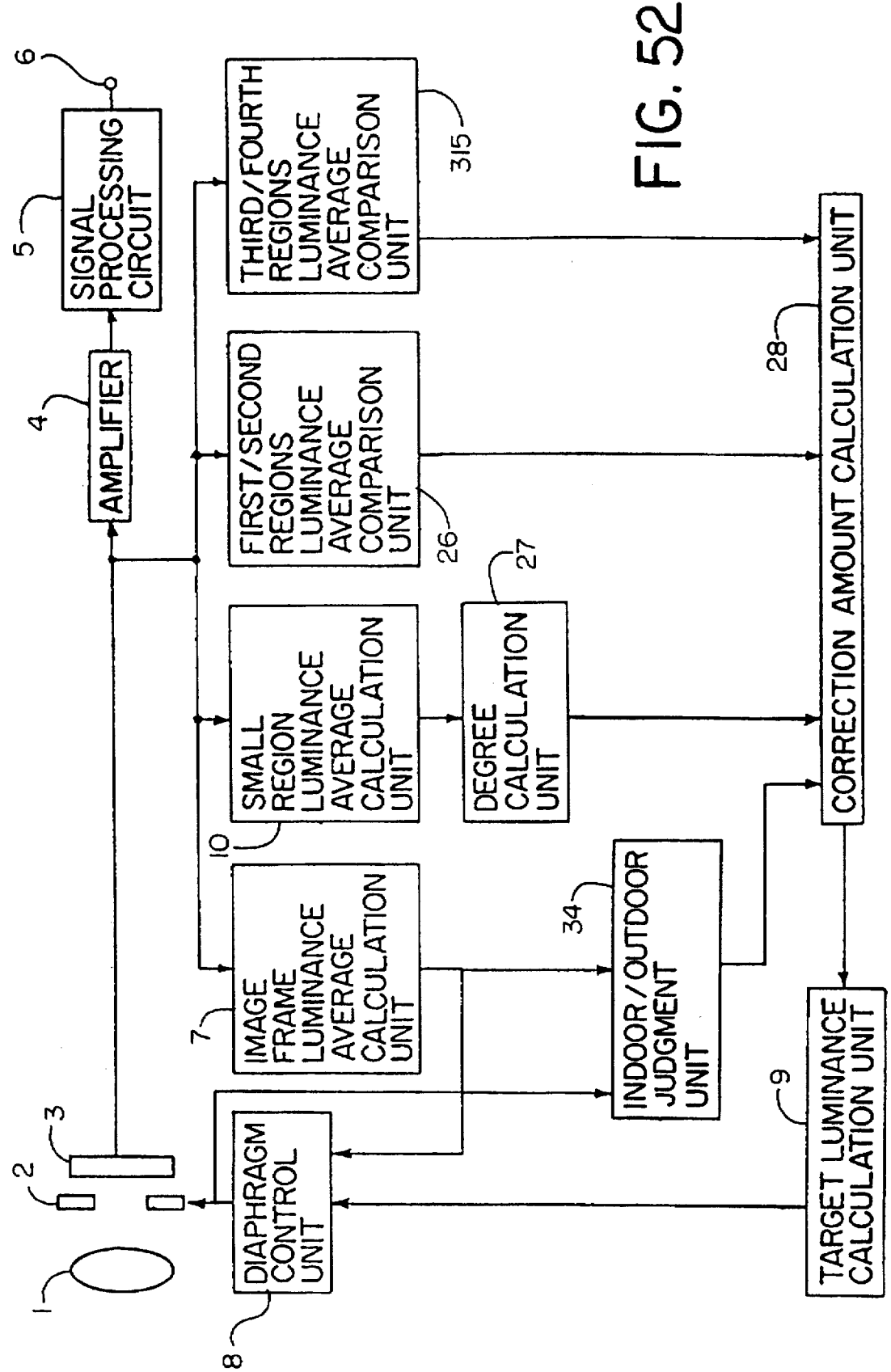
FIG. 52 is a block diagram showing an automatic exposure control apparatus of Example 10 according to the present invention.

FIG. 52 is a tenth example of an automatic exposure control apparatus according to the present invention. The present example overcomes the same problem as in Example 9.

An image of an object is formed on the pickup element 3 through the lens 1 and the diaphragm 2, and is converted to an electric signal. The signal is amplified by the amplifier 4. Then, the signal is subjected to a γ treatment while passing through the signal processing circuit 5 and is transmitted to the video signal output terminal 6. At this time, a diaphragm control is performed based on the signal obtained from the pickup element 3 as follows:

An image frame luminance average calculation unit 7 calculates an average luminance of an image frame, based on the signal from the pickup element 3. The diaphragm control unit 8 compares the average luminance with a target luminance value obtained by the target luminance calculation unit 9, and controls the diaphragm to be opened or closed so that the difference between the average luminance and the target luminance is made to be 0, whereby the average luminance is kept substantially equal to the target luminance.

A small region luminance average calculation unit 10 calculates an average luminance in each of a plurality of small regions based on the signal from the pickup element 3 so as to obtain a luminance order characteristic of the luminance levels.

The degree calculation unit 27 calculates an average value of low luminance regions from the luminance order characteristic. The average luminance of low luminance regions is converted in a non-linear manner by fuzzy inference or the like, whereby a backlight degree $u_r$ representing the degree of backlight of a pickup image is calculated. In addition, an average luminance of high luminance regions is calculated from the luminance order characteristic, and the average luminance is converted in a non-linear manner by fuzzy inference, whereby an excessive frontlight degree $w_r$ is calculated.

An image frame is divided into the lower central region 210, the upper region 220, the left region 230, and the right region 240 as shown in FIG. 47.

Now, we introduce the following definitions:
(1) A region X is one of the left region 230 and the right region 240, which has a lower average luminance than the other.
(2) A region Y is one of the left region 230 and the right region 240, which has a higher average luminance than the other.
(3) A first region is a combination of the region Y with the upper region 220.
(4) A second region is a combination of the region X with the lower central region 210.

The first/second regions luminance average comparison unit 26 calculates an average luminance of each region and a difference $p_1$ of an average luminance between the first region and the second region.

The image frame is also divided into a lower central region 310, an upper region 320, a left region 330, a right region 340, as shown in FIG. 48. Now, we introduce the following definitions:
(1') A region X' is one of the left region 330 and the right region 340, which has a lower average luminance than the other.
(2') A region Y' is one of the left region 330 and the right region 340, which has a higher average luminance than the other.
(3') A third region is a combination of the region X' with the upper region 320.
(4') A fourth region is s combination of the region Y' with the lower central region 310.

A third/fourth regions luminance average comparison unit 315 calculates an average luminance of each region and a difference $p_2$ of an average luminance between the third and forth regions.

The indoor/outdoor judgment unit 34 calculates a control signal r by using the following Formula (22), based on the average luminance Yall of the image frame obtained by the image frame luminance average calculation unit 7 and a diaphragm value F obtained by the diaphragm control unit 8, where γ is a predetermined threshold value.

If Yall/F≦γ, then small amount of light=the indoors r=0     (22)

If Yall/F>ε, then large amount of light=the outdoors r=1

The principle of the judgment between the indoors and the outdoors by using the average luminance Yall and the diaphragm value F will be described.

The amount of light from an outdoor light source such as the sun is larger than the amount of light from an indoor light source such as a fluorescent light. Thus, the judgment between the indoors and the outdoors is made based on the amount of light which is inferred from the average luminance Yall and the diaphragm value F.

The relationship between an optical amount O, the diaphragm value F, and the average luminance Yall Is represented as follows:

$$O = Yall/F \qquad (23)$$

Therefore, the judgment between the indoors and the outdoors is made possible by setting a threshold value ε.

The difference $p_1$ of an average luminance, the difference $p_2$ of an average luminance, the control signal r, and the degrees of backlight and excessive frontlight are transmitted to the correction amount calculation unit 28.

The correction amount calculation unit 28 selects the difference $p_1$ outdoors and selects the difference $p_2$ indoors, according to the control signal r. These selections are based on the tendency that an image frame having a bright right half and a dark left half is likely to be in an excessive frontlight state indoors and the same image frame is likely to be in a backlight state outdoors.

Moreover, the correction amount calculation unit 28 judges an image frame to be in a backlight state when the first or third region containing the upper region has an average luminance higher than that of the second or forth region containing the lower central region; and judges an image frame to be in an excessive frontlight state when the first or third region has an average luminance lower than that of the second or forth region. These judgments are based on the tendency that it is likely to be in a backlight state when the upper region is brighter than the lower region, and that it is likely to be in an excessive frontlight state when the upper region is darker than the lower region. Moreover, the correction amount calculation unit 28 converts the difference $p_1$ or the difference $p_2$ into a gain g used for calculating a correction amount as shown in FIG. 51. Then, a correction amount z is calculated by the Formula (21), based on the backlight degree $u_r$, the excessive frontlight degree $w_r$, the gain g, and the result of the judgment between the backlight and the excessive frontlight.

The target luminance calculation unit 9 sets a target value of an average luminance of an image frame for each vertical scanning (frame or field), by adding the correction amount z obtained by the correction amount calculation unit 28 to a predetermined target luminance. The diaphragm control unit 8 regulates a diaphragm so that the average luminance of the image frame is kept substantially equal to the target value.

As described above, an appropriate exposure of an object for an excessive frontlight image where the central region of the image frame is bright and the lower region thereof is dark, an excessive frontlight image where an object moves up and down, and a backlight image where an object moves from side to side can be obtained.

Example 11

An eleventh example will be described. The present example overcomes the same problem as that of Example 10. FIG. 53 shows an eleventh example of an automatic exposure control apparatus according to the present invention.

An image of an object is formed on the pickup element 3 through the lens 1 and the diaphragm 2, and is converted to an electric signal. The signal is amplified by the amplifier 4. Then, the signal is subjected to a γ treatment while passing through the signal processing circuit 5 and is transmitted to the video signal output terminal 6. At this time, a diaphragm control is performed based on the signal obtained from the pickup element 3 as follows:

An image frame luminance average calculation unit 7 calculates an average luminance of an image frame, based on the signal from the pickup element 3. The diaphragm control unit 8 compares the average luminance with a target luminance obtained by the target luminance calculation unit 9, and controls the diaphragm to be opened or closed so that the difference between the average luminance and the target luminance is made 0, whereby the average luminance is kept substantially equal to the target luminance.

A small region luminance average calculation unit 10 calculates an average luminance in each of a plurality of small regions based on the signal from the pickup element 3 so as to obtain a luminance order characteristic of the luminance levels.

The degree calculation unit 27 calculates an average value of low luminance regions from the luminance order characteristic. The average luminance of low luminance regions is converted in a non-linear manner by fuzzy inference or the like, whereby a backlight degree $u_r$ representing the degree of backlight of a pickup image is calculated. In addition, an average luminance of high luminance regions is calculated from the luminance order characteristic, and the average luminance is converted in a non-linear manner by fuzzy inference, whereby an excessive frontlight degree $w_r$ is calculated.

An image frame is divided into the lower central region 210, the upper region 220, the left region 230, and the right region 240 as shown FIG. 47.

Now, we introduce the following definitions:
(1) A region X is one of the left region 230 and the right region 240, which has a lower average luminance than the other.
(2) A region Y is one of the left region 230 and the right region 240, which has a higher average luminance than the other.
(3) A first region is a combination of the region Y with the upper region 220.
(4) A second region is a combination of the region X with the lower central region 210.

The first/second regions luminance average comparison unit 26 calculates an average luminance of each region and a difference $p_1$ of an average luminance between the first region and the second region.

The image frame is also divided into a lower central region 310, an upper region 320, a left region 330, a right region 340, as shown in FIG. 48. Now, we introduce the following definitions:
(1') A region X' is one of the left region 330 and the right region 340, which has a lower average luminance than the other.
(2') A region Y' is one of the left region 330 and the right region 340, which has a higher average luminance than the other.
(3') A third region is a combination of the region X' with the upper region 320.
(4') A fourth region is a combination of the region Y' with the lower central region 310.

A third/fourth regions luminance average comparison unit 315 calculates an average luminance of each region and a difference $p_2$ of an average luminance between the third and forth regions.

A color temperature calculation unit 815 detects lights from an light source through a primary color (red, blue and green) filter, and converts the lights into electric signals R, B, and G. The indoor/outdoor judgment unit 155 calculates a ratio among a red light, a blue light, and a green light, based on the electric signals R, B, and G. A control signal r is calculated from the ratio.

The principle of the judgment between the indoors and the outdoors by using the ratio among the lights with three primary colors generated from the light source will be described.

As described above, it is known that a color temperature of an indoor light source is different from that of an outdoor light source. The color temperature of an indoor light source such as a fluorescent light is generally in the range of 3000 to 3500 K; and the color temperature of an outdoor light source such as the sun is 3500 K or more.

FIG. 49 shows a spectral distribution in the case where the color temperature of an light source changes from 3000 K to 10000 K. FIG. 54 shows a relationship between the light wavelength and the light transmittance of the three primary color filter. As is understood from FIGS. 49 and 54, a light detected by the color temperature calculation unit 815 through the filter corresponds to an area to the left side of the broken line of FIG. 49. In addition, it is understood from FIG. 49 that since the ratio among the three primary colors is different in accordance with the color temperature, the judgment between the indoors and the outdoors can be made from the ratio among the three primary colors.

The difference $p_1$ of an average luminance, the difference $p_2$ of an average luminance, and the control signal r, and the degrees of backlight and excessive frontlight are transmitted to the correction amount calculation unit 28.

The correction amount calculation unit 28 selects the difference $p_1$ outdoors and selects the difference $p_2$ indoors, according to the control signal r. These selections are based on a tendency that an image frame having a bright right half and a dark left half is likely to be in an excessive frontlight state indoors and the same image frame is likely to be in a backlight state outdoors.

Moreover, the correction amount calculation unit 28 judges an image frame to be in a backlight state when the first or third region containing the upper region has an average luminance higher than that of the second or forth region containing the lower central region; and judges an image frame to be in an excessive frontlight state when the first or third region has an average luminance lower than that of the second or forth region. These judgments are based on at tendency that it is likely to be in a backlight state when the upper region is brighter than the lower region, and that it is likely to be in an excessive frontlight when the upper region is darker than the lower region. Moreover, The correction amount calculation unit 28 converts the difference $p_1$ or the difference $p_2$ into a gain g used for calculating a correction amount as shown in FIG. 51. Then, a correction amount z is calculated by the Formula (21), based on the backlight degree $u_r$, the excessive frontlight degree $w_r$, the gain g, and the result of the judgment between the backlight and the excessive frontlight.

The target luminance calculation unit 9 sets a target value of an average luminance of an image frame for each vertical scanning (frame or field), by adding the correction amount z obtained by the correction amount calculation unit 28 to a predetermined target luminance. The diaphragm control unit 8 regulates a diaphragm so that the average luminance of the image frame is kept substantially equal to the target value.

As described above, an appropriate exposure of an object for an excessive frontlight image where the central region of the image frame is bright and the lower region thereof is dark, an excessive frontlight image where an object moves up and down, and a backlight image where an object moves from side to side can be obtained.

Example 12

Figure 55:
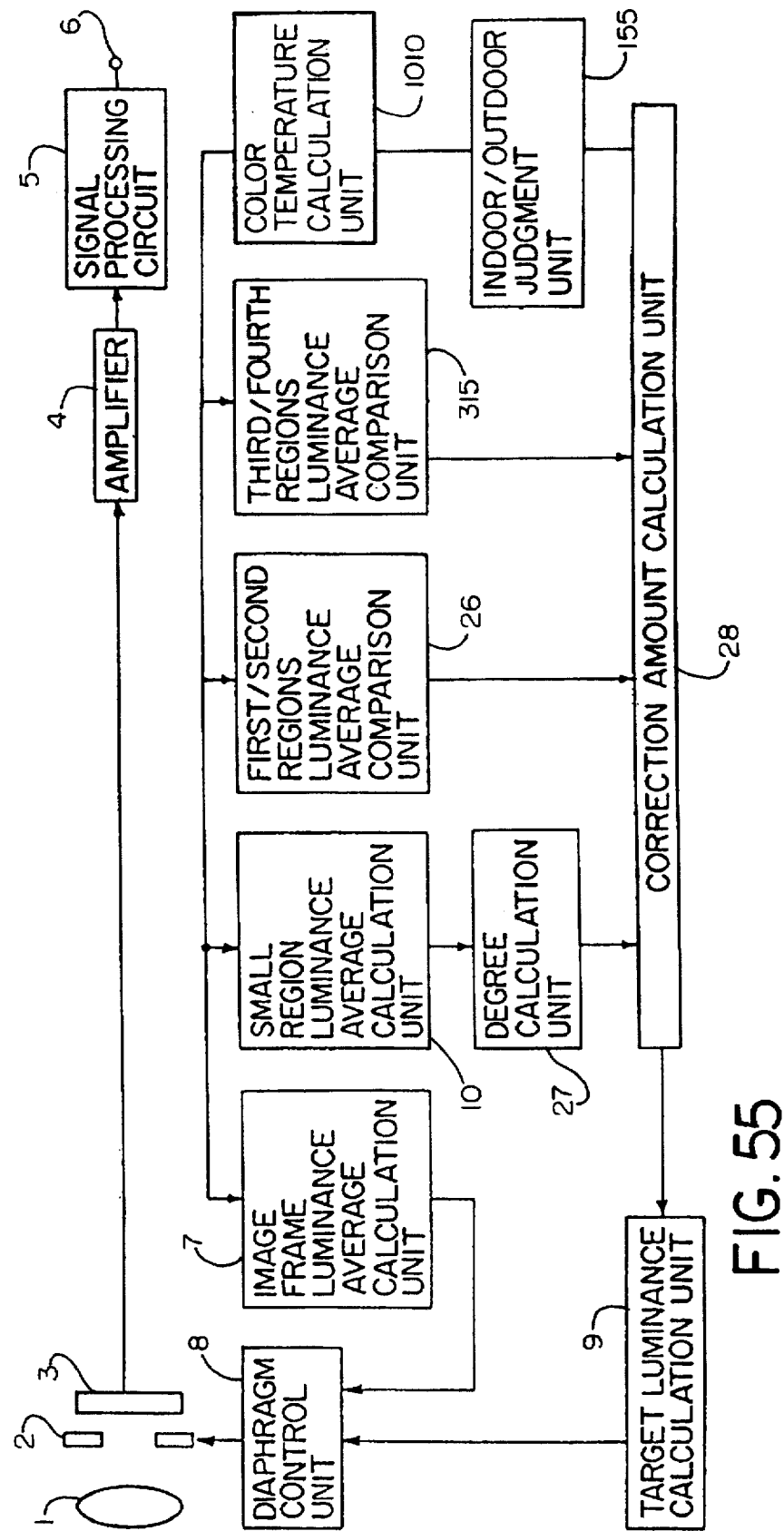
FIG. 55 is block diagram showing an automatic exposure control apparatus of Example 12 according to the present invention.

FIG. 55 shows the twelfth example of an automatic exposure control apparatus according to the present invention.

An image of an object is formed on the pickup element 3 through the lens 1 and the diaphragm 2, and is converted into an electric signal. The signal is amplified by the amplifier 4. Then, the signal is subjected to a γ treatment while passing through the signal processing circuit 5 and is transmitted to the video signal output terminal 6. At this time, a diaphragm control is performed based on the signal obtained from the pickup element 3 as follows:

An image frame luminance average calculation unit 7 calculates an average luminance of an image frame, based on the signal from the pickup element 3. The diaphragm control unit 8 compares the average luminance with a target luminance value obtained by the target luminance calculation unit 9, and controls the diaphragm to be opened or closed so that the difference between the average luminance and the target luminance is made 0, whereby the average luminance is kept substantially equal to the target luminance.

A small region luminance average calculation unit 10 calculates an average luminance in each of a plurality of small regions based on the signal from the pickup element 3 so as to obtain a luminance order characteristic of the luminance levels.

The degree calculation unit 27 calculates an average value of low luminance regions from the luminance order characteristic. The average luminance of low luminance regions is converted in a non-linear manner by fuzzy inference or the like, whereby a backlight degree $u_r$ representing the degree of backlight of a pickup image is calculated. In addition, an average luminance of high luminance regions is calculated from the luminance order characteristic, and the average luminance is converted in a non-linear manner by fuzzy inference, whereby an excessive frontlight degree $w_r$ is calculated.

An image frame is divided into the lower central region 210, the upper region 220, the left region 230, and the right region 240 as shown in FIG. 47.

Now, we introduce the following definitions:

(1) A region X is one of the left region 230 and the right region 240, which has a lower average luminance than the other.

(2) A region Y is one of the left region 230 and the right region 240, which has a higher average luminance then the other.

(3) A first region is a combination of the region Y with the upper region 220.

(4) A second region is a combination of the region X with the lower central region 210.

The first/second regions luminance average comparison unit 26 calculates an average luminance of each region and a difference $p_1$ of an average luminance between the first and second regions.

The image frame is also divided into a lower central region 310, an upper region 320, a left region 330, a right region 340, as shown in FIG. 48. Now, we introduce the following definitions:

(1') A region X' is one of the left region 330 and the right region 340, which has a lower average luminance than the other.

(2') A region Y' is one of the left region 330 and the right region 340, which has a higher average luminance than the other.

(3') A third region is a combination of the region X' with the upper region 320.

(4') A fourth region is a combination of the region Y' with the lower central region 310.

A third/fourth regions luminance average comparison unit 315 calculates an average luminance of each region and a difference $p_2$ of an average luminance between the third and forth regions.

Figure 56:
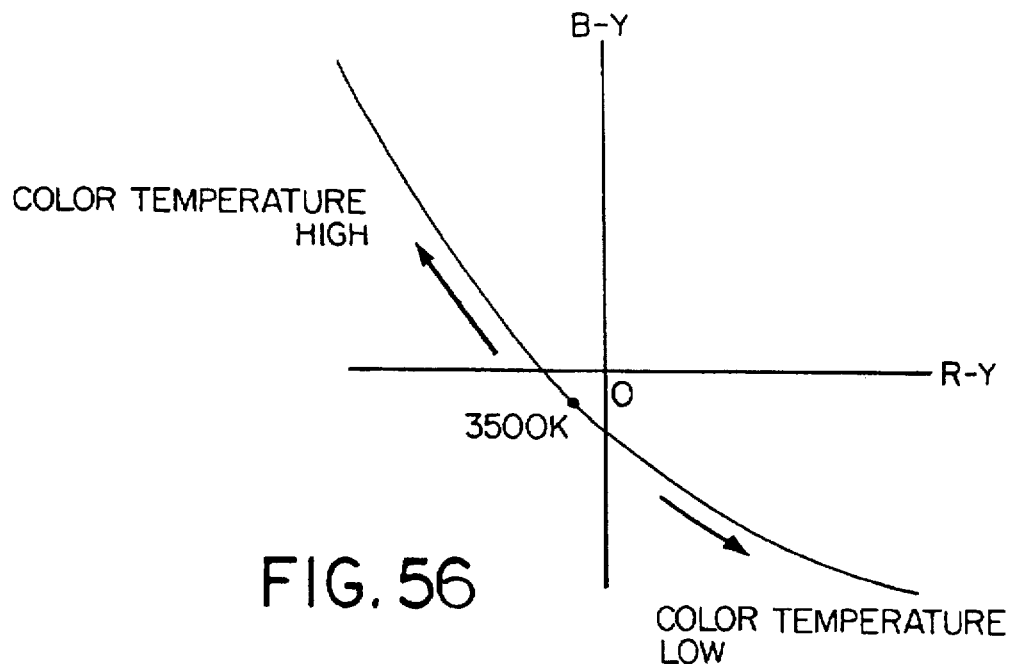
FIG. 56 is a graph showing the relationship between the color difference and the color temperature.

A color temperature calculation unit 1010 calculates an average of color difference (R-Y, B-Y) of an image frame and calculates a color temperature by using the relationship between the color temperature and the color difference in FIG. 56. The indoor/outdoor judgment unit 155 calculates a control signal r corresponding to the indoors and the outdoors, based on the calculated color temperature. The color difference shown in FIG. 56 is generally calculated in a video camera and the like for the purpose of adjusting a white balance, and it is not required to modify the structure of a hardware. Thus, the effects of inferring the color temperature by using the color difference are great.

The difference $p_1$ of an average luminance, the difference $p_2$ of an average luminance, the control signal r, and the degrees of backlight and excessive frontlight are transmitted to the correction amount calculation unit 28.

The correction amount calculation unit 28 selects the difference $p_1$ outdoors and selects the difference $p_2$ indoors, according to the control signal r. These selections are based on the tendency that an image frame having a bright right half and a dark left half is likely to be in an excessive frontlight state indoors and the same image frame is likely to be in a backlight state outdoors.

Moreover, the correction amount calculation unit 28 judges an image frame to be in a backlight state when the first or third region containing the upper region has an average luminance higher than that of the second or forth region containing the lower central region; and judges an image frame to be in an excessive frontlight state when the first or third region has an average luminance lower than that of the second or forth region. These judgments are based on the tendency that it is likely to be in a backlight state when the upper region is brighter than the lower region, and that it is likely to be in an excessive frontlight state when the upper region is darker than the lower region. Moreover, the correction amount calculation unit 28 converts the difference $p_1$ or the difference $p_2$ into a gain g used for calculating a correction amount as shown in FIG. 51. Then, a correction amount z is calculated by the Formula (21), based on the backlight degree $u_r$, the excessive frontlight degree $w_r$, the gain g, and the result of the judgment between the backlight and the excessive frontlight.

The target luminance calculation unit 9 sets a target value of an average luminance of an image frame for each vertical scanning (frame or field), by adding the correction amount z obtained by the correction amount calculation unit 28 to a predetermined target luminance. The diaphragm control unit 8 regulates a diaphragm so that the average luminance of the image frame is kept substantially equal to the target value.

As described above, an appropriate exposure of an object for an excessive frontlight image where the central region of the image frame is bright and the lower region thereof is dark, an excessive frontlight image where an object moves up and down, and a backlight image where an object moves from side to side can be obtained.

In the present example, the comparison of luminance by the first/second regions luminance average comparison unit 26 and the third/fourth regions luminance average comparison unit 315 is performed by using a luminance difference. It is apparent that the same effects are obtained even though a luminance ratio is used.

Example 13

Figure 57:
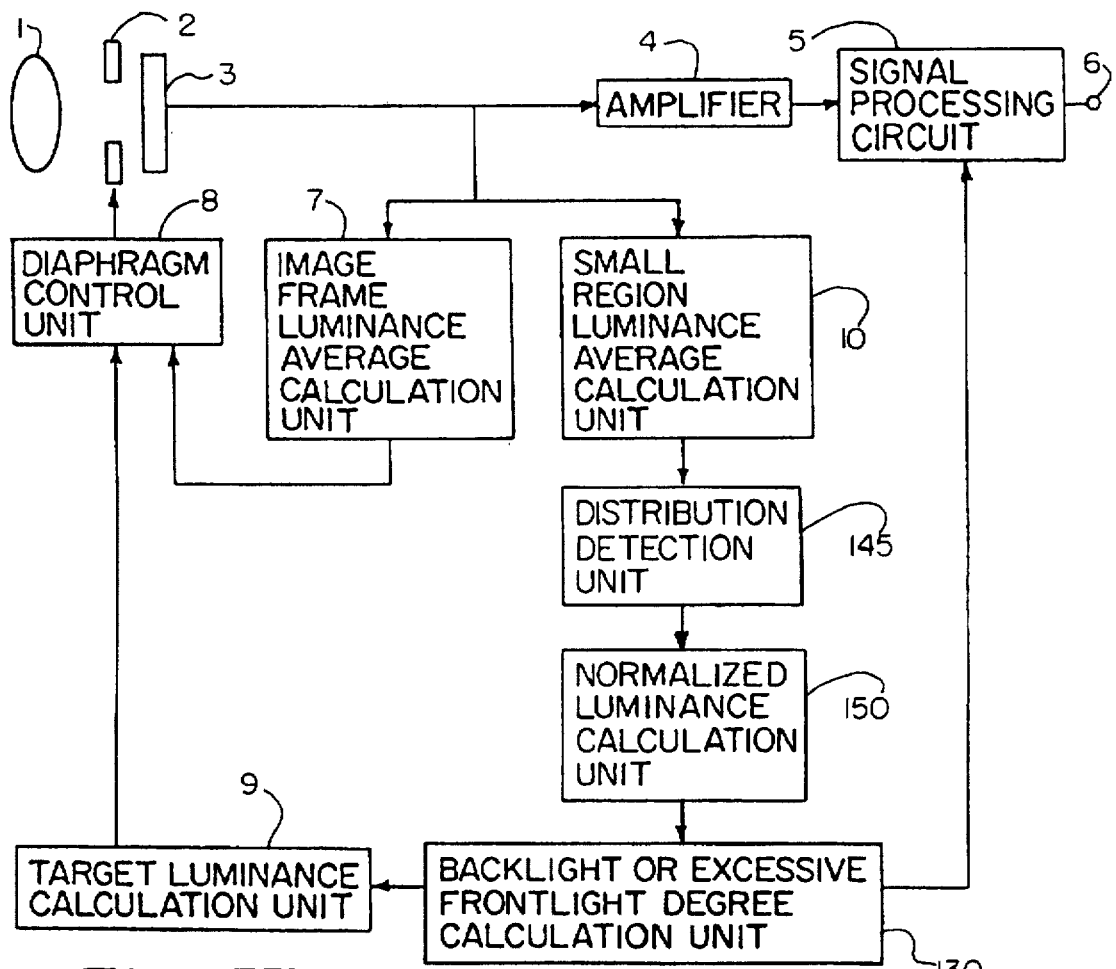
FIG. 57 is a block diagram showing an automatic exposure control apparatus of Examples 13 to 15 according to the present invention.

FIG. 57 shows a thirteenth example of an automatic exposure control apparatus according to the present invention. The same reference numerals as those of the preceding examples are marked for the same components as those of the preceding examples. The same components as those of the preceding examples function in the same way as in the preceding examples.

Hereinafter, the operation of the present example will be described.

An image of an object is formed on the pickup element 3 through the lens 1 and the diaphragm 2, and is converted to an electric signal. The signal is amplified by the amplifier 4. Then, the signal is subjected to a γ treatment while passing through the signal processing circuit 5 and is transmitted to the video signal output terminal 6. At this time, a diaphragm control is performed based on the signal obtained from the pickup element 3 as follows:

An image frame luminance average calculation unit 7 calculates an average luminance Yall of an image frame, based on the signal from the pickup element 3. The diaphragm control unit 8 compares the average luminance Yall with a target luminance obtained by the target luminance calculation unit 9, and controls the diaphragm to be opened or closed so that the difference between the average luminance Yall and the target luminance Yall' is made to be 0, whereby the average luminance Yall is kept substantially equal to the target luminance Yall'.

A small region luminance average calculation unit 10 calculates an average luminance in each of a plurality of small regions based on the signal from the pickup element 3. The luminance of each small region is presented by an average luminance of pixels in each small region.

A distribution detection unit 145 rearranges the average luminance of the small regions in the order from the lowest to the highest. An average luminance in a certain range ($N_1$ to $N_2$) of pixel numbers is calculated by the following Formula (24).

$$V = \sum_{i=N_1}^{N_2} v(i)/(N_2 - N_1 + 1) \quad (24)$$

where V is an average value of low luminance regions or an average value of high luminance regions v(i) is a luminance level of the ith pixel from the lowest luminance; $N_1=1$, $N2=N_{dark}$ when an average value of low luminance regions is calculated; and $N_1=N_{light}$, $N_2=N_{all}$=total number of pixels, when an average value of high luminance regions is calculated.

A normalized luminance calculation unit 150 calculates the ratio of the average vale of low luminance regions to the average luminance of the image frame or a ratio of the average value of high luminance regions to the average luminance of the image frame.

Specifically, the normalized luminance calculation unit 150 calculates a normalized average value of low luminance regions or a normalized average value of high luminance regions by using the following Formula (25).

$$V_{n1} = K_4 * V/Yall \quad (25)$$

where $V_{n1}$ is a normalized average value of low luminance regions or a normalized average value of high luminance regions; V is an average value of low luminance regions or an average value of high luminance regions; Yall is an average luminance of an image frame; and $K_4$ is a gain.

A backlight or excessive frontlight degree calculation unit 130 calculates the degree of backlight or excessive frontlight by using the normalized average value of low luminance regions or the normalized average value of high luminance regions. For example, the degree of backlight is calculated by using the following Formula (26).

$$U_{dark} = K_1 * (c_1 - V_{n1}) \quad (26)$$

where $U_{dark}=0$ when $c_1-V_{n1}<0$; $U_{dark}$ is a backlight degree, $K_1$, is a gain, and $c_1$, is a constant.

The target luminance calculation unit 9 sets a target value of an average luminance of an image frame (i.e., a target luminance Yall') for each vertical scanning (frame or field), based on the backlight degree or the excessive frontlight degree obtained by the backlight or excessive frontlight degree calculation unit 130.

The diaphragm control unit 8 regulates a diaphragm so as to keep the average luminance Yall of an image frame substantially equal to the target luminance Yall'.

When a diaphragm is changed, a change amount of the backlight degree $U_{dark}$ obtained by using the normalized average value $V_{n1}$ of low luminance regions is smaller than that of the backlight degree $U_{dark}$ obtained by using the average value V of low luminance regions. This reason will be described below.

When a diaphragm is opened, each pixel in an image frame becomes bright, so that the average luminance of an image frame Yall and the average value V of low luminance regions becomes small. When a diaphragm is regulated in a closing direction, the average luminance of an image frame Yall and the average value V of low luminance regions become small. Thus, a value obtained by dividing the average value of low luminance regions by the average luminance of an image frame, i.e., a normalized average value of low luminance regions is not likely to be influenced by the change of the average value of low luminance regions due to the change of the diaphragm. For this reason, a target luminance which is not influenced by the state of a diaphragm can be calculated by employing the backlight degree obtained by using the normalized average value of low luminance regions, and one correction amount of a diaphragm is defined for one image.

The same principle as the above can be applied to the case where the excessive frontlight degree is calculated by using high luminance regions in an image frame.

As described above, according to the present example, the ratio between the average luminance of an image frame and the average value of low luminance regions or the average value of high luminance regions is used for calculating a backlight degree or an excessive frontlight degree. Thus, a target luminance which is not influenced by the state of a diaphragm can be obtained and one correction amount of a diaphragm can be defined for one image.

In the case where luminance of each pixel in an image frame is linearly changed along with the change of a diaphragm, the average value of low luminance regions or the average value of high luminance regions is changed In a constant amount with respect to the change of the average luminance of an image frame. Therefore, the use of a ratio of the average value of low luminance regions or the average value of high luminance regions to the average luminance of an image frame is effective in calculating the target luminance. However, in an actual system, the dynamic range of a pickup element causes a saturation of a video signal corresponding to a brightness more than a predetermined level. In particular, an image in a backlight state or an excessive frontlight state has high contrast, where a bright region and a dark region are clearly divided, so that pixels in high luminance regions are likely to be saturated. In this case, luminance of each pixel changes with respect to the change of a diaphragm in a non-linear manner. Thus, the average luminance of an image frame, the average value of low luminance regions, and the average value of high luminance regions change at a different rate with respect to the change of a diaphragm. Example 14 shows a method for coping with non-linearity of luminance due to the saturation of a video signal.

Example 14

A method for calculating a target luminance by using a difference between the average luminance of an image frame and the average value of low luminance regions or the average value of high luminance regions will be described. According to this method, the effects of the saturation of high luminance signals are made as small as possible and the target luminance which does not depend on the change of a diaphragm is calculated.

The normalized luminance calculation unit as shown in FIG. 57 calculates a normalized average value of low luminance regions or a normalized average value of high luminance regions by using the following Formula (27).

When $V$ is an average value of low luminance regions: $V_{n2}=K_5*(Yall-V)$ (27)

When $V$ is an average value of high luminance regions: $V_{n2}=K_5*(V-Yall)$ where $V_{n2}$ is a normalized average value of low luminance regions or an normalized average value of high luminance regions; $V$ is an average value of low luminance regions or an average value of high luminance regions; Yall is an average luminance of an image frame; and $K_5$ is a gain.

The backlight or excessive frontlight degree calculation unit 130 calculates the degree of backlight or excessive frontlight by using the normalized average value of low luminance regions or the normalized average value of high luminance regions. For example, the backlight degree is calculated by the following Formula (28).

$$U_{dark''}=K_1·*(V_{n2}-c_{1''})$$ (28)

where $U_{dark''}=0$ when $V_{n2}-c_{1''}<0$; $U_{dark''}$ is a backlight degree; $K_{1''}$ is a gain; and $c_{1''}$ is a constant.

The backlight degree obtained as described above changes less than a backlight degree conventionally obtained by using an average value of low luminance regions, with respect to the change of a diaphragm. The principle of this phenomenon will be described below.

When high luminance signals are saturated, each luminance of the saturated regions becomes constant. As a result, the number of pixels, of which luminance increases when the diaphragm is opened, is decreased. Accordingly, when the diaphragm is opened so as to increase the average luminance of an image frame by a predetermined amount of $\Delta$a, an increase amount in unsaturated regions is also increased. Thus, when the high luminance signals are not saturated, the increase amount $\Delta$a of the average luminance of an image frame is larger than an increase amount $\Delta$v of the average luminance of low luminance regions. However, when the high luminance signals are saturated, the increase amount $\Delta$v may become the same as, or greater than the increase amount $\Delta$a. Since the change amount of the normalized average value of low luminance regions when the diaphragm is opened depends on the difference between the change amount $\Delta$v and the change amount $\Delta$a (i.e., $\Delta v-\Delta a$). Therefore, when the respective change amounts are the same, i.e., $\Delta v=\Delta a$, the normalized average value of low luminance regions hardly change with respect to the change of the diaphragm.

In the case where the high luminance signals are not saturated, an image is not likely to require an exposure correction. Thus, a correction amount is set at a small value from the beginning. Accordingly, a target luminance is hardly influenced by the change of a diaphragm.

As is understood from the above-mentioned description, the change of the backlight degree obtained by using the normalized average value of low luminance regions is smaller than that of the backlight degree obtained without using the normalized average value of low luminance regions.

Likewise, when the high luminance portions in an image frame are used for detecting the excessive frontlight degree, the influences of the change of a diaphragm are small.

According to the present example, a target luminance is calculated by using the difference between the average luminance of an image frame and the average value of low luminance regions or the average value of high luminance regions. Thus, the target luminance which is less influenced by the change of a diaphragm can be calculated under the condition that high luminance signals are saturated and one correction amount can be defined for one image.

Example 15

A fifteenth example of an automatic exposure control apparatus according to the present invention will be described.

As described in Example 14, when the diaphragm is opened so as to increase an average luminance of an image frame by a predetermined amount $\Delta$a under the condition that high luminance signals are saturated, the increase amount $\Delta$v of an average value of low luminance regions becomes larger than that of an average value of low luminance regions under the condition that high luminance signals are not saturated. Thus, a ratio of an average value of low luminance regions to an average luminance of an image frame ($Y_{dark}$/Yall) under the condition that the high luminance signals are saturated becomes larger than the same ratio under the condition that the high luminance signals are not saturated.

It is assumed that an apparent average luminance of an image frame $Y_{n\_all}$ is set so that the increase amount $\Delta a'$ thereof becomes larger than the increase amount $\Delta v$ when the diaphragm is opened so as to increase the average luminance of an image frame by $\Delta a$. In this case, a ratio of $Y_{dark}$ to $Y_{n\_all}$ ($Y_{dark}/Y_{n\_all}$) becomes smaller than $Y_{dark}$/Yall. Accordingly, a target luminance which is less influenced by the change of a diaphragm can be obtained under the conditions, that high luminance signals are saturated.

In the case where high luminance signals are not saturated, an image is not likely to require an exposure correction. Thus, a correction amount is set at a small value from the beginning. Accordingly, a target luminance is hardly influenced by the change of a diaphragm.

As described above, when the backlight degree is calculated, an average luminance of an image frame is converted into an apparent average luminance thereof, and a ratio of an average value of low luminance regions to the converted value is obtained. According to this calculation, a target luminance which is hardly influenced by the change of a diaphragm can be more easily obtained, compared with the case using a ratio of an average value of low luminance regions to an average luminance of an image frame.

In the present example, when the average luminance of an image frame Yall is converted into the apparent average luminance of an image frame $Y_{n\_all}$, the apparent average luminance $Y_{n\_all}$ is set so that the ratio of the increase amount $\Delta a'$ of the apparent average luminance to the increase amount $\Delta a$ becomes large. The target luminance is calculated by using the ratio of the average value of low luminance regions to the apparent average luminance of an image frame.

More specifically, the normalized luminance calculation unit 150 calculates a normalized average value of low luminance regions by using the Formula (29).

$$V_{n3}=K_6*V/Y_{n\_all} \tag{29}$$

$$Y_{n\_all}=K_7*Yall+c_4$$

where $V_{n3}$ is a normalized average value of low luminance regional V is an average value of low luminance regions; Yall is an average luminance of an image frame; $K_6$, $K_7$ are gains, and $c_4$ is a constant.

As is understood from Formula (29), the apparent average luminance of an image frame $W_{n\_all}$ is calculated so that the ratio $\Delta a'/\Delta a$ becomes large against the change of the diaphragm, and than the ratio of the average value of low luminance regions to the $Y_{n\_all}$ is calculated. This ratio changes less than the ratio of the average value of low luminance regions to Yall, due to the change of a diaphragm.

The backlight or excessive frontlight degree calculation unit 130 calculates the degree of backlight employing the normalized average value of low luminance regions by the following Formula (30).

$$U_{dark^{\prime\prime}}=K_1*(c_1-V_{n3}) \tag{30}$$

where $U_{dark^{\prime\prime}}=0$ when $c_1-V_{n3}<0$; $U_{dark^{\prime\prime}}$ is a backlight degree; $K_1$ is a gain; and $c_1$ is a constant.

According to the present example, the average luminance of an image frame is converted into the apparent average luminance of an image frame by the Formula (29), and the target luminance is calculated by using the ratio of the average value of low luminance regions to the converted value. Thus, even when the high luminance signals are saturated, the target luminance which is hardly influenced by the change of a diaphragm can be obtained and one correction amount can be defined for one image.

Example 16

Figure 58:
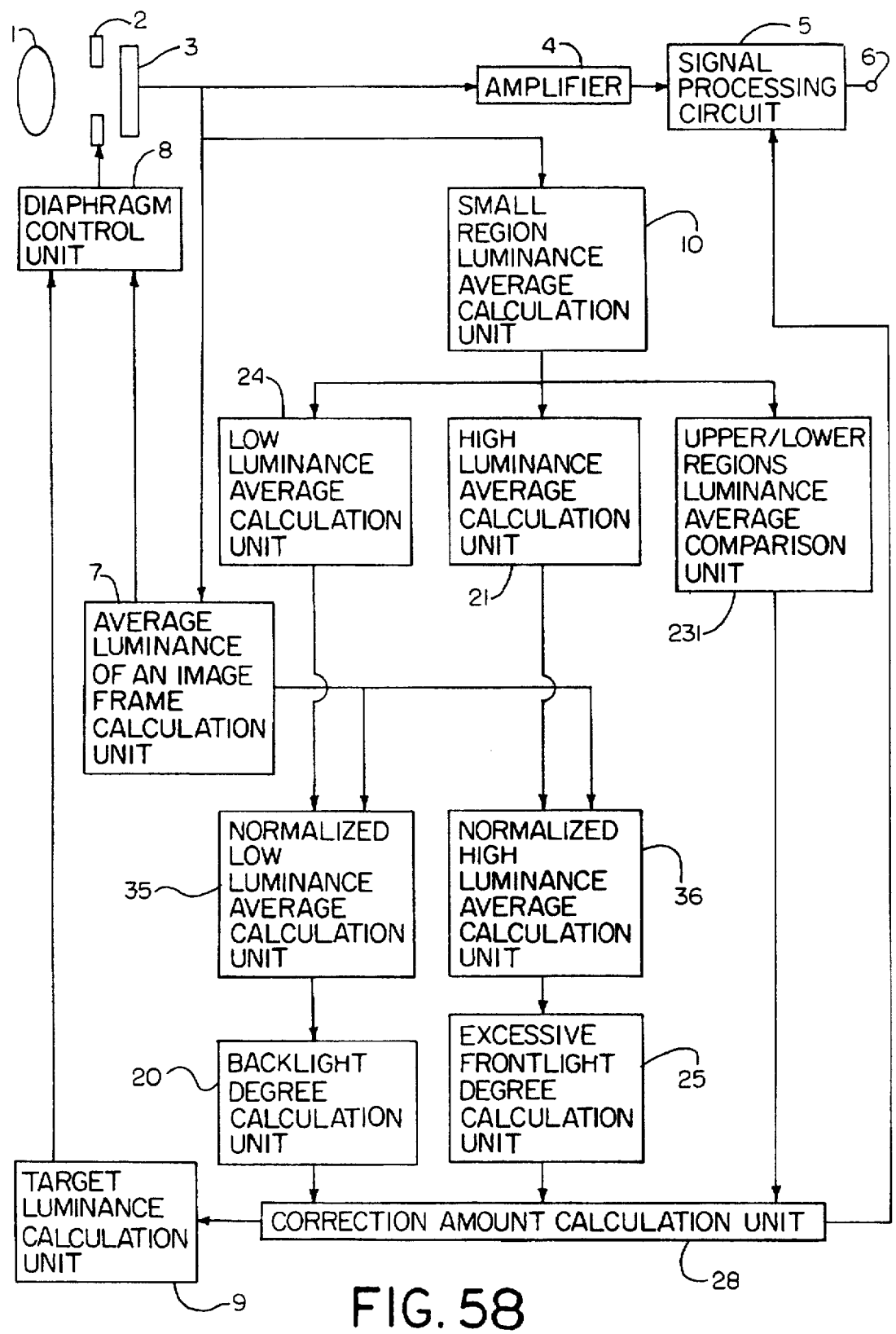
FIG. 58 is a block diagram showing an automatic exposure control apparatus of Example 16 according to the present invention.

A sixteenth example of an automatic exposure control apparatus will be described with reference to FIG. 58. The same reference numerals as those of the preceding examples are marked for the same components as those of the preceding examples. The same components function in the same way as in the preceding examples.

In the present example, a backlight degree and an excessive frontlight degree are obtained in the same way as in Example 15. In addition, two degrees are selected according to the judgment between the backlight and the excessive frontlight, whereby an exposure control is performed with respect to both of the backlight and the excessive frontlight state.

The calculation units 21 and 24 calculate an average value of high luminance regions $V_{light}$ and an average value of low luminance regions $V_{dark}$, respectively. These calculation units 21 and 24 correspond to the distribution detection unit 145 of Example 13. A normalized low luminance average calculation unit 35 and a normalized high luminance average calculation unit 36 normalize an average value of low luminance regions $V_{dark}$ and an average value of high luminance regions $V_{light}$ with an average luminance of an image frame Yall, respectively. The normalized low luminance average calculation unit 35 and the normalized high luminance average calculation unit 36 correspond to the normalized luminance calculation unit 150 of Example 13. A normalized average value of low luminance regions $V_{n\_dark}$ and a normalized average value of high luminance regions $V_{n\_light}$ are input into the backlight degree calculation unit 20 and the excessive frontlight degree calculation unit 25. The calculation units 20 and 25 calculate a backlight degree $U_{dark}$ and an excessive frontlight degree $U_{light}$ in the same way as in the backlight or excessive frontlight degree calculation unit 130 of Example 13.

Figure 59:
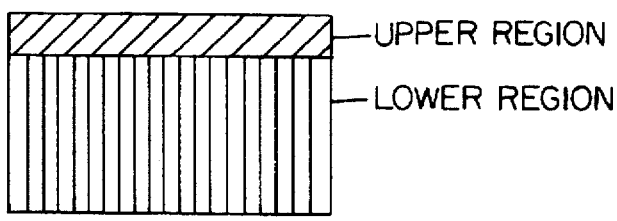
FIG. 59 is an image frame divided into upper and lower regions.

An image frame is divided into a upper region and a lower region, as shown in FIG. 59. An upper/lower regions luminance average comparison unit 231 calculates an average luminance of the upper region and the lower region, based on the signals from the pickup element 3. Then, the upper/lower regions luminance average comparison unit 231 calculates a luminance difference by the following Formula (31).

Luminance difference=(Average luminance of the upper region)−(Average luminance of the lower region)  (31)

Figure 60:
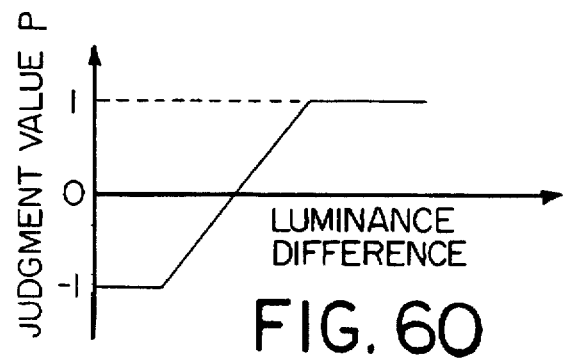
FIG. 60 is a graph illustrating the judgment between the backlight and the excessive frontlight, based on the luminance difference.

Moreover, the upper/lower regions luminance average comparison unit 231 converts the luminance difference into a judgment value p within an interval [−1, 1]. The judgment value p is used to judge between backlight and excessive frontlight. The conversion diagram from the luminance difference to the judgment value p is shown in FIG. 60.

The correction amount calculation unit 28 determines a final correction amount z, employing the backlight degree $U_{dark}$, the excessive frontlight degree $U_{light}$, and the judgment value p of the backlight and excessive frontlight by the following Formula (32).

$$\text{If } p \leq 0, \text{ then } z=U_{light}*p \tag{32}$$

If $p>0$, then $z=U_{dark}*p$

The target luminance calculation unit 9 sets a target value of an average luminance of an image frame for each vertical scanning (frame or field), by adding the correction amount z obtained by the correction amount calculation unit 28 to a predetermined target luminance. Specifically, the target luminance calculation unit 9 calculates a target luminance Yall' by the following Formula (33).

$$Yall'=Yinit*(1+z) \qquad (33)$$

where Yinit is an initial target luminance.

The diaphragm control unit 8 regulates a diaphragm so that the average luminance of an image frame Yall is kept substantially equal to the target luminance Yall'. When an upper region of the image frame is brighter than a lower region thereof, the image frame is judged to be in a backlight state. Then, a correction is made based on the backlight degree obtained from the lower region. When the upper region of the image frame is darker than the lower region thereof, the image frame is judged to be in an excessive frontlight state. Then, a correction is made based on the excessive frontlight degree obtained from the lower region.

As described above, according to the present example, an average value of low luminance regions and that of high luminance regions are converted into values which are not influenced by the change of a diaphragm, by using the average luminance of an image frame. The backlight and excessive frontlight degrees are calculated using the respective converted values. Each degree is selectively regulated, based on the luminance difference between the upper and lower regions. Thus, one target luminance can be defined for both of the backlight and excessive frontlight states.

Figure 61:
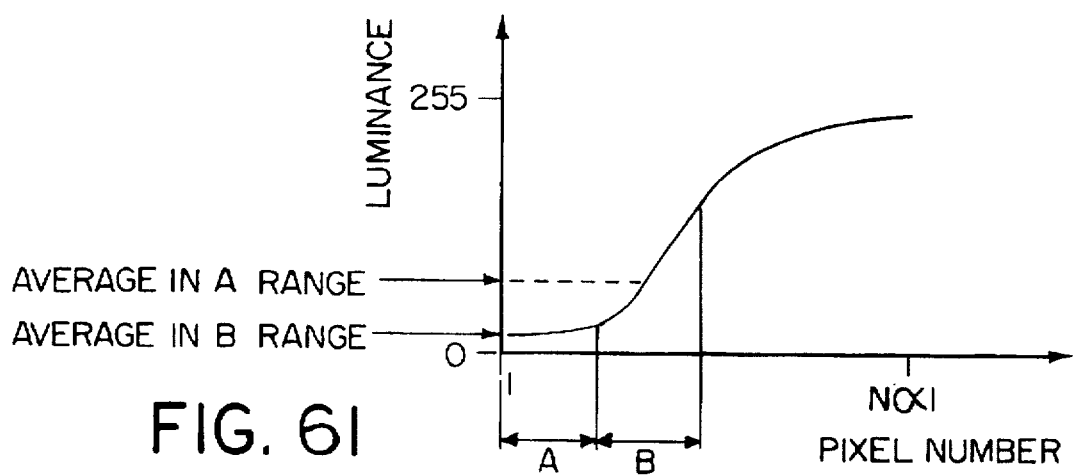
FIG. 61 is a luminance order characteristic curve.
Figure 62:
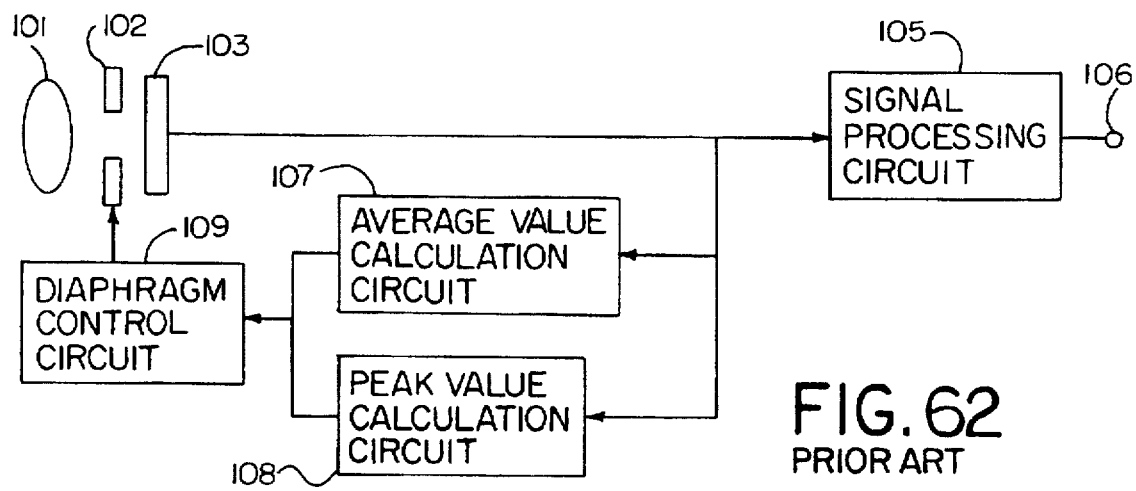
FIG. 62 is a block diagram showing a conventional automatic exposure control apparatus.
Figure 63:
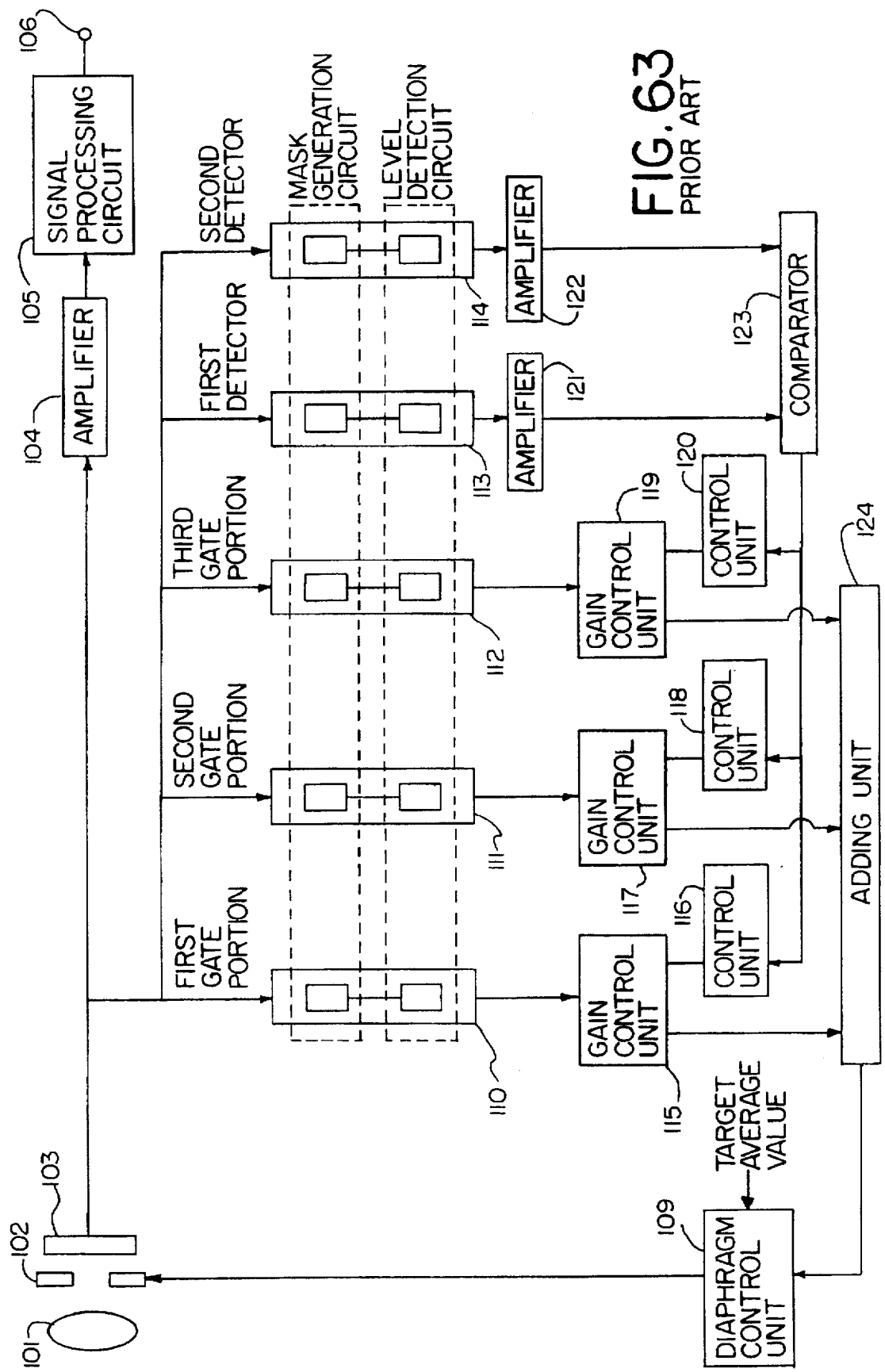
FIG. 63 is a block diagram showing a conventional automatic exposure control apparatus.
Figure 64:
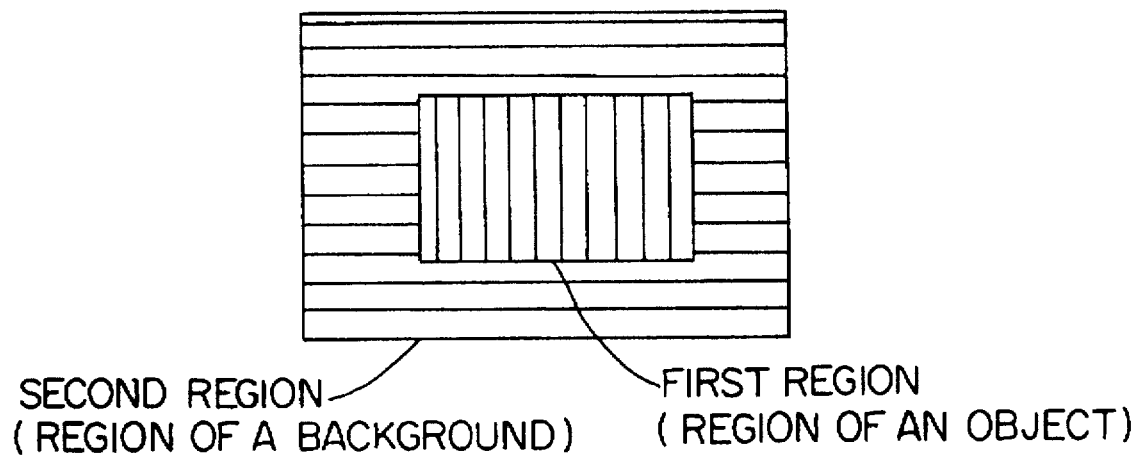
FIG. 64 is an image frame divided into a two regions for illustrating the conventional automatic exposure control apparatus.
Figure 65:
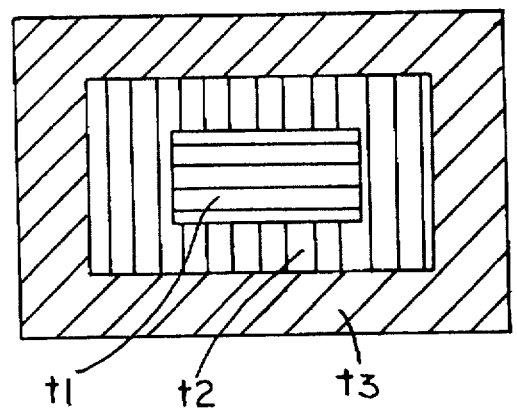
FIG. 65 is an image frame divided into three regions for illustrating the conventional automatic exposure control apparatus.

In the present example, the backlight degree is calculated from the average value of low luminance regions; and the excessive frontlight degree is calculated from the average value of low luminance regions or the average value of high luminance regions. It is also possible that a plurality of ranges of pixel numbers are selected as shown in FIG. 61, and average luminances of the respective ranges are integrated by fuzzy inference or a linear multiple function, whereby the backlight and excessive frontlight degrees are obtained. Thus, it is apparent that the same effects can be obtained even in the following case: A plurality of average luminances are converted so as not to be influenced by the change of a diaphragm and integrated by fuzzy inference or a linear multiple function, whereby the backlight and excessive frontlight degrees are obtained.

In the present example, an exposure correction using a diaphragm is described. However, it is apparent that an exposure correction in accordance with calculated backlight and excessive frontlight degrees can be achieved similarly by correcting a gain of a γ correction circuit and a gain of an AGC circuit in the signal processing circuit.

In the present example, the judgment between the backlight and the excessive frontlight is made by using the luminance difference between the upper and lower regions. The judgment can also be made by using the luminance ratio therebetween.

According to the present invention, an image frame is divided into small regions, and the degree of backlight under an automatic exposure control can quantitatively be obtained from low luminance regions in the image frame. In addition, the judgment between the backlight and the excessive frontlight is made based on the luminance ratio between upper and lower regions, and the correction amount of a diaphragm can be regulated. Thus, an automatic exposure control apparatus which can appropriately change the control level of a diaphragm in accordance with an image state can be provided.

Moreover, the automatic exposure control apparatus according to the present invention includes a calculation unit for calculating a luminance difference between first and second regions. Because of this, no misjudgments are made with respect to an excessive frontlight image where an object moves up and down; a backlight image where an object moves from side to side; a backlight image where a dark substance gets in and out of one side of the image frame; and a backlight image where a bright substance gets in and out of one side of the image frame. Furthermore, the automatic exposure control apparatus according to the present invention includes a first judgment unit for judging between the backlight and the excessive frontlight by the average luminance comparison results of the first and second regions; and a second judgment unit for judging between the backlight and the excessive frontlight by a luminance ratio between the upper and lower regions. Because of this, no misjudgments are made with respect to an excessive frontlight image in which an object moves up and down; a backlight image where an object moves from side to sides a backlight image where a dark substance gets in and out of one side of the image frame; and a backlight image where a bright substance gets in and out of one side of the image frame. Thus, it is practically effective to apply the apparatus of the present invention to a video camera or the like which is under the condition that an object is moving and where the above-mentioned states are likely to be generated.

Furthermore, the automatic exposure control apparatus according to the present invention includes a correlation value calculation unit for calculating the correlation value of an average luminance of each small region normalized with an average luminance of an image frame and a predetermined luminance distribution. Because of this, an excessive frontlight image where the central region of an image frame is bright is recognized, avoiding misjudgments. An appropriate exposure control can be performed with respect to an excessive frontlight image where the central region of the image frame is bright, a backlight image where an object moves from side to side, and an excessive frontlight image where an object moves up and down. It is practically effective to apply the apparatus of the present invention to a video camera where an excessive frontlight state is generated when photographing in front of a window and where an object moves.

Furthermore, according to the present invention, the judgment between the indoors and the outdoors is made with respect to an image having a bright right half and a dark left half. When the luminance of the upper region is lower than that of the lower region indoors, it is judged to be in an excessive frontlight state. When the luminance of the upper region is higher than that of the lower region outdoors, it is judged to be in a backlight state. Because of this, no misjudgment is made with respect to the image and an appropriate exposure control can be performed. It is practically effective to apply the exposure control apparatus of the present invention to a video camera or the like which will be used indoors and outdoors.

Furthermore, according to the present invention, an average value of low luminance regions or high luminance regions is converted with an average luminance of an image frame into a value which is hardly influenced by the change of a diaphragm. A target value is calculated by using the converted value, whereby the target value corresponding to each image is obtained and a diaphragm control appropriate for the contents of an image is made possible. In addition, according to the present invention, one target luminance is determined with respect to each image, so that it is not required to consider the change of a correction amount due to the change of a diaphragm, making it easy to regulate a correction amount defined by a backlight and excessive frontlight degree calculation unit. Moreover, the change of the target luminance caused by the change of a diaphragm, which has been the conventional problem, is decreased, making possible a stable diaphragm control.

Various other modifications will be apparent to and can be readily made by those skilled in the art without departing from the coops and spirit of this invention. Accordingly, it is not intended that the scope of the claims appended hereto be limited to the description as set forth herein, but rather that the claims be broadly construed.

What is claimed is:

1. An automatic exposure control apparatus comprising:

image frame luminance calculation means for calculating an average luminance of an image frame;

region luminance calculation means for calculating average luminances of a plurality of regions, said plurality of regions constituting said image frame;

select region luminance calculation means for arranging said average luminances of said plurality of regions obtained by said region luminance calculation means in luminance order such that said average luminances are arranged in at least one of ascending and descending order, for selecting at least one of said plurality of regions by identifying a predefined range in said luminance order and selecting the at least one of said plurality of regions from said plurality of regions which have a corresponding average luminance that is within the predefined range in said luminance order, and for calculating an average value of said average luminances of said selected at least one region;

backlight degree calculation means for calculating a value representing a degree of backlighting in said image frame as a function of said average value obtained by said select region luminance calculation means;

target luminance calculation means for calculating a target average luminance for an exposure correction based on said value; and exposure correction means for correcting an exposure so that said average luminance obtained by said image frame calculation means is kept substantially equal to said target average luminance.

2. The automatic exposure control apparatus according to claim 1, wherein said select region luminance calculation means selects the predetermined number of regions having low average luminance of said plurality of regions.

3. The automatic exposure control apparatus according to claim 1, wherein said value representing said backlight degree is calculated by u=k*(c1−V), where u, k, c1 and V represent said value, a gain, a constant and said average luminance obtained by said select region luminance calculation means, respectively, and if c1−V<0 then u=0.

4. The automatic exposure control apparatus according to claim 1, wherein said select region luminance calculation means arranges said average luminances obtained by said region luminance calculation means in the luminance order, groups said plurality of regions into a plurality of sets according to said luminance order, and calculates an average value of said average luminances of each set of said plurality of sets;

said backlight degree calculation means calculates a value representing a backlight degree as a function of said respective average values of said plurality of sets.

5. The automatic exposure control apparatus according to claim 1, wherein said value representing said backlight degree is calculated according to the rules of the fuzzy inference.

6. The automatic exposure control apparatus according to claim 1, wherein said value representing said backlight degree is calculated according to a linear multiple function.

7. The automatic exposure control apparatus according to claim 1, wherein said backlight degree calculation means includes:

(a) normalization means for normalizing said average value obtained by said select region luminance calculation means with respect to said average luminance of said image frame, and (b) calculation means for calculating said value representing said backlight degree as a function of said normalized average value.

8. An automatic exposure control apparatus according to claim 1, wherein the select region luminance calculation means calculates a plurality of the average values of the average luminances of the selected regions.

9. An automatic exposure control apparatus according to claim 1, further comprising state judgment means for judging whether the image frame is in a backlight state or in an excessive frontlight state.

10. An automatic exposure control apparatus according to claim 9, wherein the judgment of the state judgment means is conducted based on a spatial luminance pattern of the image frame.

11. An automatic exposure control apparatus comprising:

state judgment means for judging whether an image frame is in a backlight state or in an excessive frontlight state based on a spatial luminance pattern of said image frame;

image frame luminance calculation means for calculating an average luminance of said image frame;

region luminance calculation means for calculating average luminances of a plurality of regions, said plurality of regions constituting said image frame;

first select region luminance calculation means for arranging said average luminances of said plurality of regions obtained by said region luminance calculation means in luminance order such that said average luminances are arranged in at least one of ascending and descending order, for selecting at least one of said plurality of regions by identifying a predefined range in said luminance order and selecting the at least one of said plurality of regions from said plurality of regions which have a corresponding average luminance that is within the predefined range in said luminance order, and for calculating an average value of said average luminances of said selected at least one region;

second select region luminance calculation means for arranging said average luminances obtained by said region luminance calculation means in luminance order such that said average luminances are arranged in at least one of ascending and descending order, for selecting at least one of said plurality of regions by identifying a predefined range in said luminance order and selecting the at least one of said plurality of regions from said plurality of regions which have a corresponding average luminance that is within the predefined range in said luminance order, and for calculating an average value of said average luminances of said selected at least one region;

backlight degree calculation means for calculating a first value representing a degree of backlighting in said image frame as a function of said average value obtained by said first select region luminance calculations means; excessive frontlight degree calculation means for calculating a second value representing an excessive degree of frontlighting of said image frame as a function of said average value obtained by said second select region luminance calculation means;

correction amount determination means for determining a correction amount based on the judgment result by said state judgment means, said first value and said second value;

target luminance calculation means for calculating a target average luminance for an exposure correction based on said correction amount; and exposure correction means for correcting an exposure so that said average luminance obtained by said image frame luminance calculation means is kept substantially equal to said target average luminance.

12. The automatic exposure control apparatus according to claim 11, wherein said image frame includes an upper region and a lower region, said state judgment means compares an average luminance of said upper region with an average luminance of said lower region, and judges whether said image frame is in a backlight state or in an excessive frontlight state based on the result of comparison.

13. The automatic exposure control apparatus according to claim 11, wherein said first select region luminance calculation means selects the predetermined number of regions having low average luminances of said plurality of regions.

14. The automatic exposure control apparatus according to claim 11, wherein said second select region luminance calculation means selects the predetermined number of regions having high average luminances of said plurality of regions.

15. The automatic exposure control apparatus according to claim 11, wherein said second select region luminance calculation means selects the predetermined number of regions having low average luminance of said plurality of regions.

16. The automatic exposure control apparatus according to claim 11, wherein said image frame includes a lower central region, an upper region, a left region and a right region;

said state judgment means compares an average luminance of a first region with an average luminance of a second region and judges whether said image frame is in a backlight state or in an excessive frontlight state based on the result of comparison;

where, said first region is a combination of said upper region with one of said left region and said right region, which has a lower average luminance than the other, and said second region is a combination of said lower central region with one of said left region and said right region, which has a higher average luminance than the other.

17. The automatic exposure control apparatus according to claim 16, wherein the sum of the vertical length of said left region and the vertical length of said upper region is smaller than the vertical length of said image frame, and the sum of a vertical length of said right region and said vertical length of said upper region is smaller than said vertical length of said image frame.

18. The automatic exposure control apparatus according to claim 11, wherein said image frame includes a first upper region and a lower region;

said image frame also includes a lower central region, a second upper region, a left region and a right region;

said state judgment means includes:
(a) first/second region comparison means for comparing an average luminance of a first region with an average luminance of a second region and for generating a first judgment value indicating the result of comparison,
(b) upper/lower region comparison means for comparing an average luminance of said first upper region with an average luminance of said lower region and for generating a second judgment value indicating the result of comparison, and
(c) judgment means for judging whether said image frame is in a backlight state or in an excessive frontlight state based on said first judgment value and said second judgment value;

where, said first region is a combination of said second upper region with one of said left region and said right region, which has a lower average luminance than the other, and said second region is a combination of said lower central region with one of said left region and said right region, which has a higher average luminance than the other.

19. The automatic exposure control apparatus according to claim 11, wherein said image frame includes a lower central region, an upper region, a left region and a right region;

said state judgment means includes:
(a) first/second region comparison means for comparing an average luminance of a first region with an average luminance of a second region and for generating a judgment value indicating the result of comparison,
(b) correlation calculation means for calculating a correlation value representing a correlation relationship between the distribution of said average luminance obtained by region luminance calculation means and a predetermined distribution of luminance, and
(c) judgment means for judging whether said image frame is in a backlight state or in an excessive frontlight state based on said judgment value and said correlation value;

where, said first region is a combination of said upper region with one of said left region and said right region, which has a higher average luminance than the other, and said second region is a combination of said lower central region with one of said left region and said right region, which has a lower average luminance than the other.

20. The automatic exposure control apparatus according to claim 11, wherein said image frame includes a central region and a peripheral region;

said image frame also includes a lower central region, an upper region, a left region and a right region;

said state judgment means includes:
(a) first/second region comparison means for comparing an average luminance of a first region with average luminance of a second region and for generating a first judgment value indicating the result of comparison,
(b) central region comparison means for comparing an average luminance of said central region with an average luminance of said image frame and for generating a second judgment value indicating the result of comparison, (c) correction means for correcting said first judgment value based on said second judgment value, and (d) judgment means for judging whether said image frame is in a backlight state or in an excessive frontlight state based on said corrected first judgment value;

where, said first region is a combination of said upper region with one of said left region and said right region, which has a higher average luminance than the other, and said second region is a combination of said lower central region with one of said left region and said right region, which has a lower average luminance than the other.

21. The automatic exposure control apparatus according to claim 11, wherein said backlight degree calculation means includes:

(a) normalization means for normalizing said average value obtained by said first select region luminance calculation means with respect to said average luminance of said image frame, and (b) calculation means for calculating said first value representing said backlight degree as a function of said normalized average value;

said excessive frontlight degree calculation means includes:

(a) normalization means for normalizing said average value obtained by said second select region luminance calculation means with respect to said average luminance of said image frame, and (b) calculation means for calculating said second value representing said excessive frontlight degree as a function of said normalized average value.

22. The automatic exposure control apparatus according to claim 11, wherein said select region luminance calculation means arranges said average luminances obtained by said region luminance calculation means in the luminance order, groups said plurality of regions into a plurality of sets according to said luminance order, and calculates an average value of said average luminances of each set of said plurality of sets;

said backlight degree calculation means calculates a value representing a backlight degree as a function of said respective average values of said plurality of sets.

23. The automatic exposure control apparatus according to claim 11, wherein said value representing said backlight degree is calculated according to the rules of the fuzzy inference.

24. The automatic exposure control apparatus according to claim 11, wherein said value representing said backlight degree is calculated according to a linear multiple function.

25. An automatic exposure control apparatus comprising:

state judgment means for judging whether an image frame is in a backlight state or in an excessive frontlight state;

image frame luminance calculation means for calculating an average luminance of said image frame;

region luminance calculation means for calculating average luminances of a plurality of regions, said plurality of regions constituting said image frame;

first select region luminance calculation means for arranging said average luminances of said plurality of regions obtained by said region luminance calculation means in luminance order such that said average luminances are arranged in at least one of ascending and descending order, for selecting at least one of said plurality of regions by identifying a predefined range in said luminance order and selecting the at least one of said plurality of regions from said plurality of regions which have a corresponding average luminance that is within the predefined range in said luminance order, and for calculating an average value of said average luminances of said selected at least one region;

second select region luminance calculation means for arranging said average luminances obtained by said region luminance calculation means in luminance order such that said average luminances are arranged in at least one of ascending and descending order, for selecting at least one of said plurality of regions by identifying a predefined range in said luminance order and selecting the at least one of said plurality of regions from said plurality of regions which have a corresponding average luminance that is within the predefined range in said luminance order, and for calculating an average value of said average luminances of said selected at least one region;

backlight degree calculation means for calculating a first value representing a degree of backlighting in said image frame as a function of said average value obtained by said first select region luminance calculations means;

excessive frontlight degree calculation means for calculating a second value representing an excessive degree of frontlighting of said image frame as a function of said average value obtained by said second select region luminance calculation means;

correction amount determination means for determining a correction amount based on the judgment result by said state judgment means, said first value and said second value;

target luminance calculation means for calculating a target average luminance for an exposure correction based on said correction amount; and exposure correction means for correcting an exposure so that said average luminance obtained by said image frame luminance calculation means is kept substantially equal to said target average luminance, wherein said image frame includes a first upper region and a lower region;

said image frame also includes a lower central region, a second upper region, a left region and a right region;

said automatic exposure control apparatus further includes indoor/outdoor judgment means for judging whether the image frame is indoors or outdoors;

said state judgment means includes:

(a) first/second region comparison means for comparing an average luminance of a first region with an average luminance of a second region and for generating a first judgment value indicating the result of the comparison, (b) upper/lower region comparison means for comparing an average luminance of said first upper region with an average luminance of said lower region and for generating a second judgment value indicating the result of the comparison, (c) select means for selecting one of said first judgment value and said second judgment value according to the result of judgment by said indoor/outdoor judgment means, and (d) judgment means for judging whether said image frame is in a backlight state or in an excessive frontlight state based on said selected judgment value;

wherein, said first region is a combination of said second upper region with one of said left region and said right region, which has a higher average luminance than the other, and said second region is a combination of said lower central region with one of said left region and said right region, which has a lower average luminance than the other.

26. The automatic exposure control apparatus according to claim 25, wherein said indoor/outdoor judgment means includes:

(a) detecting means for detecting infrared rays, (b) conversion means for converting said detected infrared rays into an electric signal, and (c) judgment means for judging whether indoors or outdoors based on said electric signal.

27. The automatic exposure control apparatus according to claim 25, wherein said indoor/outdoor judgment means includes:

(a) dividing means for dividing said average luminance obtained by said image frame luminance calculation means by a diaphragm value, (b) judgment means for judging whether indoors or outdoors based on the result of division by said dividing means.

28. The automatic exposure control apparatus according to claim 25, wherein said indoor/outdoor judgment means includes:

(a) detecting means for detecting a color temperature, (b) conversion means for converting said color temperature into an electric signal, and (c) judgment means for judging whether indoors or outdoors based on said electric signal.

29. The automatic exposure control apparatus according to claim 25, wherein said indoor/outdoor judgment means includes:

(a) first calculation means for calculating an average of a color difference of said image frame, (b) second calculation means for calculating a color temperature based on said average of said color difference, (c) conversion means for converting said color temperature into an electric signal, and (d) judgment means for judging whether indoors or outdoors based on said electric signal.

* * * * *